United States Patent [19]
Watanabe et al.

[11] Patent Number: 5,742,294
[45] Date of Patent: Apr. 21, 1998

[54] METHOD AND APPARATUS FOR SYNTHESIZING IMAGES

[75] Inventors: Masaki Watanabe; Naohisa Kawaguchi; Kazuki Matsui; Shuichi Shiitani, all of Kawasaki, Japan

[73] Assignee: Fujitsu Limited, Kawasaki, Japan

[21] Appl. No.: 385,441

[22] Filed: Feb. 8, 1995

[30] Foreign Application Priority Data

Mar. 17, 1994 [JP] Japan .................................... 6-047491

[51] Int. Cl.⁶ .................................................. G06T 15/00
[52] U.S. Cl. .................................................. 345/425
[58] Field of Search ................................ 395/125, 127, 395/129

[56] References Cited

U.S. PATENT DOCUMENTS

| | | | |
|---|---|---|---|
| 4,831,445 | 5/1989 | Kawabe | 395/125 X |
| 4,835,532 | 5/1989 | Fant | 382/44 |
| 4,935,879 | 6/1990 | Ueda | 395/125 X |
| 5,077,608 | 12/1991 | Dubner | 395/125 X |
| 5,325,470 | 6/1994 | Sumino et al. | 395/125 X |
| 5,379,370 | 1/1995 | Allain et al. | 395/125 X |
| 5,410,644 | 4/1995 | Thier et al. | 395/125 |

FOREIGN PATENT DOCUMENTS

| | | |
|---|---|---|
| 62-162173 | 7/1987 | Japan . |
| 3-138784 | 6/1991 | Japan . |
| 3-244005 | 10/1991 | Japan . |

Primary Examiner—Phu K. Nguyen
Assistant Examiner—Cliff N. Vo
Attorney, Agent, or Firm—Staas & Halsey

[57] ABSTRACT

A method and apparatus for generating a synthetic image wherein a specific object region is extracted, a three-dimensional shape information is extracted, and a video image and a CG image are drawn compoundly. A three dimensional shape information to the specific object region called a video image object, and the video object is synthesized with CG images is created and stored on a hard disk. By using this data, a synthetic image is generated in non-real time fashion.

40 Claims, 67 Drawing Sheets

FIG. 3
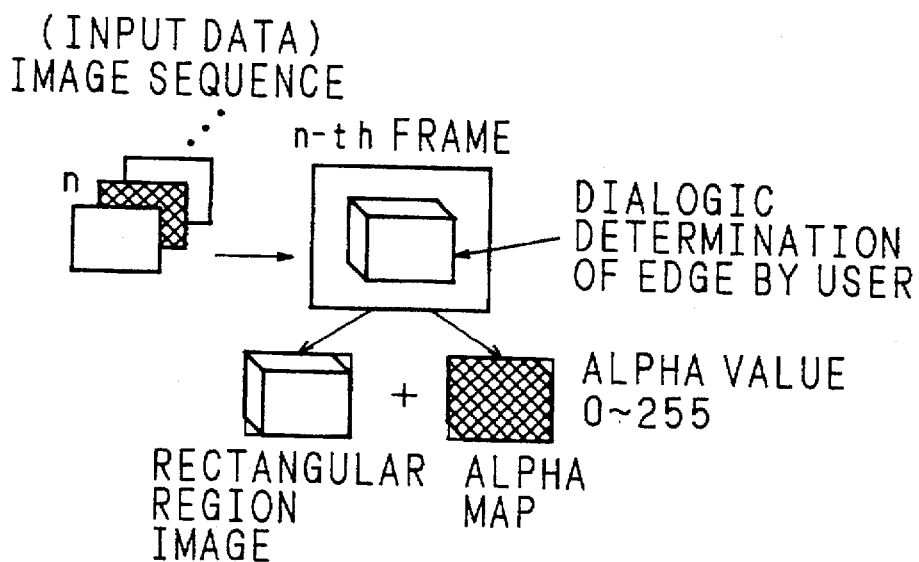
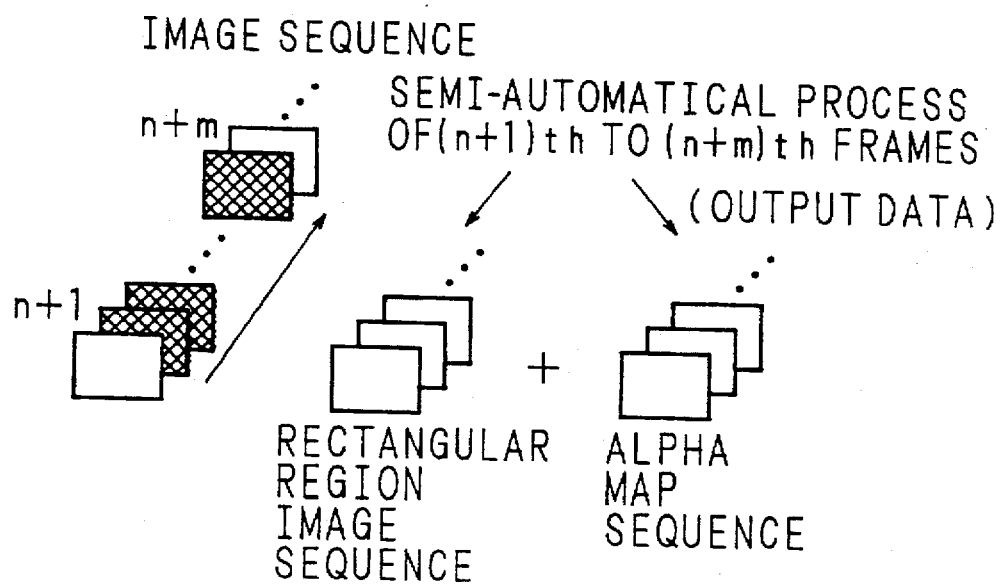

FIG. 4
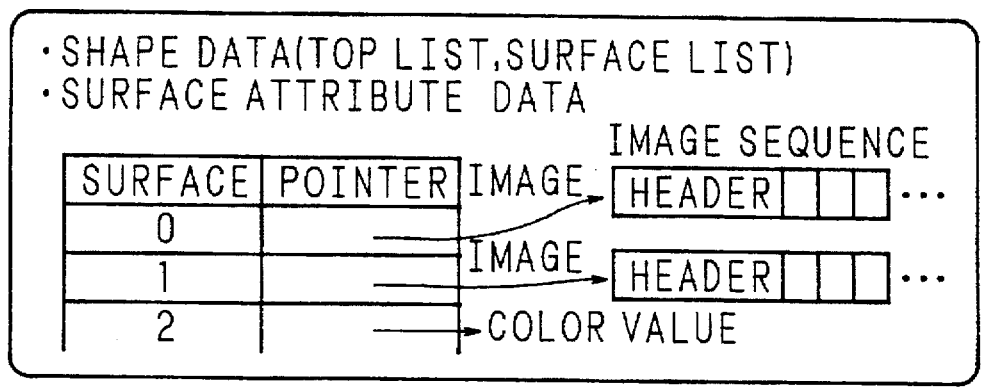
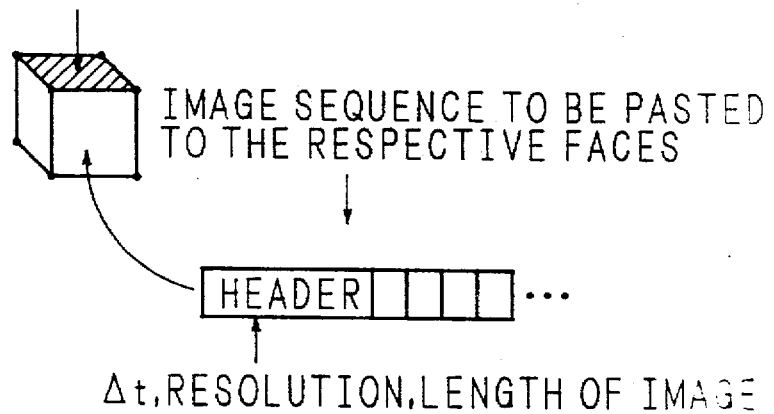
DESIGNATION OF SUITABLE COLOR
IMAGE SEQUENCE TO BE PASTED TO THE RESPECTIVE FACES
Δt, RESOLUTION, LENGTH OF IMAGE FIG. 15
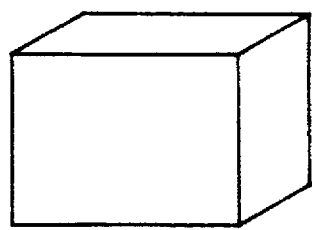
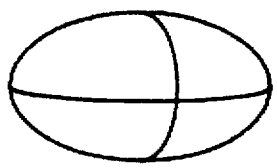
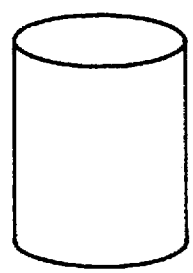
RECTANGULAR
PARALLELEPIPED
ELLIPSE
COLUMN

BEFORE

AFTER

BEFORE

CENTER OF
GRAVITY OF
WIREFRAME
DISPLAY REGION

AFTER

CENTER OF
GRAVITY OF
WIREFRAME
DISPLAY REGION

F I G. 2 4
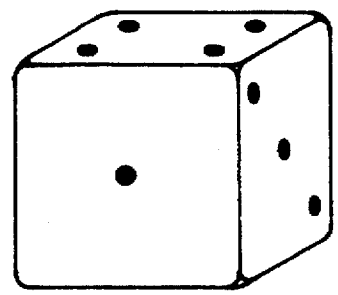

FIG. 27A
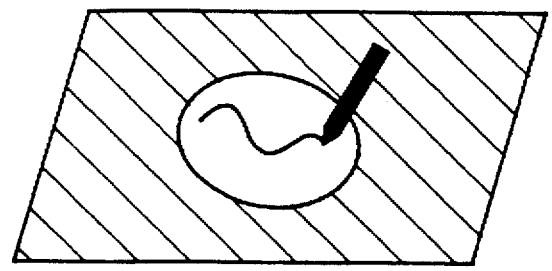
FIG. 27B
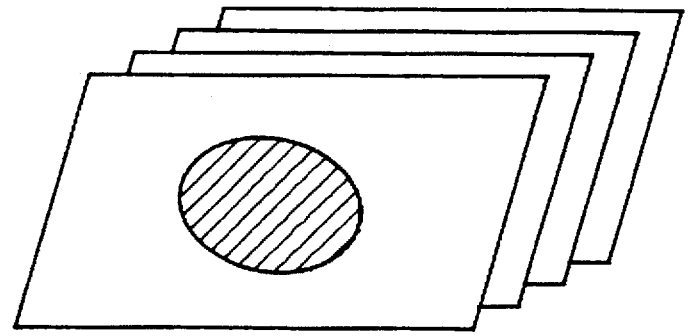

FIG. 30A
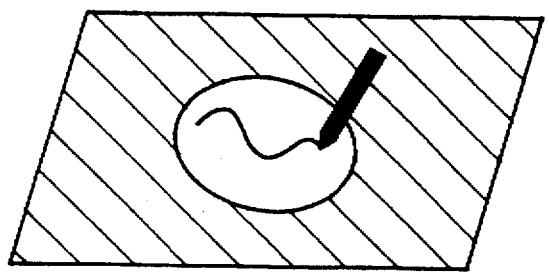
FIG. 30B
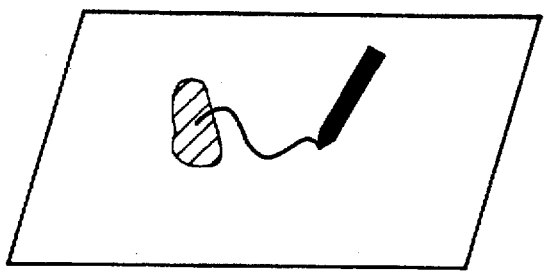

FIG. 33A
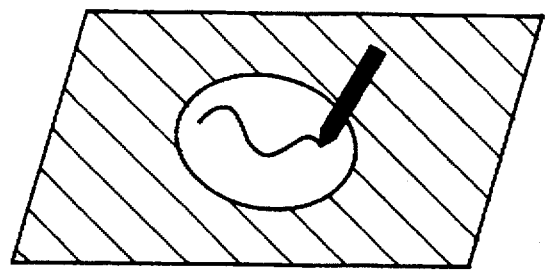
FIG. 33B
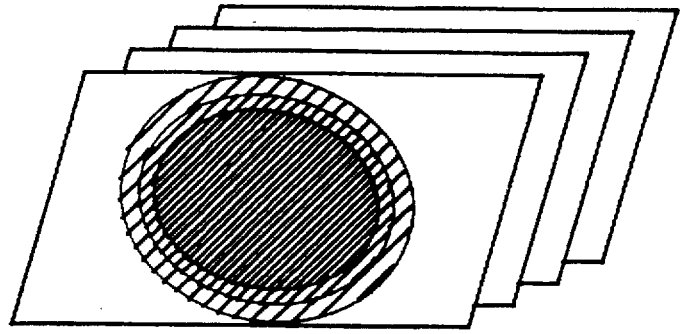

STROKED PART

ERASE NONZERO REGION
(NOISE IN BACKGROUND)

NONZERO REGION
(RESULT OF LABELING PROCESS WITH STROKED PIXEL AS STARTING POINT)

ERASE NONZERO REGION NOT LABELED

FIG. 46A
FOR THE FIRST FRAME    STROKED PART
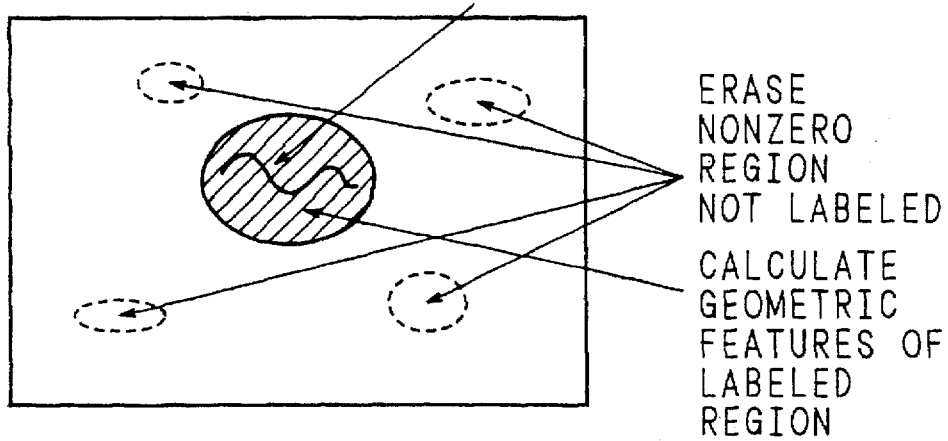
ERASE NONZERO REGION NOT LABELED
CALCULATE GEOMETRIC FEATURES OF LABELED REGION
FIG. 46B
FOR THE SECOND FRAME AND AFTER THAT
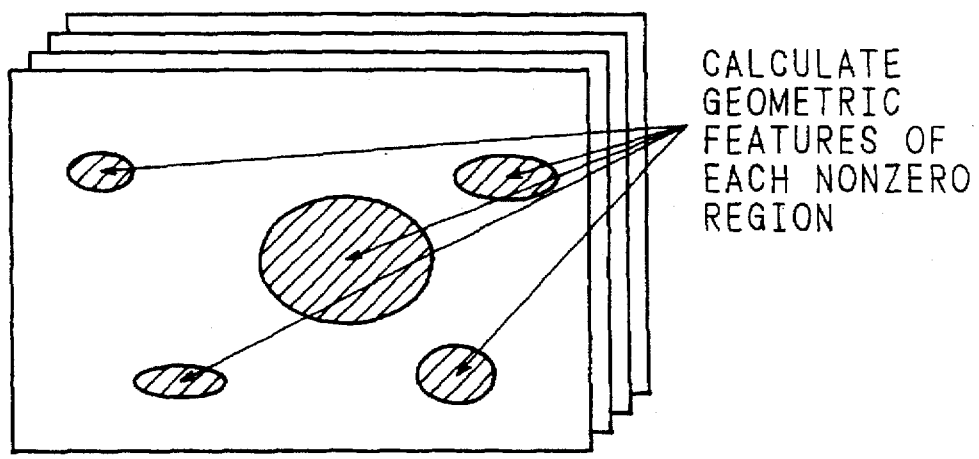
CALCULATE GEOMETRIC FEATURES OF EACH NONZERO REGION
FIG. 46C   ↓
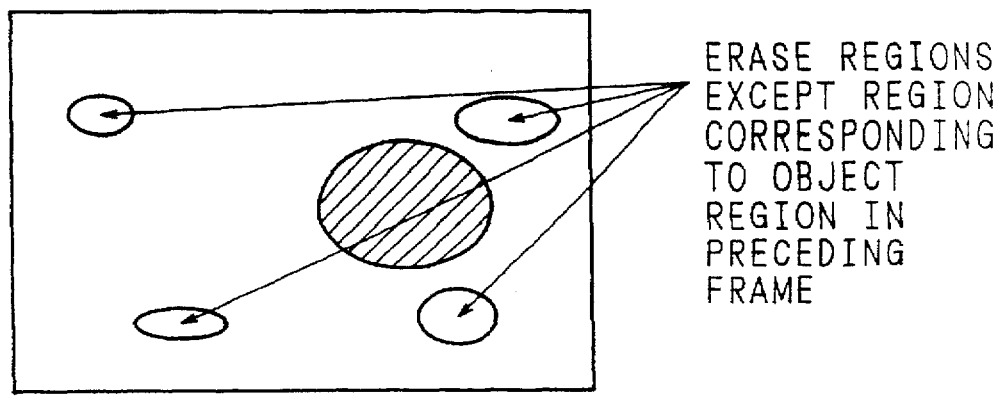
ERASE REGIONS EXCEPT REGION CORRESPONDING TO OBJECT REGION IN PRECEDING FRAME

FOR THE FIRST FRAME   STROKED PART

ERASE NONZERO REGION NOT LABELED

CALCULATE OPTICAL FEATURES OF LABELED REGION

FOR THE SECOND FRAME AND AFTER THAT

CALCULATE OPTICAL FEATURES OF EACH NONZERO REGION

ERASE OTHER REGIONS

FIG. 59 OBJECT TABLE

EXAMPLE OF OBJECT
0x40000002
(RECTANGULAR PARALLELEPIPED)

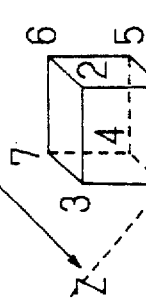

| N | OBJECT ID | SHAPE INFORMATION | | | |
|---|---|---|---|---|---|
| | | VERTEX CO-ORDINATE TABLE | FACE TABLE | SURFACE INFORMATION | IMAGE PLAYBACK START TIME |
| | 0x80000001 | | | | NIL |
| | 0x40000002 | POINTER | POINTER | POINTER | 100 |
| | 0x40000003 | | | | 50 |
| | 0x00000004 | | | | NIL |

| 8 | VERTEX ID | CO-ORDINATE(X,Y,Z) |
|---|---|---|
| | 0 | 0 0 100 |
| | 1 | 100 0 100 |
| | 2 | 100 100 100 |
| | 3 | 0 100 100 |
| | 4 | 0 0 0 |
| | 5 | 100 0 0 |
| | 6 | 100 100 0 |
| | 7 | 0 100 0 |

| 6 | FACE ID | VERTEX ID |
|---|---|---|
| | 0 | 0 1 2 3 |
| | 1 | 1 5 6 2 |
| | 2 | 5 4 7 6 |
| | 3 | 4 0 3 7 |
| | 4 | 3 2 6 7 |
| | 5 | 4 5 1 0 |

| 6 | FACE ID | IMAGE ID | START FRAME NUMBER | COLOR VALUE(RGB)/POINTER TO IMAGE DATA | DIFFUSION COEFFICIENT | REFLECTION COEFFICIENT | TRANSMISSION COEFFICIENT |
|---|---|---|---|---|---|---|---|
| | 0 | MOVIE-0001 | 15 | | 0.6 | 0.0 | 0.0 |
| | 1 | MOVIE-0002 | 15 | | 0.6 | 0.0 | 0.0 |
| | 2 | NIL | 0 | 255 0 0 | 0.4 | 0.1 | 0.0 |
| | 3 | MOVIE-0004 | 15 | | 0.6 | 0.0 | 0.0 |
| | 4 | MOVIE-0005 | 0 | 0 0 50 | 0.3 | 0.1 | 0.0 |
| | 5 | NIL | 0 | 0 255 100 | 0.5 | | |

METHOD AND APPARATUS FOR SYNTHESIZING IMAGES

BACKGROUND OF THE INVENTION

1. Field of the Invention

The present invention relates to a method and apparatus for synthesizing computer-graphics images and actual scene images.

2. Description of Related Art

In recent years, synthesizing images of computer graphics (hereinafter abbreviated CG) images and actual scenes images has become a popular technique in the production of motion pictures and commercial films. For example, by synthesizing a prerecorded image of a human and an image of a virtual building created by CG technique, it is possible to produce an effect that gives the visual illusion as if the human were walking in the building. The image produced by synthesizing a CG image and an actual scene image is realistic and gives a great visual impact to a viewer, and such a technique is indispensable, particularly for scene simulation.

Generally, in a CG technique, the shape of an object to be drawn is defined by using a simple shape (shape primitives) such as a plane surface, a quadratic curved surface, and so on, and processings of applying desired color and pasting image data on the surface are performed. However, when a natural object such as a tree or a river is drawn by using this method, the resulting image will look static at a fixed position. Therefore, to produce animation that looks more natural, a moving scene of a tree swaying in the wind or of a river with flowing water is shot in advance, and after that, the thus captured image is synthesized with a scene created by the CG technique. Previously, it has been practiced to produce a synthetic image of an actual scene image and a CG image CG by selecting an image from taken actual scene images and pasting it to a simple shape primitive such as a flat plate. This processing of image synthesis is repeated for each frame, to produce animation from a sequence of successive synthetic images.

As a publicly known literature concerning static image synthesis there is "A Technique for 2.5-Dimensional Simple Scenic Model Construction for Scene Simulation," Symposium on Image Recognition and Understanding (MIRU '92), July 1992.

According to this technique, an actual scene is shot by assuming the completed synthetic image first, and then, a portion to be synthesized is clipped from the image of the actual scene and superimposed on a CG-generated scene to produce a synthetic image of CG and actual scenes. Shooting by this technique, however, requires large-scale settings, such as camera shooting in a studio using a blue background and the measurement of the camera position for shooting.

A computer-aided method also is proposed in the literature of MIRU '92. According to the proposed method, viewpoint information is extracted from an image of an actual scene, and the object in the image is approximated by a two-dimensional model which is then synthesized with a CG image. However, since this is not a model having perfect three-dimensional information, there exist limitations on the image synthesizing process, such as the inability to change the viewpoint when synthesizing the images.

In Japanese Patent Application Laid-Open No. 3-138784 (1991), there is proposed a technique in which, in order to treat an object in a static image as the one in three dimensions, the object in the static image is reconstructed on the basis of a three-dimensional model, and the image portion corresponding to the three-dimensional object is mapped as a surface texture of the three-dimensional object model to be displayed. This technique also proposes synthesizing a surface texture from a plurality of input image frames for one three-dimensional portion. However, in case of a video image, there can arise a situation where the surface texture changes moment by moment, and when a plurality of textures are synthesized, the resulting texture may become smoothed in the direction of the time series, the fact being unsuitable for the purpose.

There are no methods ever established that can perfectly extract the shape of a three-dimensional object in an image. Methods having been proposed in the prior art include one in which the reflection characteristics of an object surface are assumed and inclinations of the object surfaces are obtained from the observed color values, and one in which models of objects observed in an image are prestored and how an object observed in an image looks is checked with the prestored models (japanese Patent Application Laid-Open Nos. 62-162173 (1987) and 3-244005 (1991)). These methods have been developed along with the development of image understanding research.

However, either method cannot be applied unless the application condition is satisfied. For example, the former method requires a prior assumption of the reflection characteristics of the object, and the latter requires that the models be prestored for the object to be observed.

Electrical image synthesis is performed as shown in FIG. 1. For example, an image of a human on a blue background is captured by an image input section A, and an image of a landscape is captured by an image input section B. Then, the blue component of the image in the image input section A is detected, and is fed to an inverting amplifier for inverting amplification and appropriate control of the mixing ratio. The signal inverting-amplified signal is then fed into a mixing amplifier where it is mixed with the signals from the image input sections A and B, the output of the mixing amplifier then being fed to an image output section. As a result of this processing, the background in the image from the image input section A vanishes, and an image of the human with the image from the image input section B as the background is produced.

The above conventional method requires an extra facility for the provision of a blue background. Furthermore, the above method lacks versatility since it can he used only for those originally intended for image synthesis. Moreover, the setting of parameters for mixing in the mixing amplifier is difficult, and the operation is also intricate.

Next, the prior art concerned with the presentation of three-dimensional shape models will be described.

As the operating speeds of computers increase, it has become possible to display a three-dimensional shape model by rotating, scaling, or translating it in real time, and there has been a demand for a function that enables a human to operate a three-dimensional shape model interactively and that can re-display the result of the operation. This demands the establishment of an operation method that can rotate, scale, and translate the three-dimensional shape model without interrupting the human's thinking process.

For transformations of a three-dimensional shape model in three-dimensional space, a total of six degrees of freedom is required, i.e., three degrees of freedom for rotation and three degrees of freedom for translation. When displaying a three-dimensional shape model on a two-dimensional display screen, of the above degrees of freedom, the movement in the depth direction with respect to the display can be presented by scaling. Therefore, in this case, transformations can be achieved by a total of six degrees of freedom: three degrees of rotation freedom, one degree of scaling freedom, and two degrees of translation freedom. In a three-dimensional model operation method of the prior art, the above operations were assigned to 12 keys on a keyboard, each for one of the six degrees of freedom in both positive and negative. In a three-dimensional model operation method using a pointing device such as a mouse, mode switching was performed to enable the pointing device having only two degrees of freedom to handle transformations of six degrees of freedom. In a method intermediate between the above two, two degrees of freedom are operated by a pointing device, while the other four degrees of freedom are operated by a keyboard.

In the operation method by a keyboard, since two keys, one for the positive direction and the other for the negative direction, are assigned for each axis, a transformation is possible along only axis direction. For example, when horizontal and vertical axes are provided for translation in a plane, a translation in an oblique direction requires a two-step operation, first moving vertically and then moving horizontally (or first moving horizontally and then moving vertically). Furthermore, in case of rotation, the problem becomes more serious since with this method it is extremely difficult to decompose the intended transformation into vectors of axial directions.

In the operation method by a pointing device, transformations in directions oblique to axes can be performed, but there are problems that mode switching requires an intricate operation, and that the three degrees of rotation freedom cannot be operated satisfactorily.

In the operation method by a keyboard in combination with a pointing device, inputs by using two different devices only add to a difficulty in operation, and it cannot be said that this method compensates the shortcomings of the above two methods.

There is a further problem that in displaying, it is not grasped about which point or axis the model will be rotated as a center until it is actually rotated.

When an image of an actual scene recorded by a video tape recorder (VTR) is to be synthesized with a CG image, since the number of frames in the VTR image is fixed, CG drawing needs to be performed in synchronization with the VTR image frames. That is, CG drawing has to be synchronized frame by frame, by manual operation, with the reproduction of the VTR image.

This requires an enormous number of processes to produce an image sequence consisting of a large number of frames.

From the above description, subjects in the techniques for synthesizing CG images and actual scene images are summarized as follows.

(1) To enable to transform an image of an actual scene into a three-dimensional shape CG model in a simple process.
(2) To permit the intervention of an operator for the transformation.
(3) To enable a video image of an actual scene to be synthesized with a CG image.
(4) To enhance ease of operation and operation efficiency when extracting a desired portion from an image of an actual scene.
(5) To enhance ease of operation when applying rotation, scaling, and translation transformations of a CG model.
(6) To achieve easy synchronization between CG and actual scene images.

SUMMARY OF THE INVENTION

The present invention has been devised to resolve the above-mentioned problems, and its primary object is to provide a system that enhances performance and easiness in operation when synthesizing a computer graphics image with an image of an actual scene.

First, an outline of the present invention will be described. According to the method and apparatus (system) proposed in the present invention, the computer, using image processing techniques, performs the following three types of processing in interaction with the user.

1) Dividing image information in units of objects.
2) Generating a video image object with three-dimensional shape information appended to it.
3) Displaying compoundly CG model and video image object. The processing 1) eliminates the need for studio shooting using blue background. The processing 2) eliminates the need for the measurement and recording of camera position information during the shooting of images. The processing 3) enables the viewpoint to be changed on the display.

Brief description of the system configuration

FIG. 2 shows an outline of the system configuration according to the present invention. This system comprises three processing sections: a specific object region extracting section, a three-dimensional shape information extracting section, and a moving object/CG compound drawing section. The specific object region extracting section and three-dimensional shape information extracting section create data called video image objects which are to be synthesized with CG images. The data is stored on a hard disk, Using this data, the video image object/CG compound drawing section generates a synthetic image in non-real time.

Specific object region extracting section

The specific object region extracting section extracts a specific object region from image information inputted from a capturing tool. The flow of processing is shown in FIG. 3. In the example shown, a sequence of successive images is received as input data, and an image sequence of a rectangular region containing a specific object and an alpha map sequence having alpha values which is the same size as the image sequence are produced as output data. When the object region is divided by using a binary value mask, unnatural aliasing occurs along the boundaries. To prevent this, the region is defined by using alpha values. After the region of the specific object has been determined for the n-th frame in interactive processing with the user, the processing of each of (n+1)th to (n+m)th frames is performed semi-automatically under computer control by using the processing result of the preceding frame.

Three-dimensional shape information extracting section

The three-dimensional shape information extracting section extracts three-dimensional shape information from two-dimensional image information by using the alpha map sequence and the image sequence of the rectangular region containing the specific object, made by the aforementioned specific object region extracting section. The extraction of the three-dimensional shape information is accomplished by the user applying deformation, rotation, translation and other transformations to a plurality of simple shape primitives (rectangular parallelepiped, and so on) and fitting them onto an object in a two-dimensional image. The system of the invention extracts not only viewpoint information but also shape information about the object and texture images pasted on the respective faces of the object. To construct a data structure called a video image object, the extracting section applies three-dimensional shape information to the object in the image, extracts image information pasted to each face of the CG-modeled object, and normalizes it to a view from the front, the normalized information then being stored.

Structure of video image object

The data generated by the processing in the specific object region extracting section and three-dimensional shape information extracting section has a structure called a video image object. FIG. 4 shows an outline of the structure of a video image object. The video image object is the data structure created to merge images with CG, and contains, in addition to shape data, surface information including pointers to the image information (static image or video image) to be pasted on the respective faces. Moving object/CG Compound Drawing Section.

The moving object/CG compound drawing section draws the generated video image object data compoundly with CG data. At this time, time $T_i$ of the CG scene to be drawn and time interval $\Delta t$ are specified as meta-information. The CG data includes position information at each time, in addition to the shape data of each object. Further, with the specification of time $T_i$, images to be pasted on the respective faces are selected from the image data in the video image object. After the surface attributes of the object at time $T_i$ is determined, a synthetic scene at time $T_i$ is generated.

The present invention can be roughly divided into the following three categories as described above:

(1) Invention relating to the overall configuration, (2) Invention relating to the specific object region extracting section and three-dimensional shape information appending section, and (3) Invention relating to the moving object/CG compound drawing section Invention (2) can be subdivided into the following three categories:

2-1 Invention relating to the configuration of the specific object region extracting section and three-dimensional shape information appending section, 2-2 Invention relating to the configuration of the above extracting section, and 2-3 Invention relating to display of three-dimensional shape models.

Hereinafter, invention (1) is referred to as the invention of the first group, inventions 2-1, 2-2, and 2-3 as the inventions of the second, third, and fourth groups, respectively, and invention (3) as the invention of the fifth group.

A first object of the invention of the first group is to provide an image synthesizing method that can convert an actual scene image into a CG model having a three-dimensional shape in a simple operation. A second object is to provide an image synthesizing method that generates such a CG model for each frame so that a video image can also be produced.

The invention of the first group is characterized by the step of extracting a specific region from an actual scene image, the step of appending three-dimensional shape information to the extracted region, and the step of constructing a computer-graphics model representing information relating to the extracted region on the basis of information concerning the extracted region and the three-dimensional shape information.

In the invention, the computer-graphics model representing the information relating to the extracted region can be synthesized with another computer-graphics model for compound display. Further the above steps are performed on a plurality of frames to produce a video image.

Consequently, in the invention of the first group, a region corresponding to a specific object is clipped from an actual scene image, and by appending three-dimensional shape information to it, a CG model is constructed that has the surface attributes of the specific object in the actual scene image. This CG model is used singly or is merged with another CG model.

Furthermore, by performing the same processing on a plurality of frames, a moving synthetic image can be produced.

The object of the invention of the second group is to provide a method and apparatus for extracting a three-dimensional shape wherein when obtaining a three-dimensional shape of an object contained in an image, a rough shape of the object is designated by a human operator designation by the human operator and automatic adjustment by a computer using image processing techniques are performed alternately in an interactive manner to achieve the superimposition of the shape model while displaying a shape model on the screen.

The invention of the second group is characterized by preparing data on a plurality of geometric shapes beforehand; extracting a region corresponding to the object from the actual scene image; selecting one of the geometric shapes, and displaying the selected geometric shape on a screen where the extracted region is displayed; and adjusting the position, orientation, and size of the displayed geometric shape to make the shape coincide with the extracted region.

The adjusting means may include means for automatically adjusting the position, orientation, and size based on the shape and hue value of the object. Furthermore, the invention may include means for mapping image information of the region extracted from the actual scene image onto the adjusted shape.

Thus, according to this invention, a shape closest to the shape of the extracted object region is selected from among the shapes prepared beforehand, and is displayed on the screen. Then, the shape is adjusted so as to coincide with the extracted region, thus extracting the three-dimensional shape of the desired object. This result is the same as the result obtained by the previously described three-dimensional shape information extracting section.

The object of the invention of the third group is to provide an image synthesizing apparatus, and particularly, an apparatus for generating a key image to be synthesized, which does not require the provision of a special shooting, and is highly versatile and easy to operate when extracting a specific region from an image.

A first aspect of the invention of the third group has the following features. That is, a plurality of pixels within a region to be extracted are designated by stroking them, for example, with a light pen or a cursor operated by a mouse. A Predetermined features (for example, R, G, B, hue, saturation, intensity, luminance, and so on) are calculated for the designated pixels. The maximum and minimum values of each of the features are calculated, and then, the features are calculated for pixels inside and outside the region to be extracted. Then, pixels having the features between the maximum and minimum values are selected. A region made up of the selected pixels are designated as an extracted region.

More specifically, in selecting the pixels, the pixels over the entire screen are examined whether or not the features are within a range defined by the maximum and minimum values. Since those pixels falling within the range have the features close to that of the image portion to be extracted, such pixels are judged to belong to that image portion and assigned a value greater than 0, while those falling outside the range are determined as belonging to non-extracted regions and therefore assigned 0. Then, by extracting non-zero portions, pixels for which the features are within the range defined by the maximum and the minimum values are selected, the region made up of these pixels (the desired image portion) then being designated as an extracted region.

A second aspect of the invention of the third group has the following features. First, as in the first aspect, a plurality of pixels within a region to be extracted are designated, and predetermined features are calculated for the designated pixels. Then, within the designated pixels, a difference in the calculated features between adjacent pixels is calculated, and a maximum value of the calculated difference is calculated. With each of the designated pixels as the starting point, four adjacent pixels or eight adjacent pixels, for which the difference in the features between adjacent pixels is smaller than the maximum value, are connected, and a region made up of the connected pixels is designated as an extracted region.

A third aspect of the invention of the third group is characterized by assigning a value to the pixels in the extracted region and a different value to the pixels in non-extracted regions, assigning an intermediate value between the above two values to pixels located along an outer edge of the boundary of the extracted region, and generating an image by using these assigned values. More specifically, when the extracted region is assigned 1 and non-extracted region assigned 0, an intermediate value between 1 and 0 is assigned to pixels on the boundary between the two regions. This smoothes the boundary, thereby blending with the background is performed on synthesizing the extracted image.

A fourth aspect of the invention of the third group is characterized by assigning individually different intermediate values to a plurality of pixels adjacent to each other along a direction moving farther from the extracted region. This serves to further smooth the boundary.

A fifth aspect of the invention of the third group has the following features. As in the first aspect, a plurality of pixels within a region to be extracted are designated, predetermined features are calculated for the designated pixels, and a maximum value and a minimum value of the calculated features are calculated. Then, features are calculated for pixels inside and outside the region to be extracted, and it is determined whether the thus calculated features are within a range between the maximum value and the minimum value. The pixels falling within the range are assigned a constant, while on the other hand, the difference between the features of the pixels outside the range and the maximum value or the minimum value is calculated, and the pixels outside the range are assigned a value obtained by subtracting from the constant a value determined as a function of the difference. An image is generated by using these assigned values. This achieves adaptive control of the boundary smoothing. More specifically, the intermediate value between 1 and 0 is determined in accordance with the difference between the maximum value (or minimum value) of the features and the features of the non-extracted region. This makes the boundary of the extracted region smoothly blend with the background.

According to a sixth aspect of the invention of the third group, the constant is assigned to the pixels falling within the range, as in the fifth aspect. The sixth aspect is then characterized in that the difference between the features of the pixels outside the range and the maximum value or the minimum value is calculated, and in that the pixels outside the range are assigned a value obtained by subtracting from the constant a value determined as a function of the difference of each feature, an image then being generated by using these assigned values. Therefore, in the sixth aspect, two or more kinds of features, not one kind of feature, are calculated, and the difference is calculated for a plurality of features; then, the intermediate value is determined in accordance with the weighted average or the like. Since the plurality of features are used, the more natural boundary can be obtained.

According to a seventh aspect of the invention of the third group, predetermined features are calculated, as in the foregoing aspects. Next, the mean and variance of the calculated features are calculated, and further, features are calculated for pixels inside and outside the region to be extracted; then, it is determined whether the thus calculated features are within a range defined by the mean and variance, and the pixels falling within the range are assigned a constant. The deviation of the features of the pixels outside the range with respect to the mean is calculated, the pixels outside the range are assigned a value obtained by subtracting from the constant a value determined as a function of the deviation, and an image is generated by using these assigned values.

According to an eighth aspect of the invention of the third group, the deviation of the features of the pixels outside the range with respect to the mean is calculated, as in the seventh aspect. The eighth aspect is then characterized in that the pixels outside the range are assigned a value obtained by subtracting from the constant a value determined as a function of the deviation of each of the features, an image then being generated by using these assigned values.

As described, in the fifth and sixth aspects, the maximum and minimum values are used, while in the seventh and eighth aspects, the variance is used.

A ninth aspect of the invention of the third group is characterized by designating a plurality of pixels within a region to be extracted, performing 4-connected or 8-connected labeling with each of the designated pixels as the starting point, and changing non-labeled regions to non-extracted regions. Thus, in the ninth aspect, excessively extracted regions are rendered into non-extracted regions. More specifically, a plurality of extracted regions are assigned individually different symbols by labeling. Of these regions, only the region containing the labeled pixels is kept intact, and the other regions are erased.

A 10th aspect of the invention of the third group is a case of extracting a specific region from a plurality of image frames, for example, video image. First, for one frame, a plurality of pixels within a region to be extracted are designated, 4-connected or 8-connected labeling is performed with each of the designated pixels as the starting point, non-labeled regions are changed to nonextracted regions, and geometric features of the extracted region are calculated. Then, for the next frame, labeling is performed, geometric features are calculated for each of regions assigned different labels, and a region having geometric features close to the geometric features of the extracted region in the preceding frame is left as the extracted region, while changing other regions to non-extracted regions. In the 10th aspect, labeling is performed, and non-extracted regions are erased, as in the ninth aspect. For the next frame, the same labeling is performed, but the region identification between frames is based on the similarity in geometric features. As a result, only the extracted region is kept intact, and the other regions vanish. By repeating this process for a plurality of frames, extraction for a video image can be performed automatically.

An 11th aspect of the invention of the third group uses optical features instead of the geometric features used in the 10th aspect. The 11th aspect provides the same effect as that achieved in the 10th aspect.

The object of the invention of the fourth group is to provide a method and apparatus for displaying a three-dimensional shape model, that can directly perform transformations in all directions, obviate the cumbersome operation of mode switching or the like, and realize an easy-to-understand operation screen, thereby providing high-speed and fully flexible operation.

A displaying method of a three-dimensional shape, according to the invention of the fourth group, is characterized in that a regular polyhedron containing therein a whole or a part of the three-dimensional shape model is also displayed, when displaying a three-dimensional shape model on a two-dimensional plane.

The polyhedron used here includes a sphere. The polyhedron is translucent, and its color is selected so as to be easily visible in contrast to the background color and to the color of the three-dimensional shape model. Further, a processing mode of the three-dimensional shape model, such as translation, scaling, rotation, and so on, is changed in accordance with a relative positional relationship between a point designated by a pointing device and the position of the polyhedron.

A display apparatus of three-dimensional shape, according to the invention of the fourth group, displays a three-dimensional shape model on a two-dimensional plane, and is characterized by the provision of means for calculating a regular polyhedron containing therein a whole or a part of the three-dimensional shape model, a pointing device, means for judging a relative positional relationship between a point designated by the pointing device and the position of the polyhedron, and means for changing display mode of the three-dimensional shape model in accordance with the result of the judgment.

FIG. 5 shows a display example of the polyhedron. The three-dimensional shape model has a step-like shape, and a sphere (its meridians and latitudes also shown) enveloping it is displayed as a guide polyhedron for guiding recognition or operation. With this display, the center of scaling or rotation can be clearly recognized. When the point pointed to by a pointing device such as a mouse is inside the polyhedron, as shown in FIG. 6, then the designated transformation is a rotation. When it is outside the polyhedron, a translation is designated, and when it is on the periphery, a scaling is designated. The amount of the thus designated transformation is specified in a subsequent operation.

The object of the invention of the fifth group is characterized by extracting a designated region from an actual scene image, appending three-dimensional shape information to the extracted region, and constructing a computer-graphics model representing information relating to the extracted region on the basis of information concerning the extracted region and the three-dimensional shape information.

Synthesis data contains image data defining the image and specification of the image, data defining an object displayed by computer graphics and an image to be pasted on a surface thereof, and information on display time of the object. The object display time information contained in the synthesis data carries the time at which a synthetic image is generated, the time at which the playback of the image to be pasted on the surface of the object is started, and the starting frame number of the image.

The frame of the image to be pasted at each time is determined on the basis of the time information contained in the synthesis data.

Furthermore, image synthesis processing is adjusted in time on the basis of the time information contained in the synthesis data.

According to the invention of the fifth group, when pasting a frame-by-frame managed image onto a CG object, the desired image frame can be captured on the object display time axis. This accomplishes automatic time adjustment without requiring frame-by-frame processing.

The above and further objects and features of the invention will more fully be apparent from the following detailed description with accompanying drawings.

BRIEF DESCRIPTION OF THE DRAWINGS

FIG. 3 is a diagram showing the flow processing in a specific object region extracting section;

FIG. 4 is a diagram for explaining a video image object;

FIG. 15 is a three-dimensional representation of basic shape elements;

FIG. 24 is a diagram for explaining mapping;

FIG. 27A is a diagram for explaining region extraction;

FIG. 27B is a diagram for explaining region extraction;

FIG. 30A is a diagram for explaining region extraction;

FIG. 30B is a diagram for explaining region extraction;

FIG. 33A is a diagram for explaining region extraction;

FIG. 33B is a diagram for explaining region extraction;

FIG. 46A is a diagram for explaining noise erasure;

FIG. 46B is a diagram for explaining noise erasure;

FIG. 46C is a diagram for explaining noise erasure;

FIG. 59 is a diagram for explaining an example of object data;

DESCRIPTION OF THE PREFERRED EMBODIMENTS

The preferred embodiments of the present invention will be described in detail below with reference to the accompanying drawings.

[Invention of First Group]

First, the invention of the first group will be described which is concerned with a general configuration for implementing image synthesis from computer graphics (hereinafter abbreviated CG) and actual scene images.

Figure 7:
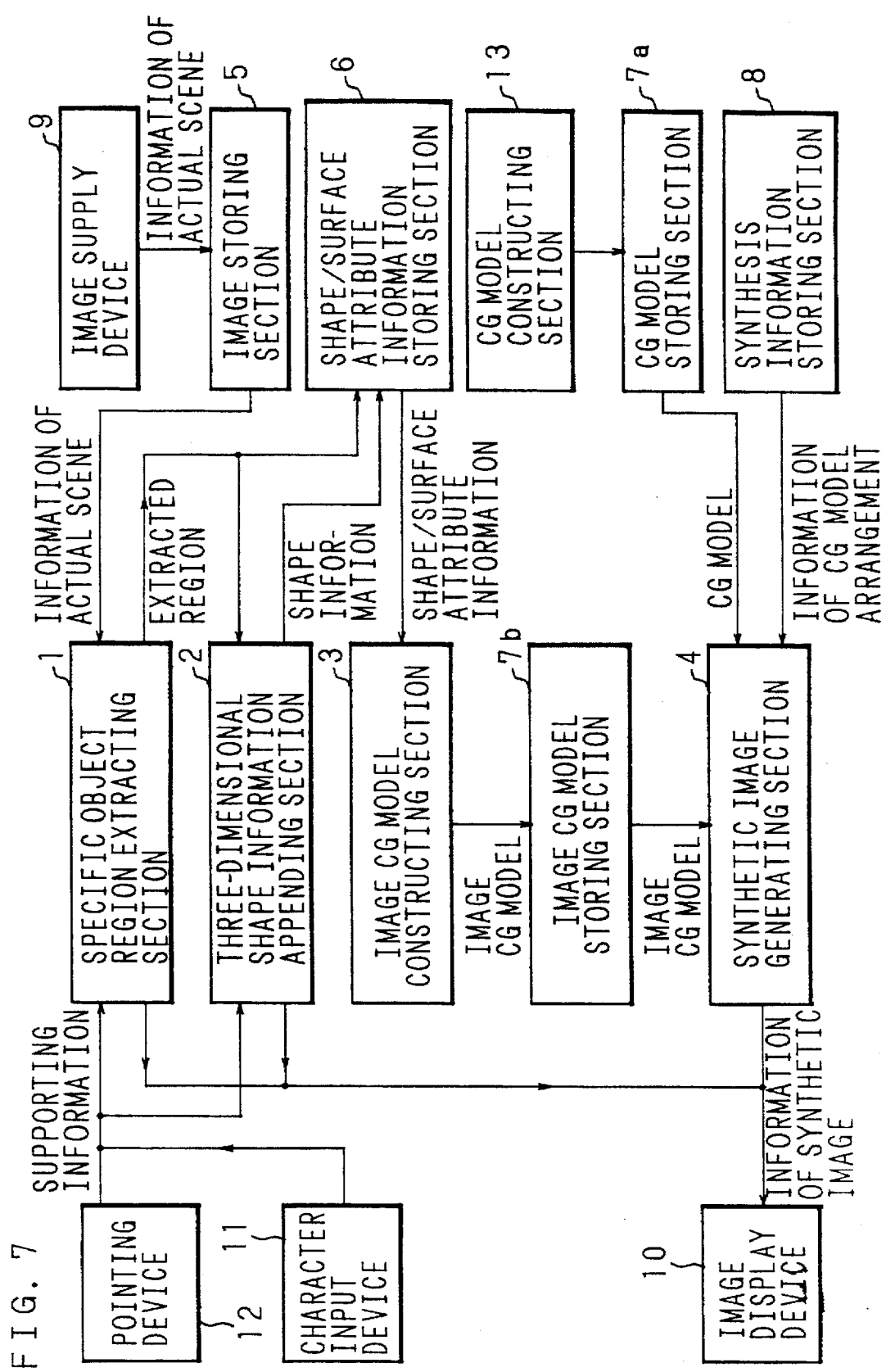
FIG. 7 is a block diagram of an apparatus used for implementing the invention of a first group.
Figure 8:
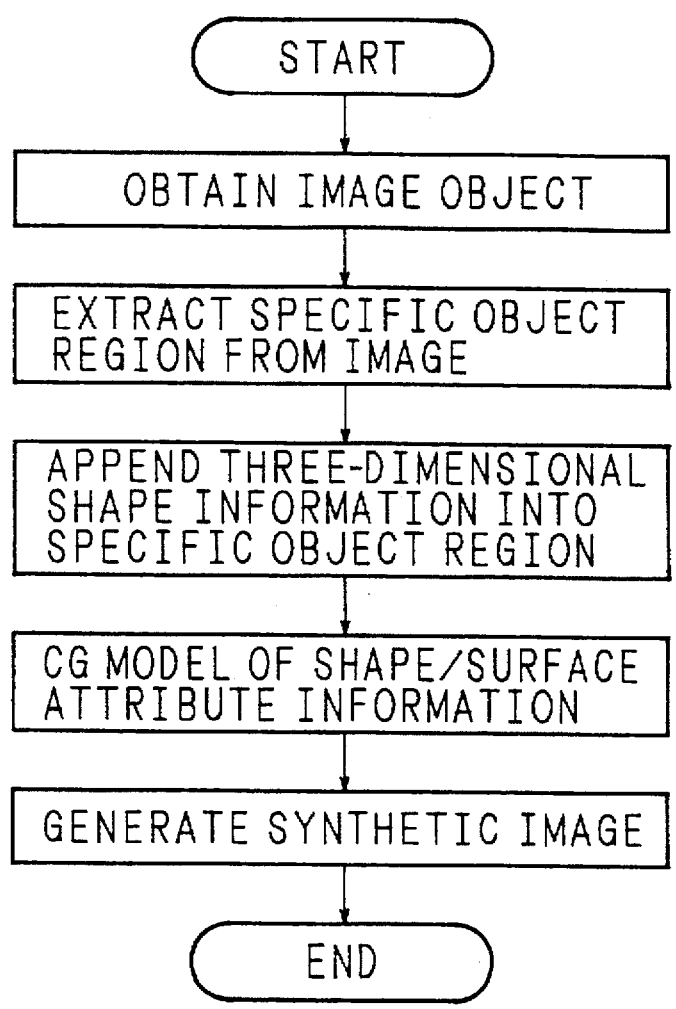
FIG. 8 is a processing flowchart.
Figure 9:
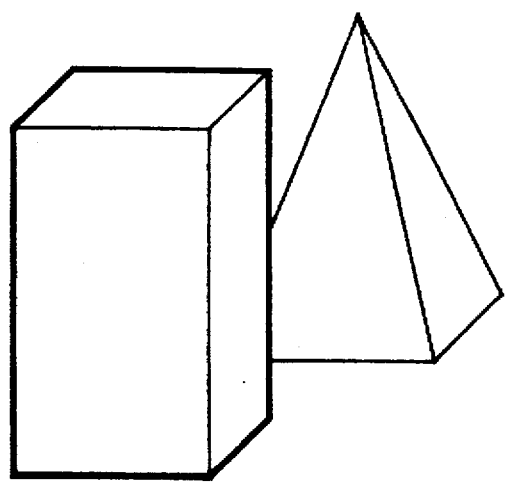
FIG. 9 is a diagram for explaining designation of a specific object region.

FIG. 7 is a block diagram of an apparatus for implementing the method of the invention, and FIG. 8 is a flowchart illustrating the processing according to the method. In FIG. 7, the numeral 9 designates an image supply device, such as a TV camera, a video tape, a video disk, or the like, and an image of an actual scene obtained from the image supply device 9 is stored in an image storing section 5, such as a video memory, on a frame-by-frame basis. The actual scene image data stored in the image storing section 5 is fed to a specific object region extracting section 1, which extracts a specific object region from the actual scene image. The region to be extracted is designated by a human operator by using a pointing device 12 such as a mouse. The region extraction operation will be explained in detail in the description of the inventions of the second to fourth groups. FIG. 9 shows a rectangular parallelepiped and a tetrahedron photographed in an actual image; in the figure, the rectangular parallelepiped is designated as the region to be extracted (shown by thick lines). The image data of the thus designated region is supplied to a shape/surface attribute information storing section 6, as well as to a three-dimensional shape information appending section 2 where three-dimensional shape information is appended.

The three-dimensional shape information appending section 2 appends three-dimensional shape information to the information supplied from the specific object region extracting section 1, and supplies the output to the shape/surface attribute information storing section 6. The specific configuration of the three-dimensional shape information appending section 2 will be explained in detail in the description of the invention of the second group, but it will be helpful here to describe the operation by using an example.

Figure 10:
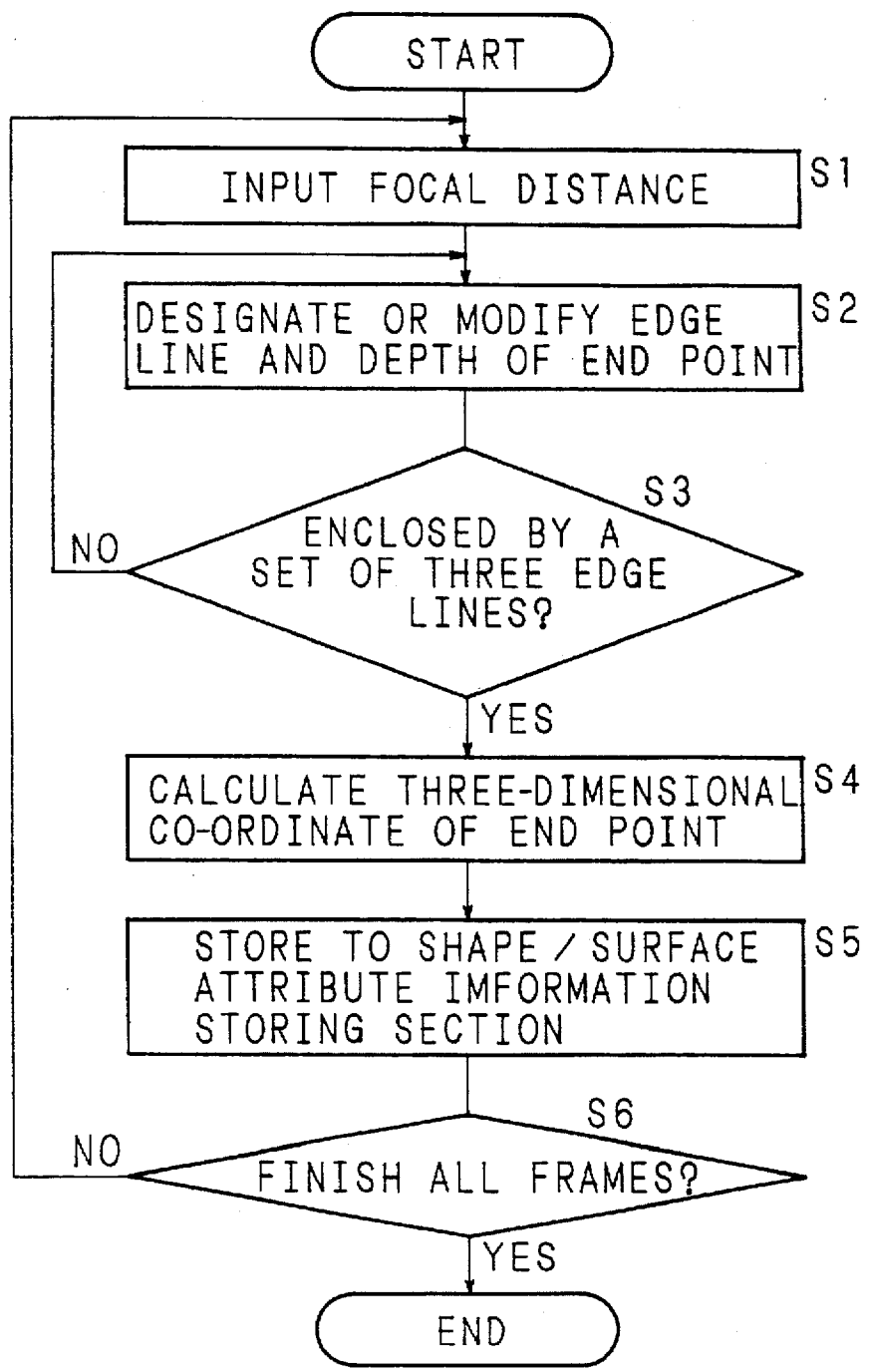
FIG. 10 is a flowchart for a three-dimensional shape information extracting process.
Figure 11:
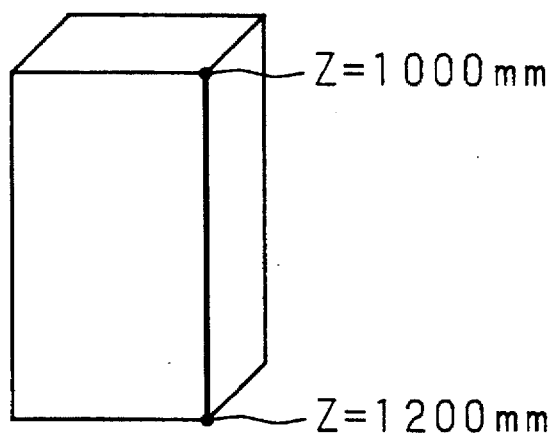
FIG. 11 is a diagram for explaining designation of depths of edge lines and end points.
Figure 12:
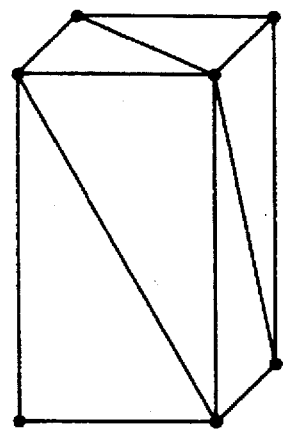
FIG. 12 is a diagram for explaining designation of edge lines.

FIG. 10 is a flowchart illustrating its operation. First, an extracted region or an object designated as shown in FIG. 11 is displayed on the screen of the image display device 10, and the focal distance f of the image is input by an operator (S1). A character input device 11, such as a keyboard, is used for input. Next, by using the pointing device 12, edge lines are drawn on the screen, and the values of their depths are inputted (S2). In FIG. 11, the edge lines thus drawn are shown by thick lines and the specified depth values are designated by Z. This drawing and depth specification can be canceled or corrected. Basically, the designation of a face can be made by designating a triangle (three edge lines). Therefore, in this invention also, the edge lines are drawn in such a manner as to divide each face into triangles, and also, an auxiliary line (a diagonal of the rectangle) is drawn to accomplish the division into triangles, so that any point in the extracted region lies inside the region enclosed by a set of three edge lines with no two different edge lines (including the auxiliary line) intersecting each other (S3).

Next, the three-dimensional coordinates of each end point are calculated (S4). Based on the focal distance f and depth Z inputted in S1 and S2, and on the screen coordinates (x, y) of the end point, the three-dimensional coordinates are obtained by the following equations.

$$X=(x/f) \times z$$

$$Y=(y/f) \times z$$

Further, the three-dimensional coordinates of any point on each edge line and those of any point within the region enclosed by the edge lines can be calculated as follows:

Point on Edge Line

When the screen coordinates and three-dimensional coordinates of an end point of the edge line are expressed as $(x_i, y_i)$ and $(X_i, Y_i, Z_i)$ (i,=2), respectively, the three-dimensional coordinates $(X, Y, Z)$ of a point $(X, Y)$ on the edge line are obtained by $$X=(1-t)X_1+tX_2$$
$$Y=(1-t)Y_1+tY_2$$
$$Z=(1-t)Z_1+tZ_2$$

where t is $(x-x_1)/(x_2-x_1)$ when $x_1 \neq x_2$, and $(y-y_1)/(y_2-y_1)$ when $x_1=x_2$.

Point within Region Enclosed by Edge Lines

Any point within this region lies inside an area enclosed by three edge lines, and it is guaranteed that the points of intersection of these three edge lines are their end points. Therefore, the plane defined by the coordinates of the three intersection points can be obtained from the coordinates $(X_i, Y_i, Z_i)$ (i=1, 2, 3) of the three intersection points (self-evident). When the equation of this plane is given as $aX+bY+cZ-1=0$, the three-dimensional coordinates $(X, Y, Z)$ for the two-dimensional coordinates $(x, y)$ of the image in this region are obtained by following equations.

$$X=x/(ax+by+cf)$$

$$Y=y/(ax+by+cf)$$

$$Z=f/(ax+by+cf)$$

From the edge lines thus obtained, the three-dimensional coordinates of the end points and the connection relationships between them are stored as shape information, and the correspondence of the end points to the coordinates on the specific object region and the image data of the specific object region are stored as surface attribute information, in the shape/surface attribute information storing section 6 (S5). Table 1 shows the contents of the shape/surface attribute information storing section 6. The processing in S1 to S5 is repeated for each frame (S6).

TABLE 1

| shape information | | | | | |
|---|---|---|---|---|---|
| end point | | | edge line | | |
| coordinate | | | | connection | |
| No | X | Y | Z | No | relationship |
| 1 | $X_1$ | $Y_1$ | $Z_1$ | 1 | end point1 ⟵⟶ end point2 |
| . | . | . | . | . | . |
| . | . | . | . | . | . |
| . | . | . | . | . | . |
| n | | | | m | |

| surface attribute information | | | |
|---|---|---|---|
| correspondence of end point and image | | | |
| end point | pixel position | | region image |
| No. | x | y | information |
| 1 | $x_1$ | $y_1$ | image data |
| . | . | . | |
| . | . | . | |
| . | . | . | |
| n | | | |

Next, the contents of the shape/surface attribute information storing section 6 is CG-modeled in an image CG model generating section 3.

The CG model of shape information can be generated directly from the connection relationships and three-dimensional coordinates of the edge lines by assuming the end points as the vertices, the edge lines as the sides, and the enclosed areas as the faces.

On the other hand, as for the surface attribute information for the portion assumed as a face, image information corresponding to its position is determined as the texture of the CG model to be generated. At this time, the image information is normalized as an image viewed from the direction of the normal in three-dimensional space. The rotation matrix R for the normalization is given by the following equation.

$$R = \begin{pmatrix} \cos\phi & 0 & -\sin\phi \\ 0 & 1 & 0 \\ \sin\phi & 0 & \cos\phi \end{pmatrix} \begin{pmatrix} \cos\kappa & \sin\kappa & 0 \\ -\sin\kappa & \cos\kappa & 0 \\ 0 & 0 & 1 \end{pmatrix}$$

Where rotation angle $\phi$ and rotation angle $\kappa$ are given by the following equation, based on a, b, and c when the equation of the plane of the region is expressed as $aX+bY+cZ-1=0$.

$$\phi = \begin{cases} \tan^{-1}((a^2+b^2)^{1/2})/c & (c \neq 0) \\ \pi/2 & (c = 0) \end{cases}$$

$$\kappa = \begin{cases} \tan^{-1}(b/a) & (a \neq 0) \\ \pi/2 & (a = 0) \end{cases}$$

Where a, b, and c can be obtained from the three-dimensional coordinates $(X_i, Y_i, Z_i)$ (i=1, 2, 3) of the three vertices.

The above modeling process is performed on all frames, and the CG model of the actual scene image is acquired as a sequence of CG models constructed frame by frame, which is stored into an image CG model storing section 7b.

A CG model constructing section 13 constructs ordinary CG models other than those constructed from actual scene image as mentioned above, and the constructed CG models are stored in a CG model storing section 7a.

A synthesis information storing section 8 stores information (CG model placement information) by which a synthetic image generating section 4 synthesizes an ordinary CG model and an image CG model constructed from an image of an actual scene. On the basis of this information, the synthetic image generating section 4 generates a synthetic image from the two CG models, and displays the synthetic image on the image display device 10 or records it on a recording medium not shown. The synthetic image generating section 4 and the synthesis information storing section 8 will be explained in further detail in the description of the invention of the fifth group.

In the invention of the first group described above, since an image of an actual scene is transformed into a three-dimensional shape CG model, it can be treated in the same manner as an ordinary CG model, which facilitates processing such as synthesizing these models. Also, the CG modeling of an actual scene image can be accomplished by a simple operation consisting of extracting a region and appending three-dimensional shape information to it. Furthermore, since the process allows a manual intervention by a human operator, delicate adjustments or deliberate changes can be made, and thus the degree of freedom is enhanced. By processing a plurality of frames in the same manner as described above, the invention can also be applied to a video image.

[Invention of Second Group]

Next, the invention of the second group will be described which is concerned with the configuration of the specific object region extracting section 1 and three-dimensional shape information appending section 3 shown in FIG. 7.

Figure 13:
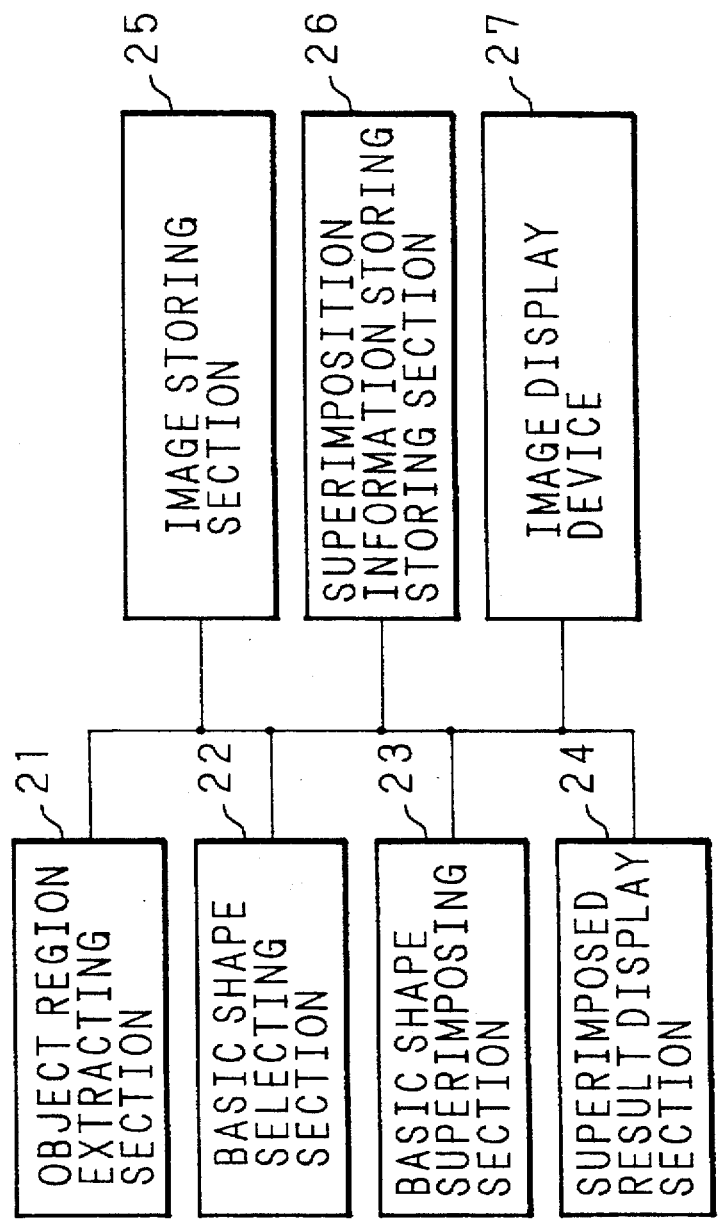
FIG. 13 is a block diagram of a three-dimensional shape extraction apparatus.
Figure 16:
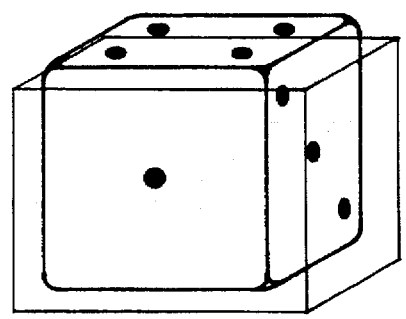
FIG. 16 is a diagram illustrating an example of superimposition of a basic shape element and an image.

FIG. 13 is a block diagram of a three-dimensional shape extracting apparatus. In the figure, the numeral 21 designates an object region extracting section which extracts a desired object region from an actual scene image so as to display it on an image display device 27. The object region extracting section 21 will be explained in detail in the description of the invention of the third group. The actual scene image and the extracted image are stored into an image storing section 25. A basic shape selecting section 22 stores therein a large number of basic shape patterns such as shown in FIG. 15, from which the operator selects a desired pattern so as to display it on the image display device 27. A basic shape superimposing section 23 superimposes the basic shape pattern selected by the operator on the extracted object image so as to display the resulting images as shown in FIG. 16, the two images then being made to coincide with each other by the operator's operation and by automatic adjustment by computer to be described later. The result of the images superimposed in such a manner as to coincide with each other is stored into a superimposition information storing section 26. A superimposed result display section 24 maps the image information of the extracted object surface to the adjusted basic shape element.

Figure 14:
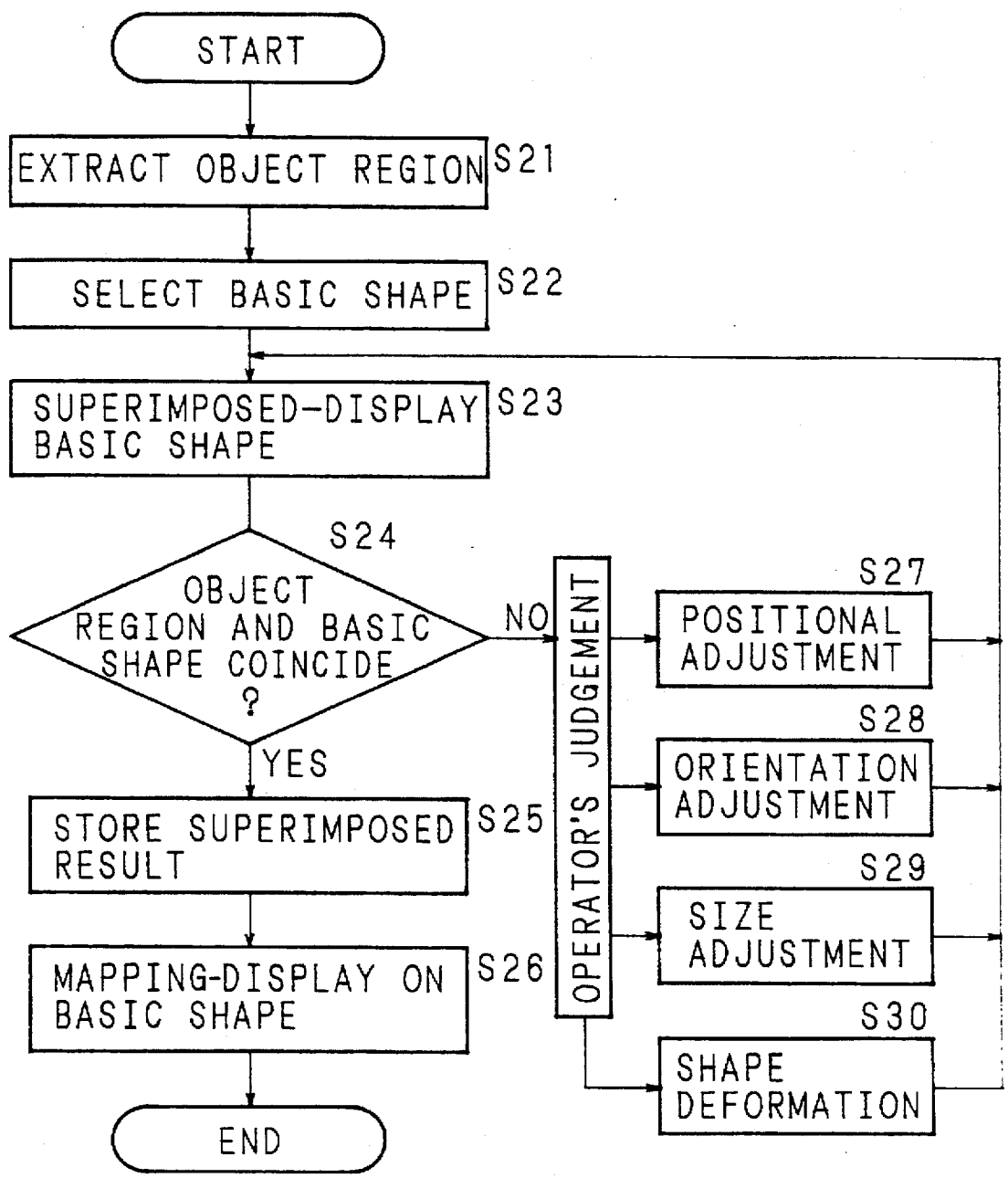
FIG. 14 is a flowchart for a three-dimensional shape extraction method.
Figure 17A:
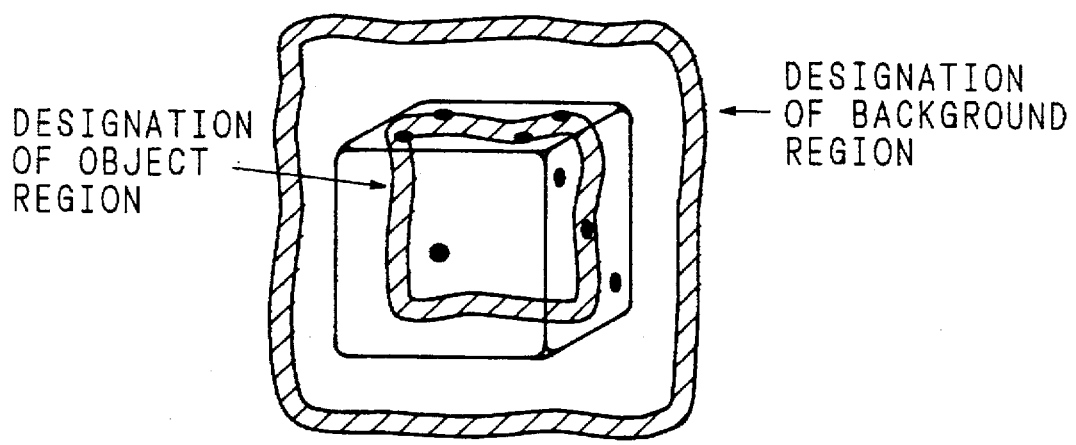
FIG. 17A is a diagram for explaining the extraction of an object region.
Figure 17B:
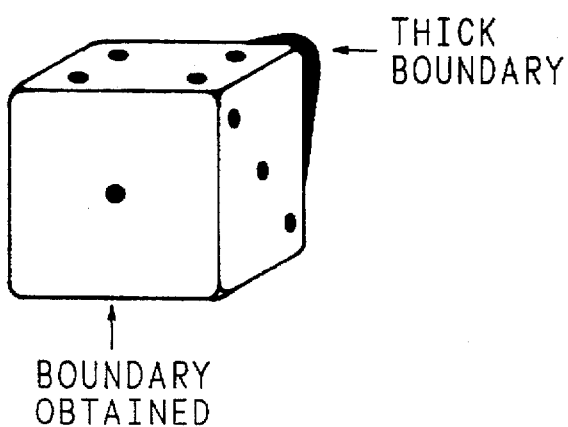
FIG. 17B is a diagram for explaining the extraction of an object region.

A method of three-dimensional shape extraction will be explained with reference to FIG. 14 which shows the procedure of the processing. An actual scene image is retrieved from the image storing section 25, and displayed on the image display device 27, from which image of a desired object is extracted in the object region extracting section 21 (S21). FIGS. 17A and 17B are diagrams for explaining the extraction operation. Using a drawing device, the operator draws closed curves designating an object region and a background region respectively. The object region extracting section 21 expands the closed curve for the object region, while contracting the closed curve for the background region. The expansion and contraction are permitted only for portions having similar hues. This causes the two closed curves to contact each other at the boundary; the boundary is thus determined, and the desired object region is extracted. There may occur a thick portion along the boundary as a result of the expansion and contraction, because of the presence of a shadow or the like; when this occurs, the inside line of the thick portion is determined as the boundary of the object.

Next, a prescribed operation is performed to display basic shape (shape primitive) patterns, from which a pattern closest to the shape of the extracted object is selected (S22). The selected pattern is then superimposed on the object image, as shown in FIG. 16 (S23). Generally, the extracted object shape and the selected basic shape do not coincide with each other. The operator judges whether the two shapes coincide or not (S24). When they do not coincide, positional adjustment (S27), orientation adjustment (S28), size adjustment (S29), and partial deformation (S30) are performed until the two figures coincide throughout their whole extent.

Figure 18:
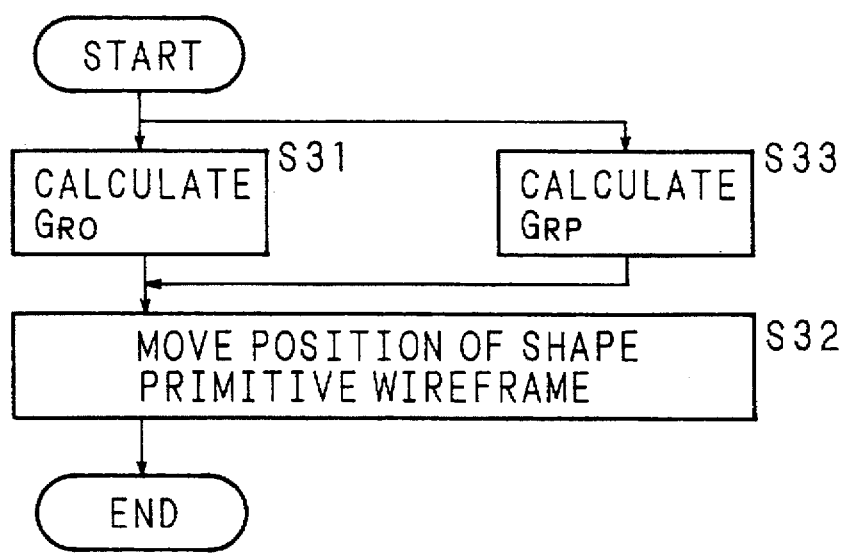
FIG. 18 is a flowchart for a translation transformation of a basic shape element.
Figure 19A:
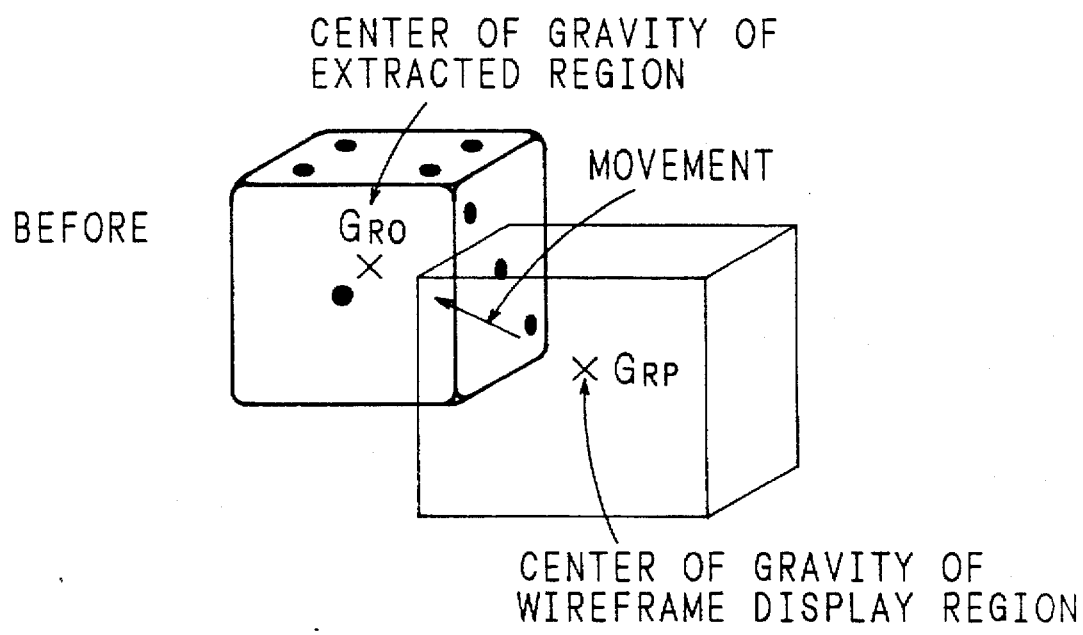
FIG. 19A is a diagram for explaining the translation transformation of the basic shape element.
Figure 19B:
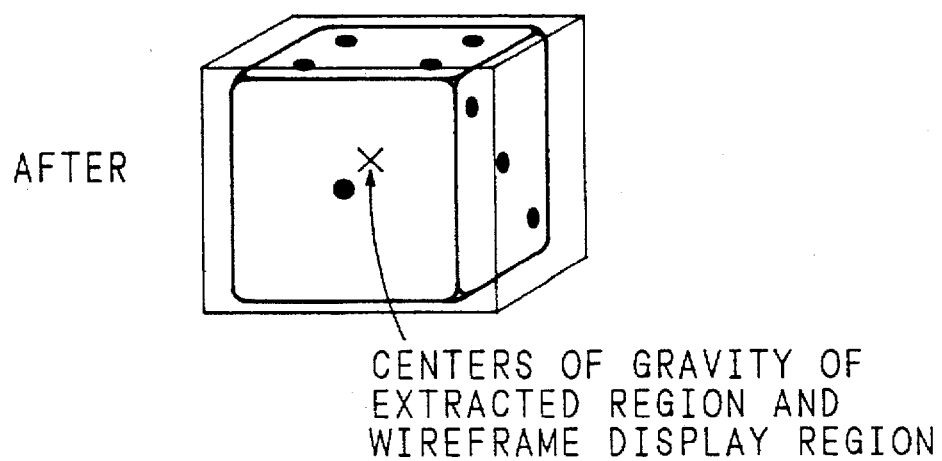
FIG. 19B is a diagram for explaining the translation transformation of the basic shape element.

FIG. 18 is a flowchart of a process related to a translation operation, and FIG. 19 is a diagram for explaining the translation operation. The purpose of this translation is to make the center of gravity of the shape primitive wireframe to coincide with that of the object region. That is, calculation of the center of gravity of the object region $G_{RO}$ (S31) and calculation of the center of gravity of the shape primitive wireframe $G_{RP}$ (S33) are carried out. Then, as shown in FIG. 19 the display position of the shape primitive wireframe is moved so that the center of gravity of the object region $R_{RO}$ coincides with that of the region $R_{RP}$ enclosed by the shape primitive wireframe model (S32).

The center of gravity $G_R$ of each region R can be obtained from the following equation.

$$G_R = (m_{10}, m_{01}/m_{00})^T$$

where $m_{00}$: $m_{00} = \int dR$ (This value indicates the number of points constituting the region R and represents the area of the region R)

$m_{10}$: $m_{10} = \int x dR$ (This value indicates the sum of the x-coordinates of all points constituting the region R), and $m_{01}$: $m_{01} = \int y dR$ (This value indicates the sum of the y-coordinates of all points constituting the region R)

Thus the display position of the shape primitive wireframe is moved by $(G_{RO} - G_{RP})$.

Figure 20:
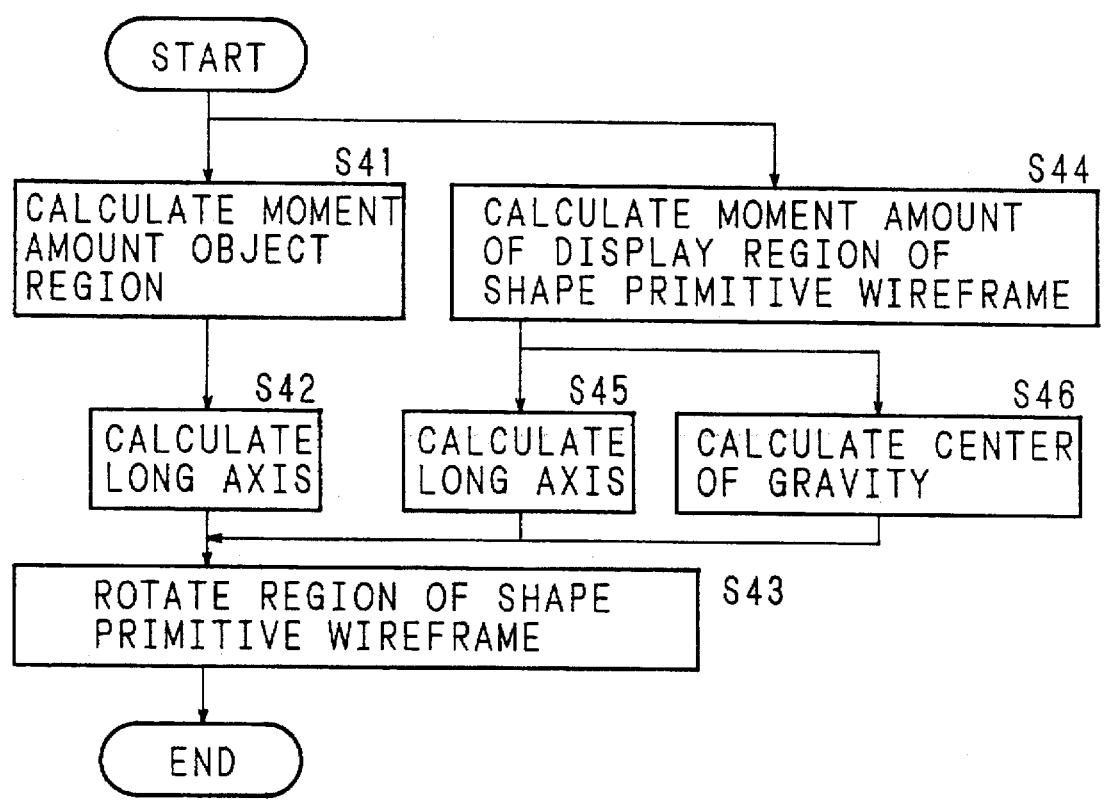
FIG. 20 is a flowchart for a rotation transformation of a basic shape element.
Figure 21A:
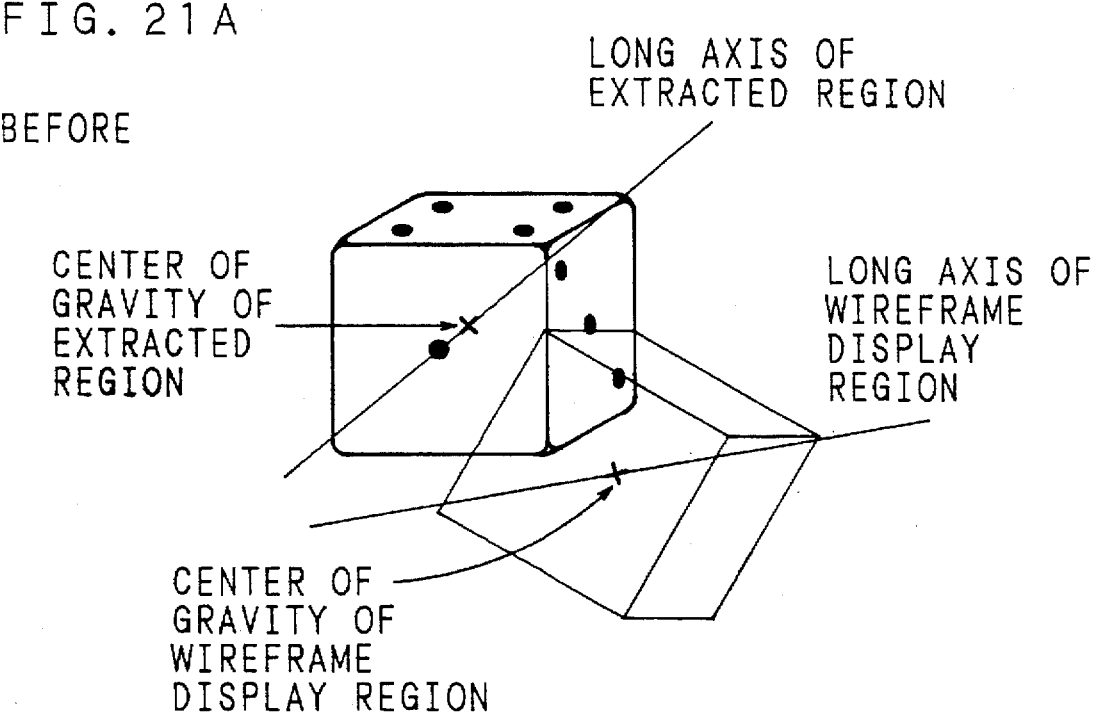
FIG. 21A is a diagram for explaining the rotation transformation of the basic shape element.
Figure 21B:
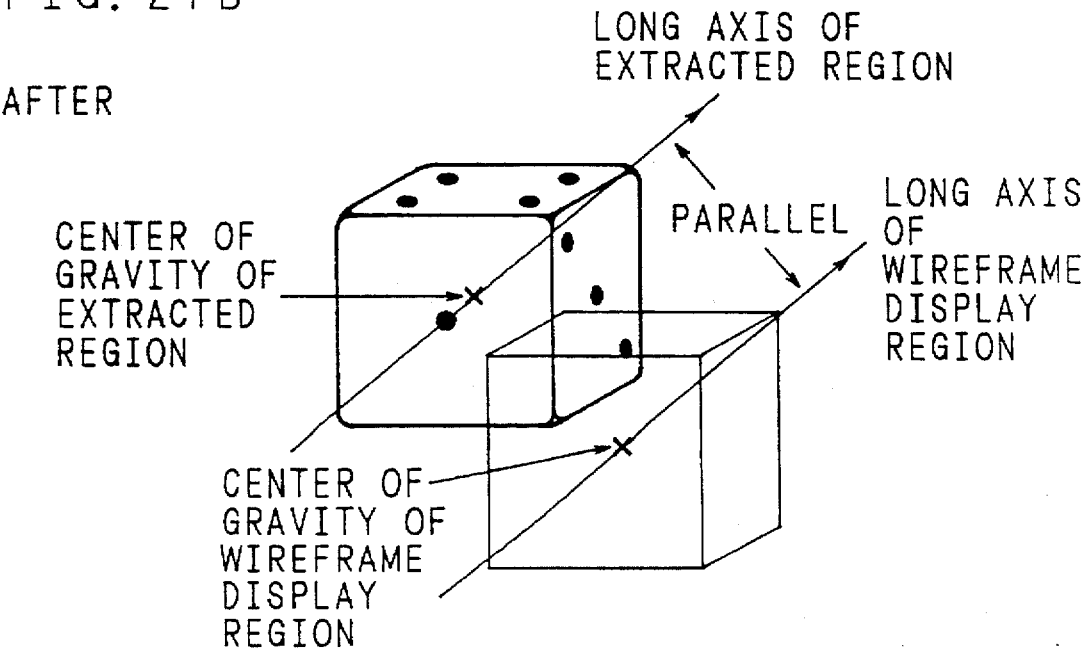
FIG. 21B is a diagram for explaining the rotation transformation of the basic shape element.

FIG. 20 is a flowchart showing a process for rotating the shape primitive for orientation adjustment, and FIG. 21 is a diagram for explaining the rotation operation. The purpose of the orientation adjustment by rotation is to align the long axis of the shape primitive wireframe in parallel with that of the object region.

The direction angle $\theta_R$ of the long axis of the region R can be obtained as that of a principal axis of inertia around the center of gravity of the region, that is, as the solution of the following equation.

$$\tan^2 \theta_R + [\{m_{20} - m_{10}/m_{00}) - (m_{02} - m_{01}/m_{00})\}/(m_{11} - m_{10}m_{01}/m_{00})]\tan \theta_R - 1 = 0$$

where $m_{11}$: $m_{11}=\int xy dR$ (This value indicates the sum of the products of the x- and y-coordinates of all points constituting the region R)

$m_{20}$: $m_{20}=\int x^2 dR$ (This value indicates the sum of the squares of the x-coordinates of all points constituting the region R), and $m_{02}$: $m_{02}=\int y^2 dR$ (This value indicates the sum of the squares of the y-coordinates of all points constituting the region R)

Thus the display position of the shape primitive wireframe is rotated by $(\theta_{RO}-\theta_{RP})$.

The moment amounts of the extracted object region and the shape primitive wireframe are calculated, as shown in the flowchart of FIG. 20 (S41, S44). The respective moment amounts are obtained by a following equation $$m_{ij}=\int x^i y^j dR$$

$(ij)=\{(0,0), (1,0), (0,1), (1,1), (2,0), (0,2)\}$

On the other hand, the long axis of the object region and the long axis and the center of gravity $G_{RP}$ of the shape primitive wireframe are obtained as described above (S42, S45, S46). Then, the display position of the shape primitive wireframe is rotated by $(\theta_{RO}-\theta_{RP})$ with $G_{RP}$ (S43) as a center.

Figure 22:
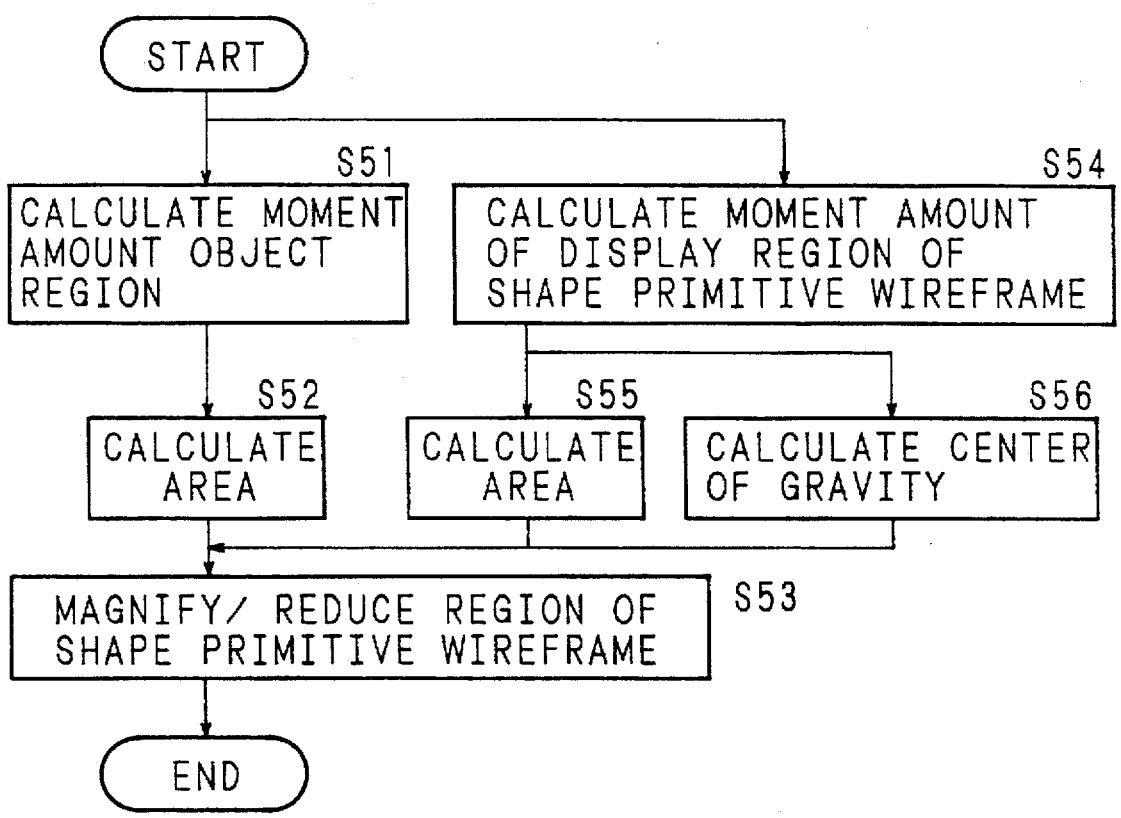
FIG. 22 is a flowchart for a scaling transformation.
Figure 23A:
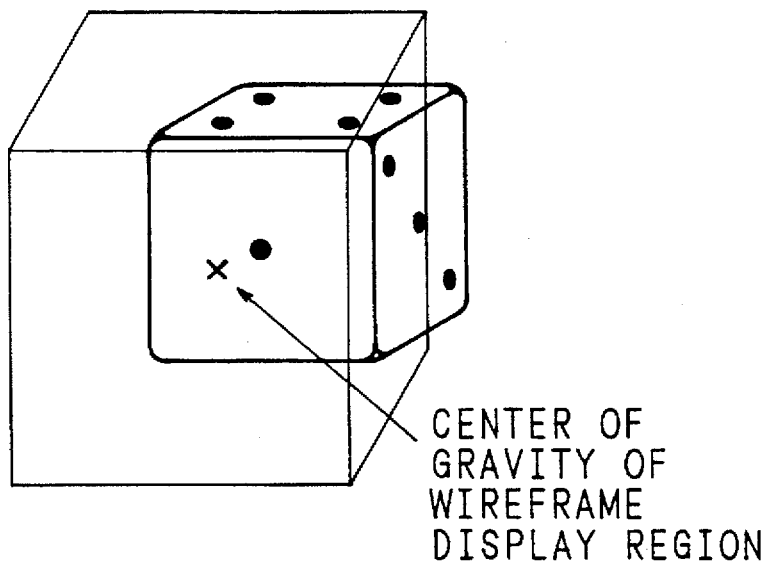
FIG. 23A is a diagram for explaining the scaling transformation.
Figure 23B:
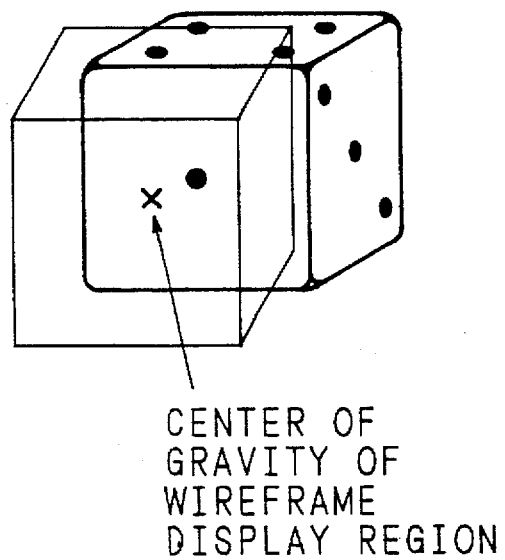
FIG. 23B is a diagram for explaining the scaling transformation.

FIG. 22 is a flowchart showing a process for size adjustment, and FIG. 23 is a diagram for explaining the size adjusting operation. The size adjustment is performed by magnifying or reducing the shape primitive wireframe with the center of gravity $G_{RP}$ of the region $R_P$ as a center in such a manner that the display areas of the two coincide with each other. More specifically, the area $S_R$ of each region R is given by a following equation.

$$S_R=m_{00}$$

Then, the shape primitive wireframe is magnified or reduced by $S_{RO}/S_{RP}$, where $S_{RO}$ is the area of the object region and $S_{RP}$ is the area of the shape primitive wireframe.

In the flowchart of FIG. 22, the moment amount of the extracted object region and the moment amount of the shape primitive wireframe display region are calculated (S51, S54). Then, by using the results, their arears $S_{RO}$ $S_{RP}$ are calculated (S52, S55). Further, the center of gravity $G_{RP}$ of the shape primitive wireframe is calculated (S56). Then, the shape primitive wireframe is magnified or reduced by $S_{RO}/S_{RP}$ (S53). The area can be obtained from a moment amount $m_{00}$.

Referring back to FIG. 14, shape deformation will be explained. When the shape of the object region is different in part from that of the basic shape element, the basic shape element is partially deformed using a command inputted by the operator. When the object region and the basic shape element are thus made to coincide with each other, these are superimposed one on top of the other and the result is stored into the superimposition information storing section 26 (S25). Then, the image information of the extracted object region to the shape primitive wireframe is mapped, as shown in FIG. 24 (S26). That is, the desired portion is clipped from the actual scene image and pasted on the shape primitive wireframe.

According to the invention of the second group described above, since the operator can extract a three-dimensional shape in an interactive manner, extraction of the desired object is possible without any limitations imposed by application conditions and without requiring known information (reflection information, and so on) concerning the object. Furthermore, since the basic shape element is automatically made to coincide with the object region under computer control, the operator's burden is alleviated accordingly. Moreover, since the obtained information is mapped, suitability or unsuitability of the extracted three-dimensional shape information can be judged intuitively.

[Invention of Third Group]

Next, the invention of the third group will be described which is concerned with the specific object region extracting section of FIG. 7 or the object region extracting section of FIG. 13.

Figure 25:
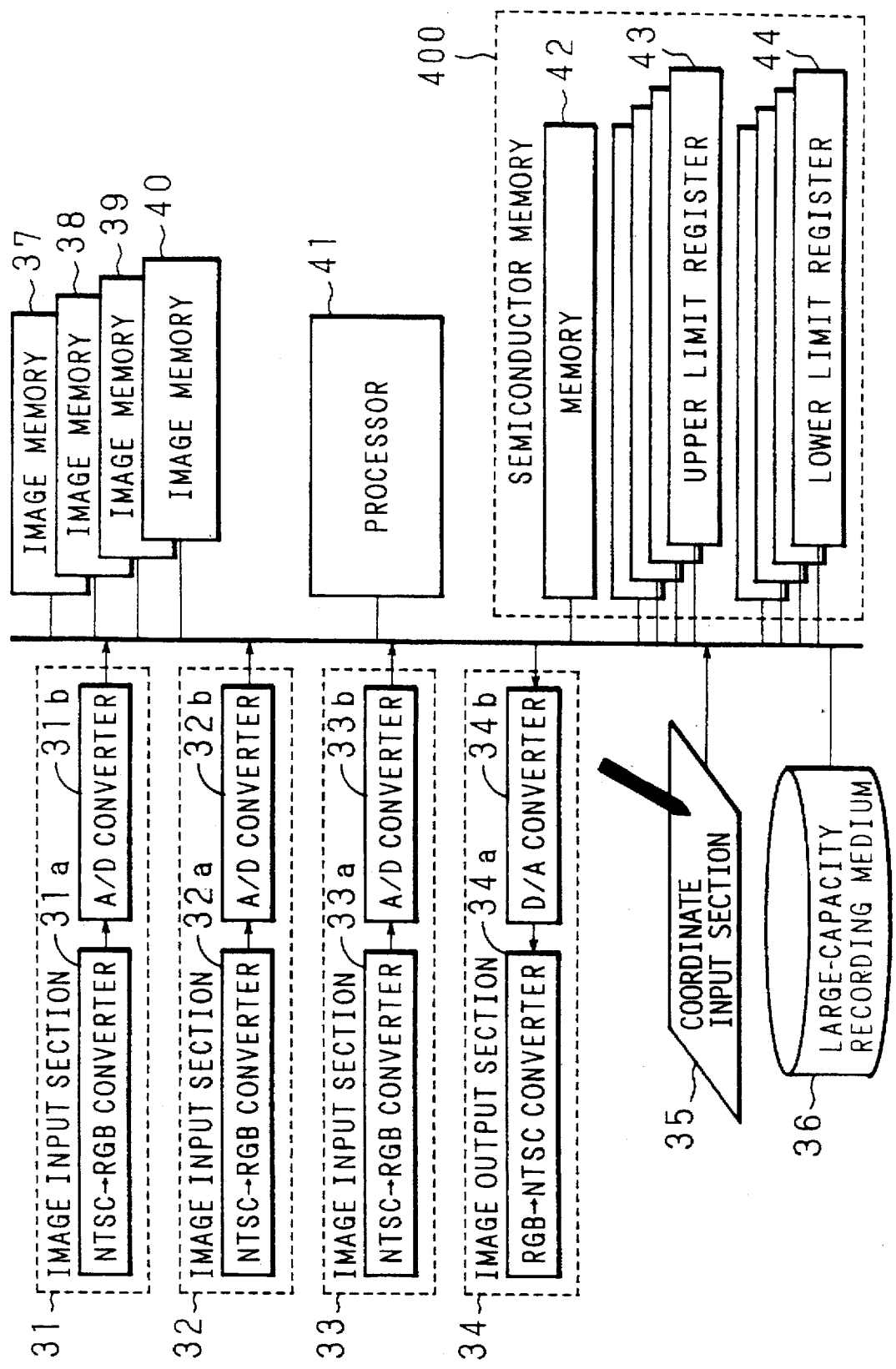
FIG. 25 is a block diagram of a first region-extracting apparatus.

FIG. 25 is a block diagram of a first region extracting apparatus according to the invention of the third group. Three image input sections 31, 32, and 33 arranged in parallel are identical in configuration, including NTSC-RGB converters, 31a, 32a, 33a for converting NTSC signals into analog RGB signals and A/D converters, 31b, 32b, 33b for converting the analog RGB signals into digital RGB signals respectively. Data from the image input sections 31, 32, and 33 are supplied to image memories 37, 38, 39, and 40, each constructed from a dual-port RAM. Image data read out of each memory is supplied to an image output section 34 which outputs the data. The image output section 34 comprises a D/A converter 34b for converting the digital RGB signals from the image memories, 37, 38, 39, and 40, into analog RGB signals, and an RGB-NTSC converter 34a for converting the analog RGB signals into NTSC signals. The output data from the image output section 34 is displayed on a monitor (not shown).

Numeral 35 indicates a coordinate input section, which comprises a light pen, coordinate recognizing means for recognizing the coordinates inputted by the light pen, and so on, and which is used to stroke a portion of the image displayed on the monitor. The coordinate information inputted by the coordinate input section 35 is inputted to a processor 41. Numeral 400 designates a semiconductor memory comprising a memory 42 used for arithmetic operations, and the features upper limit registers 43 and lower limit registers 44 of features to be described later. Numeral 36 denotes a large-capacity recording medium, such as a hard disk, an MO disk, or the like, storing images consisting of a plurality of frames.

The processor 41, constructed from a microprocessor or the like, performs the following processing for region extraction.

Figure 26:
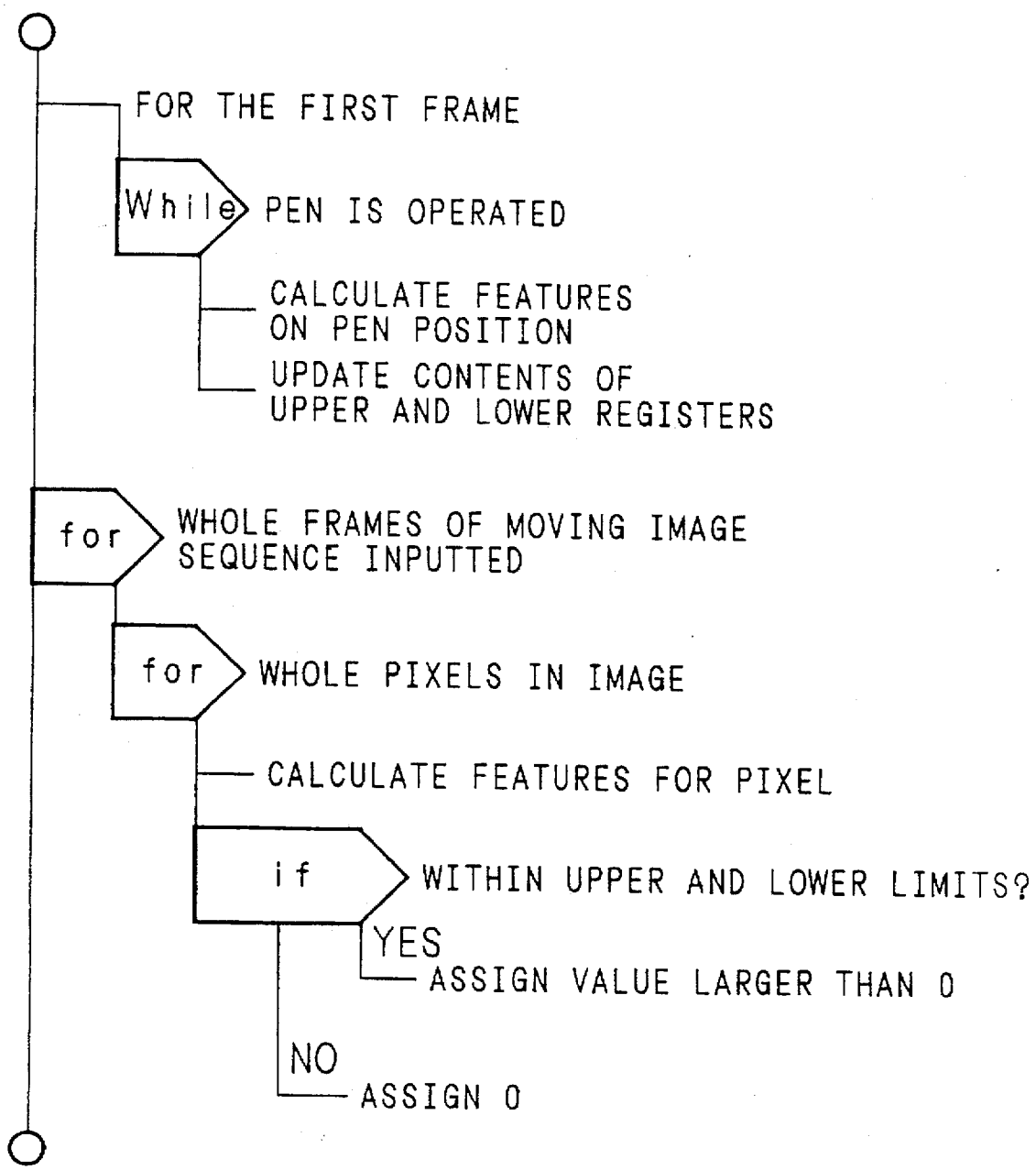
FIG. 26 is a flowchart for region extraction.

FIG. 26 is a flowchart showing the procedure of the processing, and FIGS. 27A and 27B are diagrams for explaining the processing.

As shown in FIG. 27A, the light pen of the coordinate input section 35 strokes over a region to be extracted (the region shown by an hollow space). During this process, values indicating one or a plurality of kinds of features (hereinafter abbreviated features) are calculated for the pixels being sensed by the light pen. The features includes those for R, G, B, hue, saturation, intensity, luminance, and so on . . . The maximum and minimum values of the features are stored into the features upper limit registers 43 and features lower limit registers 44, respectively. The contents of the registers are updated as the light pen is moved. At the end of the stroke, the upper and lower limits of the features are obtained for the area over which the light pen strokes.

Then, features for pixel dots over the entire screen are obtained, and each of the pixels falling within the upper and lower limits is assigned a value larger than 0 (for example, 255), while those pixels outside the upper and lower limits are assigned 0. A key image, that is, an image including the extracted region, can thus be obtained. FIG. 27B shows the result.

When desired extraction has not been made successfully, the selection or combination of the features is changed in various ways, so as to retry the extraction.

By repeating the above processing for each of a plurality of frames, it is possible to process a video image.

Figure 28:
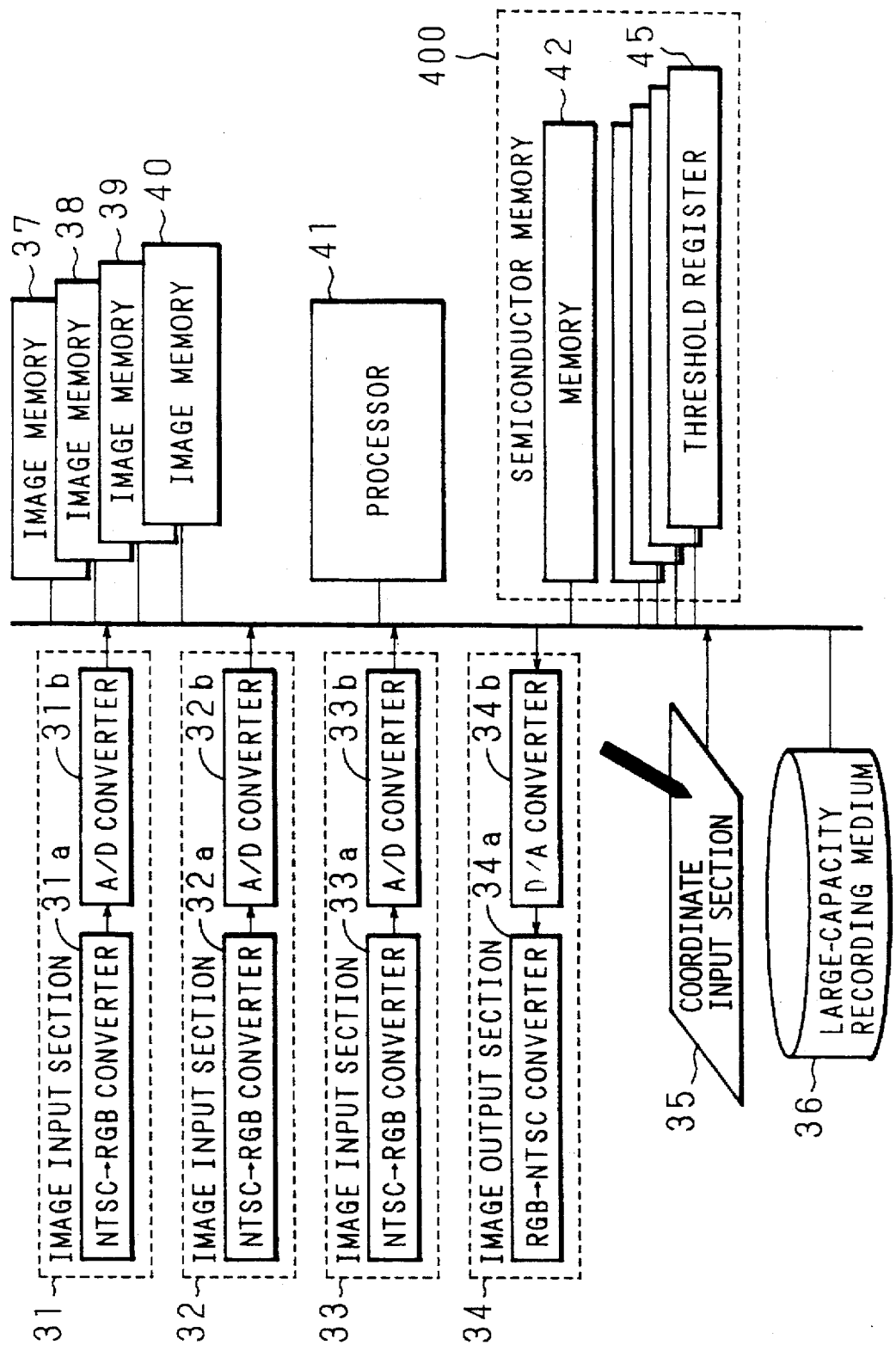
FIG. 28 is a block diagram of a second region-extracting apparatus.

FIG. 28 is a block diagram of a second region extracting apparatus according to the invention of the third group. The difference from the first apparatus is that the semiconductor memory 400 includes features threshold registers 45 in place of the features upper limit registers 43 and features lower limit registers 44. Since, the other configuration is same, a description of the parts designated by the same numerals as those in FIG. 25 will not be repeated here.

Figure 29:
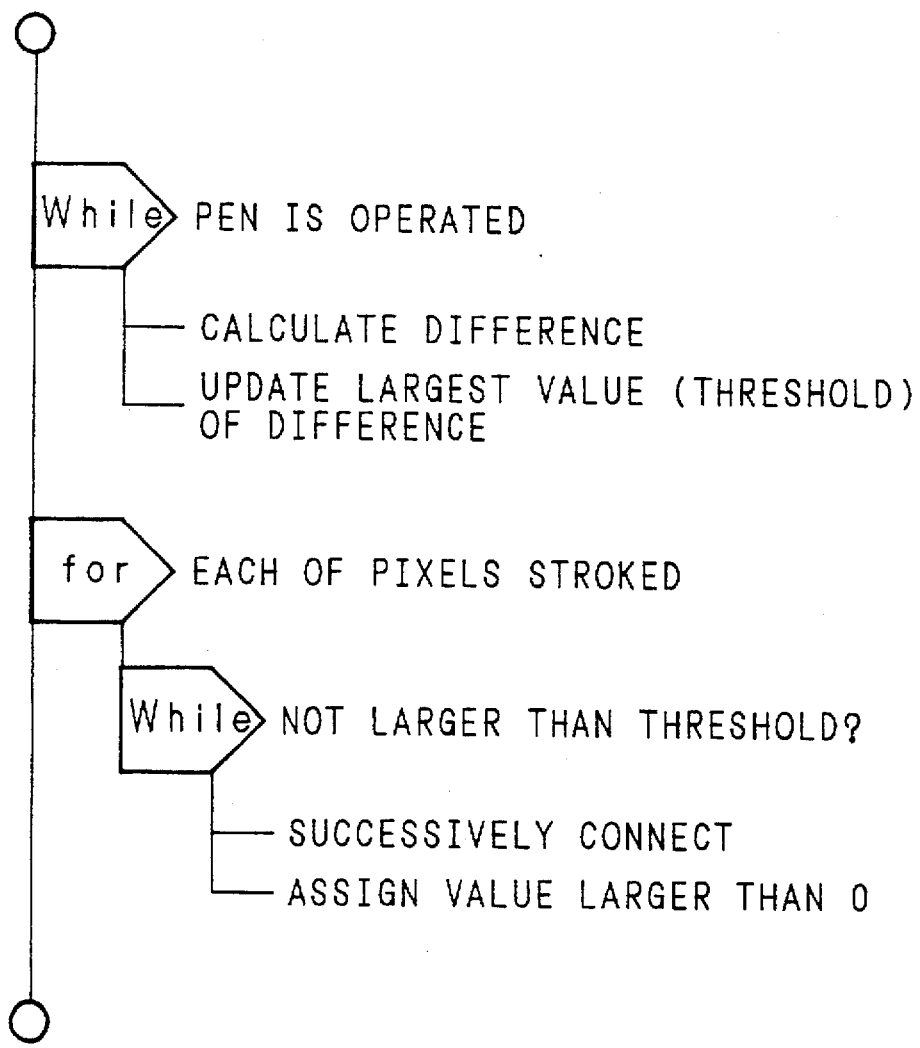
FIG. 29 is a flowchart for region extraction.

FIG. 29 is a flowchart showing the processing performed by the processor 41, and FIGS. 30A and 30B are diagrams for explaining the processing. As shown in FIG. 30A, the features of the pixels being stroked with the light pen are obtained. This is basically the same as the processing in the first apparatus, but the difference is that, in the second apparatus, the difference in features between adjacent pixels stroked with the pen is calculated, and the largest value is stored in the corresponding features threshold register 45. Then, for each of the pixels stroked with the pen, its adjacent pixels (four adjacent pixels or eight adjacent pixels) are examined to determine whether their features difference is larger than the threshold or not, and those adjacent pixels whose difference of features is not larger than the threshold are successively connected (FIG. 30B). The region thus connected is assigned a value larger than 0.

Figure 31:
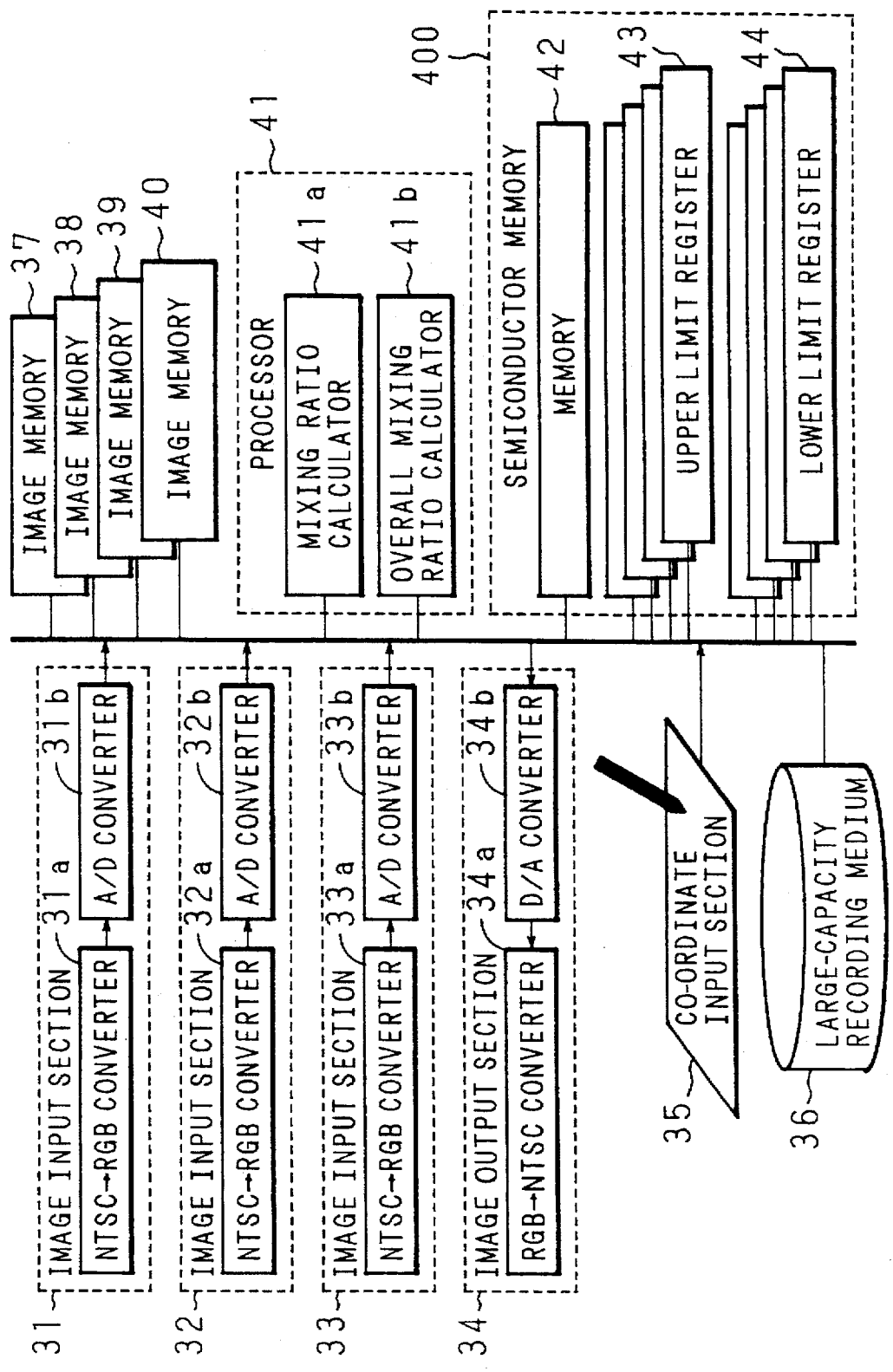
FIG. 31 is a block diagram of third to sixth region-extracting apparatuses.

FIG. 31 is a block diagram of the third to sixth region-extracting apparatuses according to the invention of the third group. The difference from the first apparatus lies in the calculation operation performed by the processor 41 which comprises a mixing ratio calculator 41a and an overall mixing ratio calculator 41b. The calculation operation will be described below.

Figure 32:
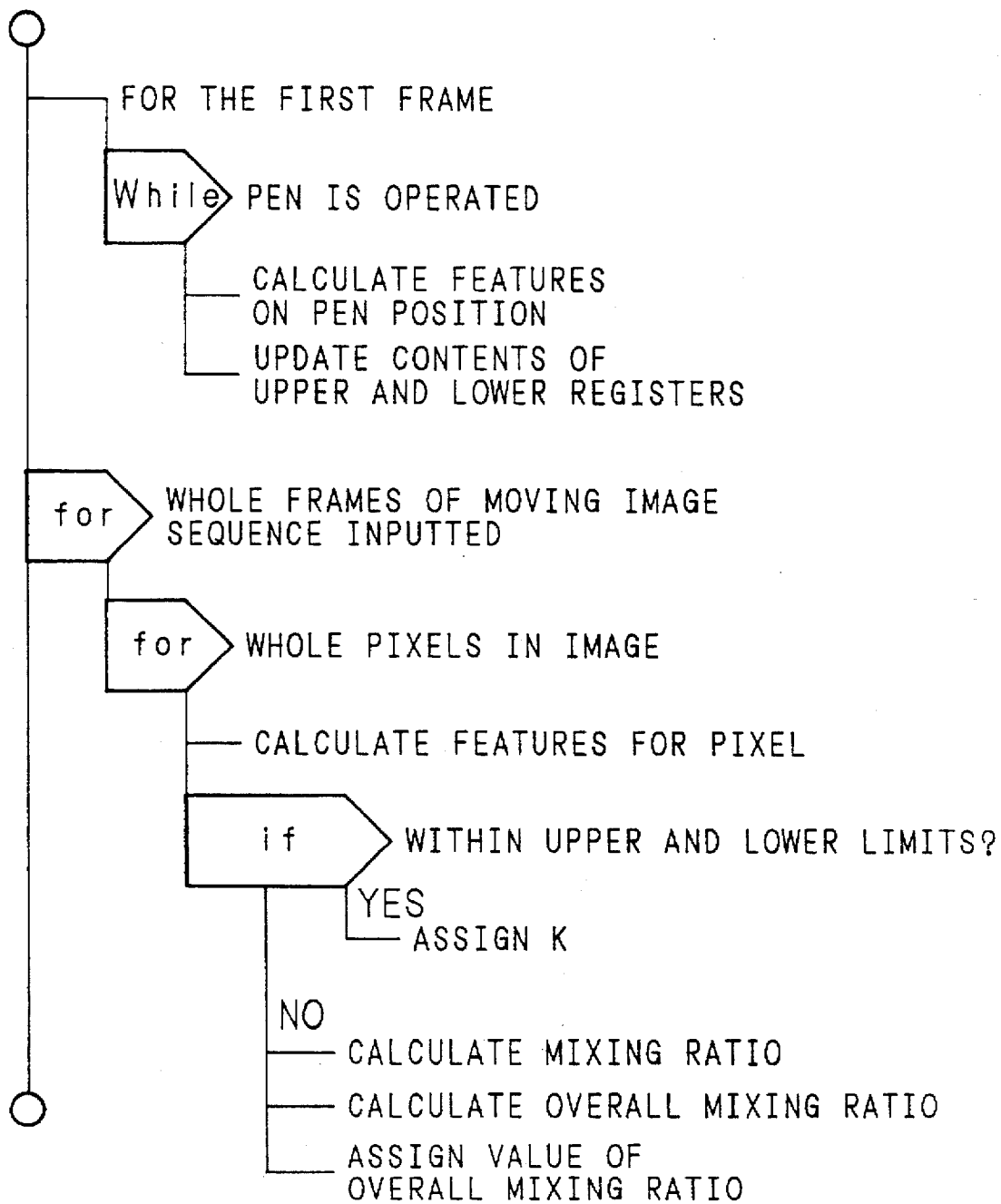
FIG. 32 is a flowchart for region extraction.

FIG. 32 is a flowchart showing the procedure of the processing performed in the processor 41. As in the first apparatus, the features are calculated for the pixels stroked with the pen, and the maximum and minimum values are placed into the features upper limit registers 43 and features lower limit registers 44, respectively.

Next, features are calculated for all the pixels of the image, and the pixels are examined as to whether their values are within the upper and lower limits stored in the features upper limit registers 43 and features lower limit registers 44; each of the pixels falling within the limits is assigned a nonzero value K. For the pixels outside the limits, the difference between the calculated features and the upper limit value (when the features are larger) or the difference between the calculated features and the lower limit value (when the features are smaller) is calculated, and in accordance with the difference thus calculated, a value mixing ratio) intermediate between K and 0 is determined for each feature. Then, an overall mixing ratio is obtained by calculating the weighted average of mixing ratios for each feature, and values proportional to the overall mixing ratio are assigned to the corresponding pixels. Thus, the extracted image with gradations applied along its boundary is obtained. The above processing is repeated for each of a plurality of frames when processing a moving image.

Figure 34:
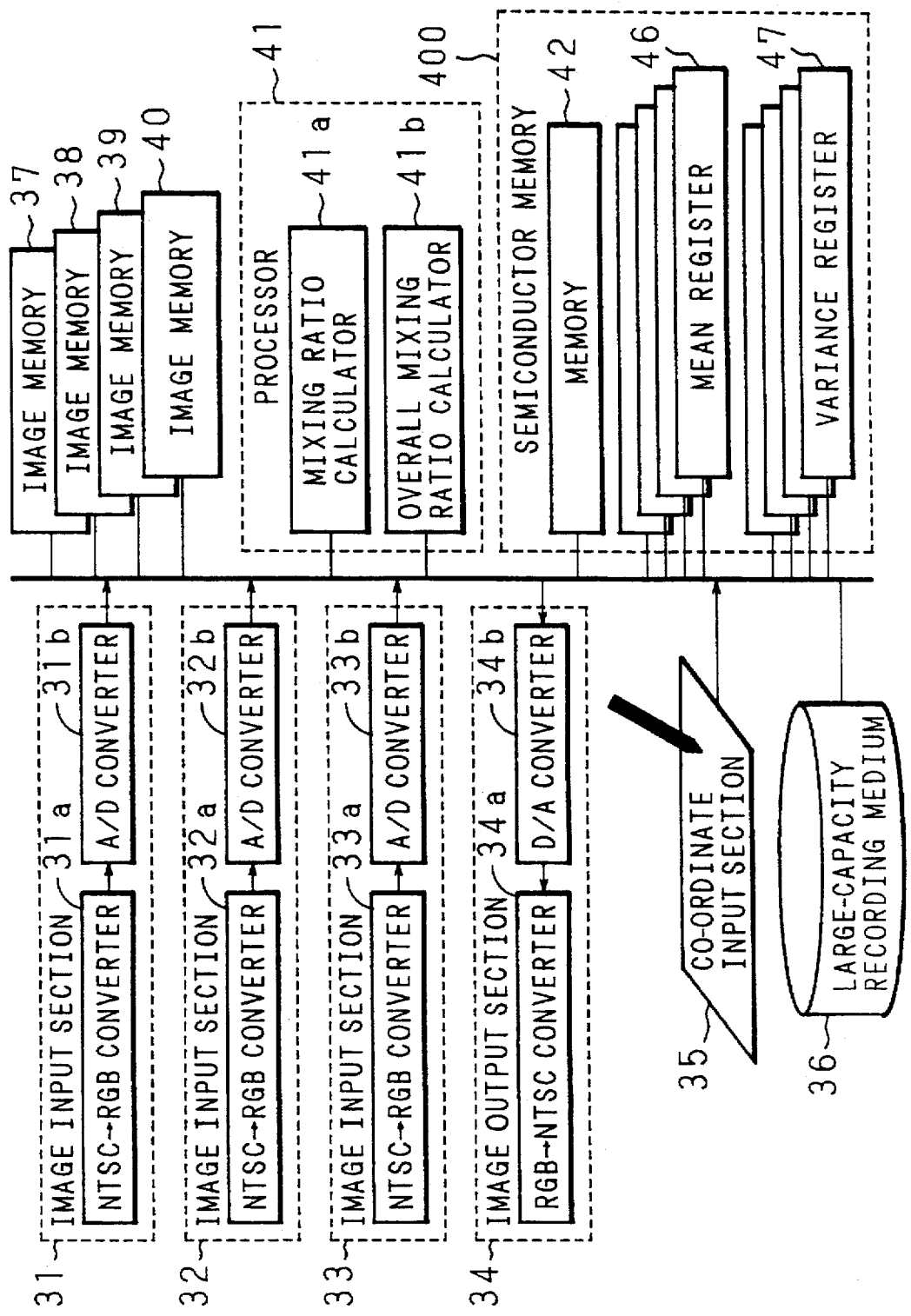
FIG. 34 is a block diagram of third, fourth, seventh, and eighth region-extracting apparatuses.

FIG. 34 is a block diagram of the third, fourth, seventh, and eighth region-extracting apparatuses according to the invention of the third group. The difference from the apparatus of FIG. 31 is that the features upper limit registers 43 and features lower limit registers 44 are replaced by features mean registers 46 and features variance registers 47.

Figure 35:
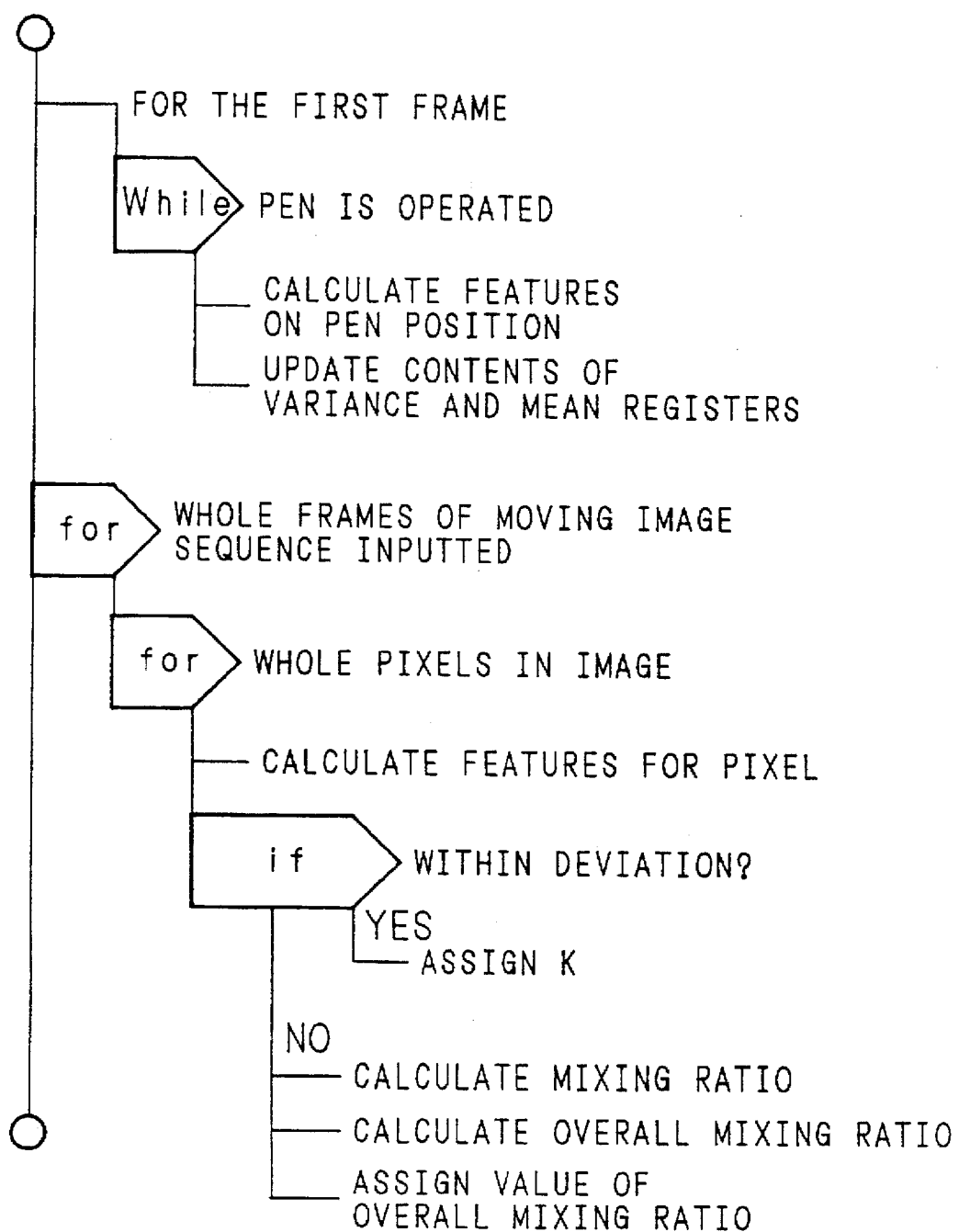
FIG. 35 is a flowchart for region extraction.
Figure 36A:
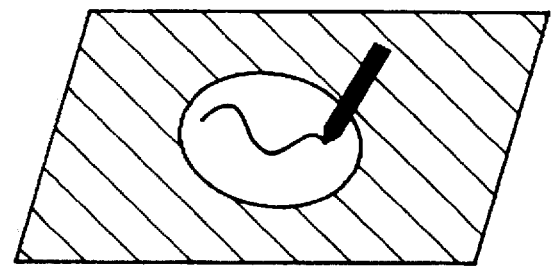
FIG. 36A is a diagram for explaining region extraction.

FIG. 35 is a flowchart showing the procedure of the processing performed in the above apparatus. Features are calculated for the pixels stroked with the pen as shown in FIG. 36A, and the mean and variance of the features are calculated, and stored in the corresponding features mean register 46 and variance register 47.

Figure 36B:
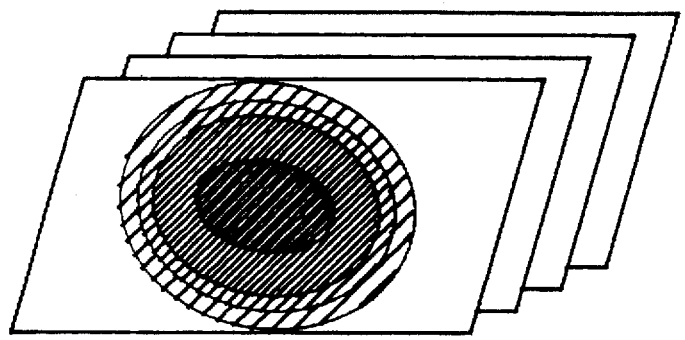
FIG. 36B is a diagram for explaining region extraction.

In this apparatus, the features for all the pixels of the image are examined as to whether they fall within a prescribed deviation (for example, mean ± variance), and those pixels falling within the prescribed range are assigned K. For those pixels outside the prescribed range, the mixing ratio is calculated for each feature in accordance with the deviation from the mean, and the weighted average of the calculated values is obtained as an overall mixing ratio, and in accordance with which a value is assigned. FIG. 36B shows the result, an extracted image having gradations along its boundary is obtained.

Figure 37:
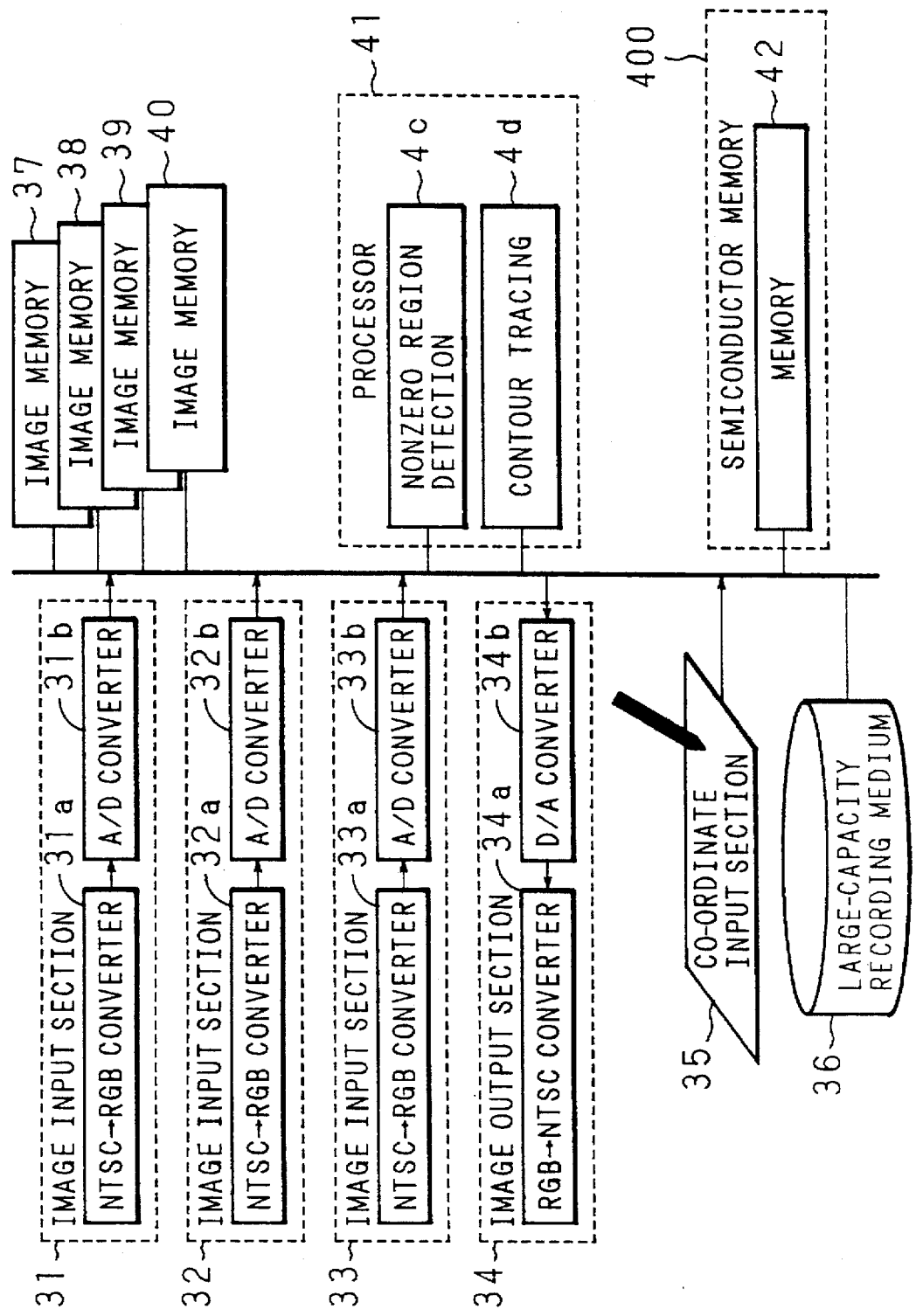
FIG. 37 is a block diagram of third and fourth region-extracting apparatuses.
Figure 39:
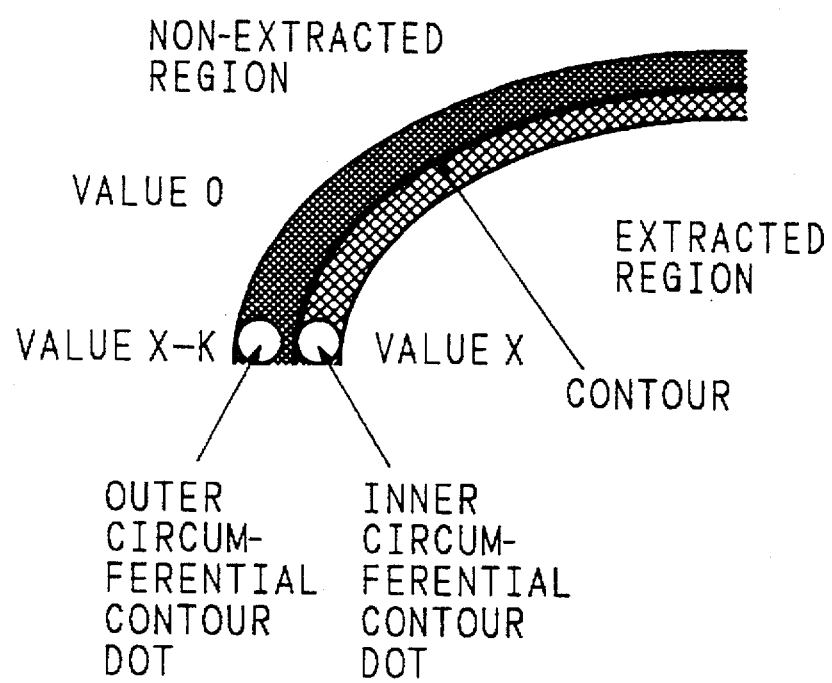
FIG. 39 is a diagram for explaining edge processing.
Figure 40:
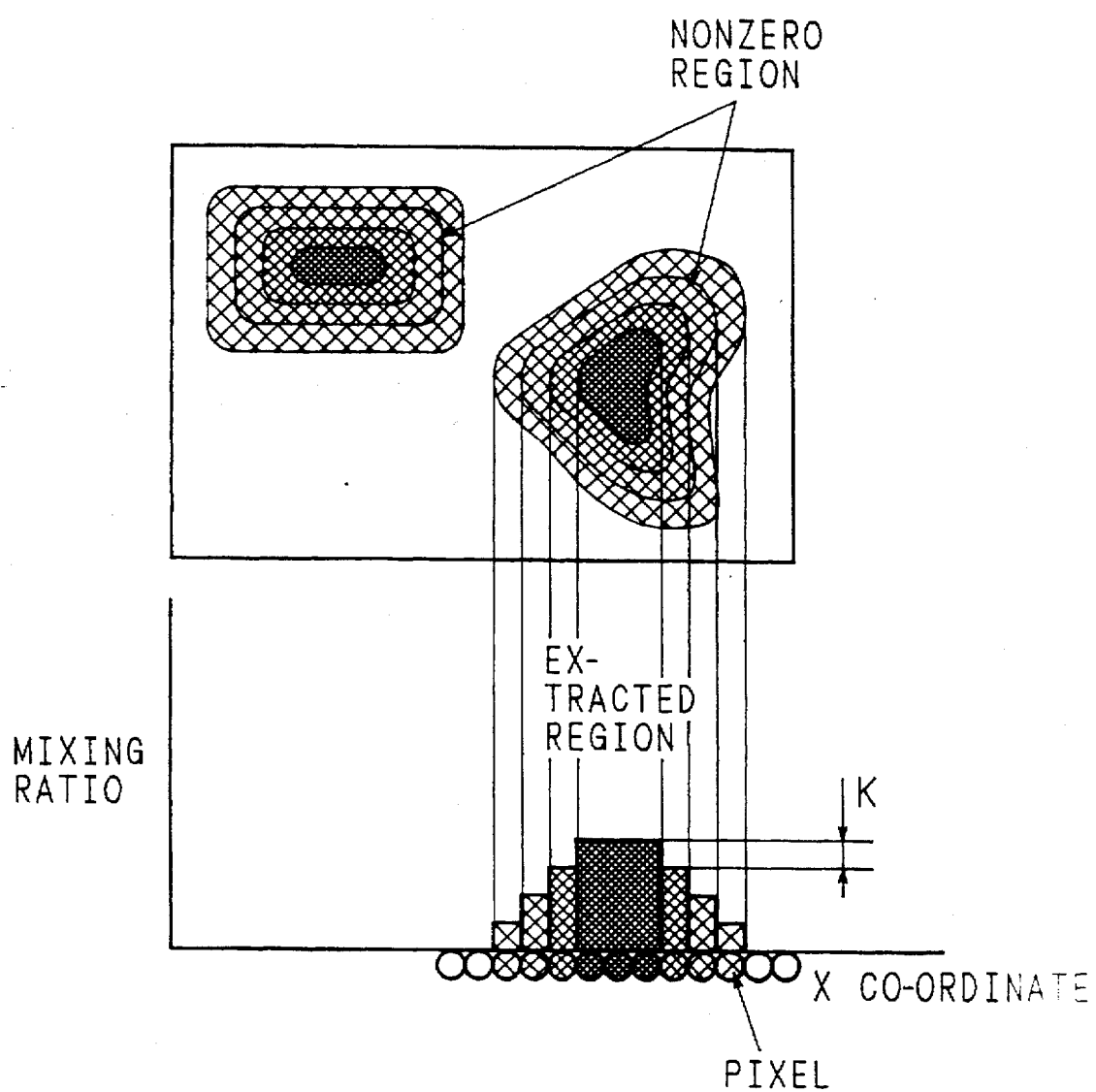
FIG. 40 is a diagram for explaining edge processing.

FIG. 37 is a block diagram showing another embodiment of the third and fourth region-extracting apparatuses according to the invention of the third group. This apparatus differs from the other apparatus in the processing performed in the processor 41. The processing will be described in detail with reference to FIGS. 39 and 40. In this embodiment, value X of an inner circumferential contour dot (pixel) lying at the inside of a contour (formed between pixels) between the extracted region obtained by the first region extracting apparatus, and so on and the non-extracted region (which is assigned a value 0) is reduced by constant K, and the resultant value is assigned to an outer circumferential contour dot (pixel) lying on the outside of the contour. This processing may be applied to one pixel lying in the centrifugal direction, but by applying this processing to a plurality of pixels, as shown in FIG. 40, a smoother edge can be obtained.

Figure 38:
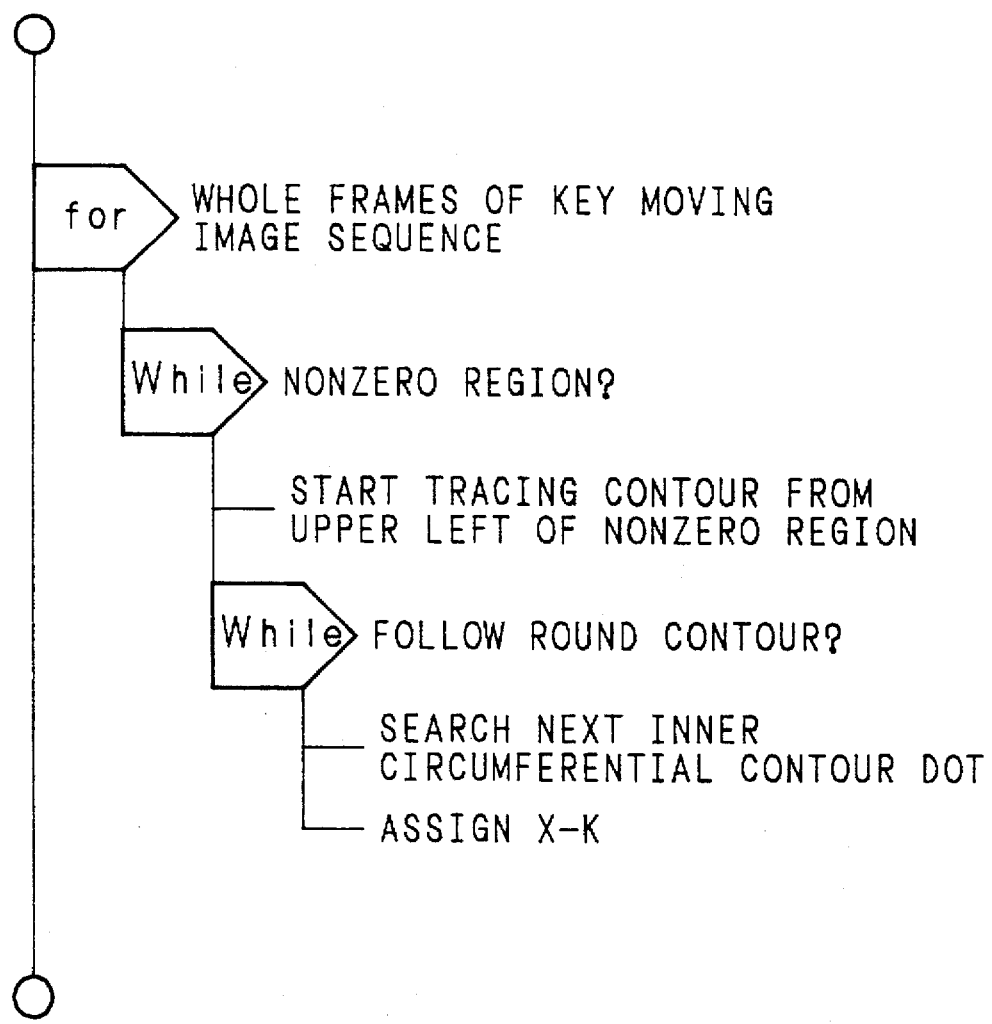
FIG. 38 is a flowchart for edge processing.

FIG. 38 is a flowchart showing a procedure of the above processing. As shown, the processing is repeated by following the contour starting from the upper left of the screen. By applying this process to a plurality of frames, it is possible to process a video image.

Figure 41:
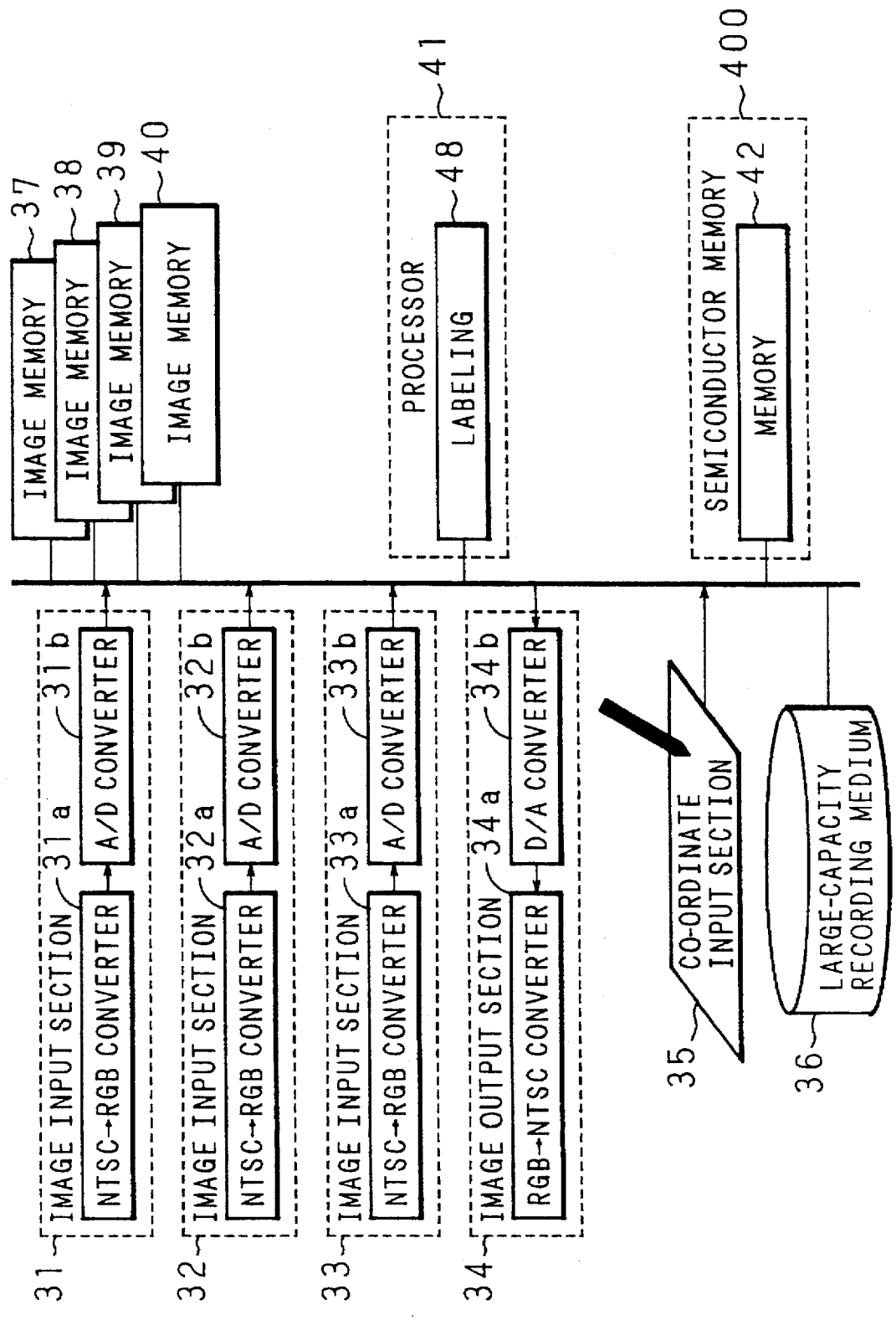
FIG. 41 is a block diagram of a tenth region-extracting apparatus.
Figure 43A:
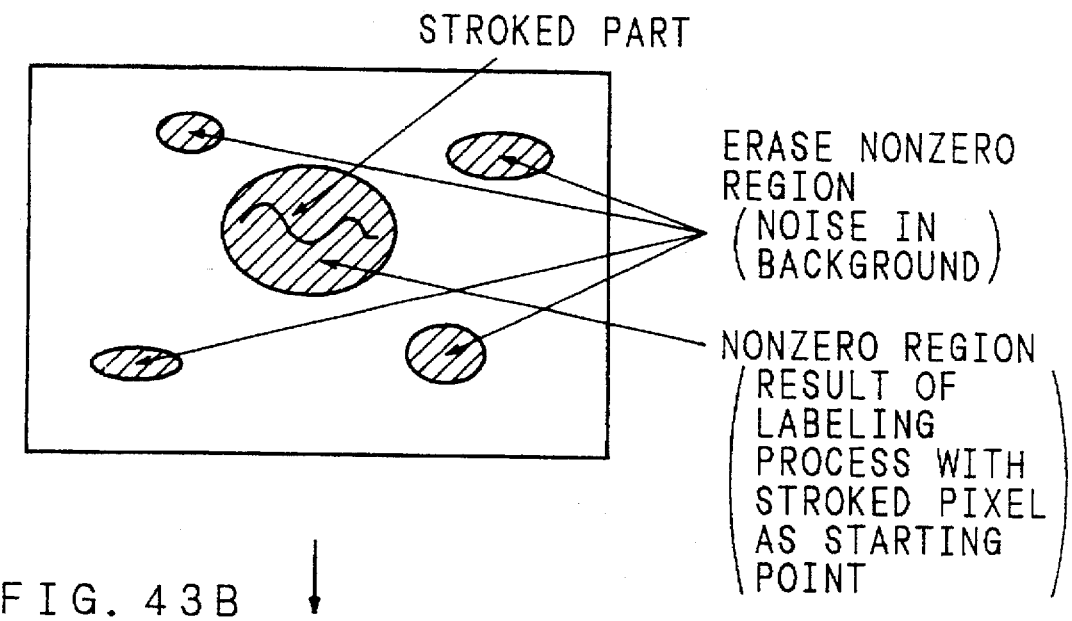
FIG. 43A is a diagram for explaining noise erasure.

FIG. 41 is a block diagram of a ninth region-extracting apparatus. In this apparatus, the processor 41 performs labeling (48) to be described later, to eliminate noise or unwanted portions appearing in the extracted region. This processing is performed on the key image (FIG. 43A) obtained, for example, by the first region-extracting apparatus, and so on This image contains, in addition to the center region to be extracted, noise regions (nonzero regions) having the similar features.

Figure 42:
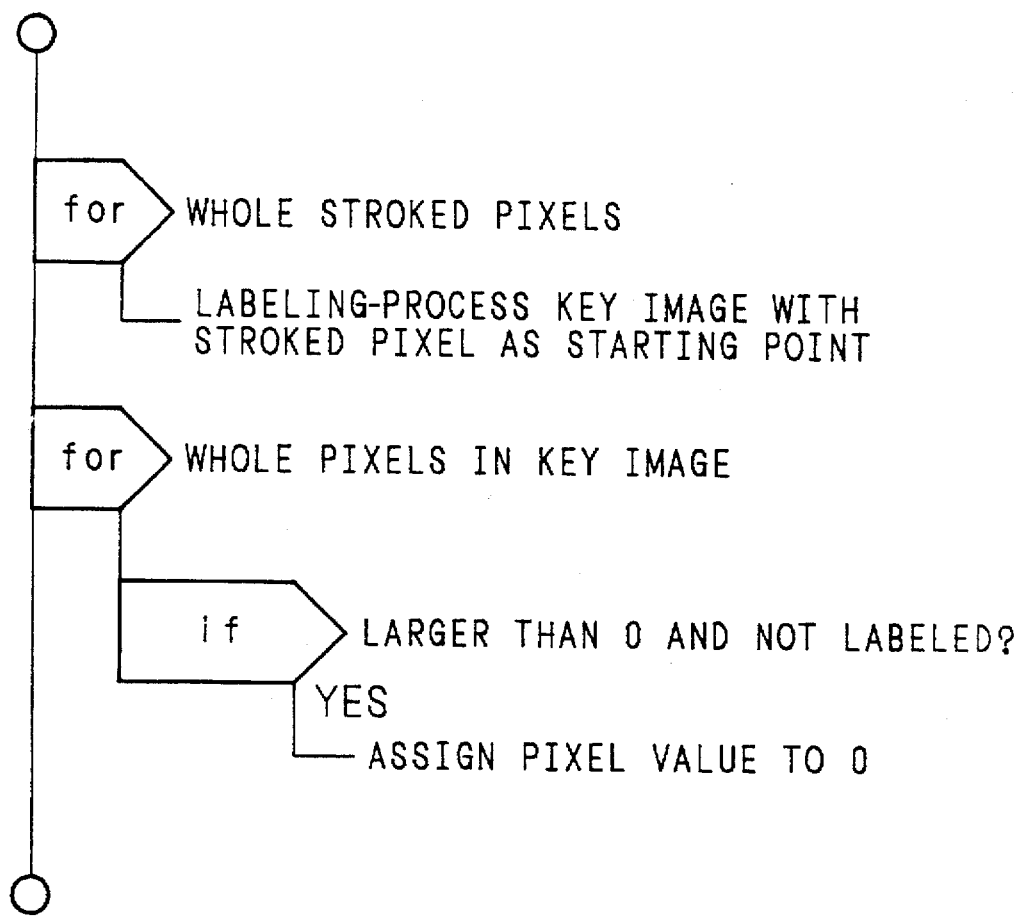
FIG. 42 is a flowchart for noise erasure.
Figure 43B:
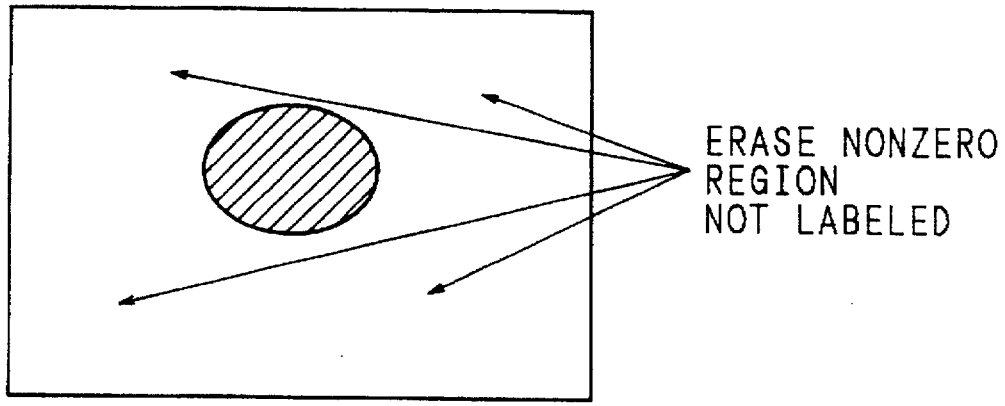
FIG. 43B is a diagram for explaining noise erasure.

FIG. 42 is a flowchart for the above processing. In this processing, 4-connected or 8-connected labeling is performed with a pixel stroked with a pen as the starting point. Since the nonzero noise regions are discrete, the labeling is not applied to these regions. Next, the non-labeled regions are erased. As a result, the desired extracted region can be obtained, as shown in FIG. 43B.

Figure 44:
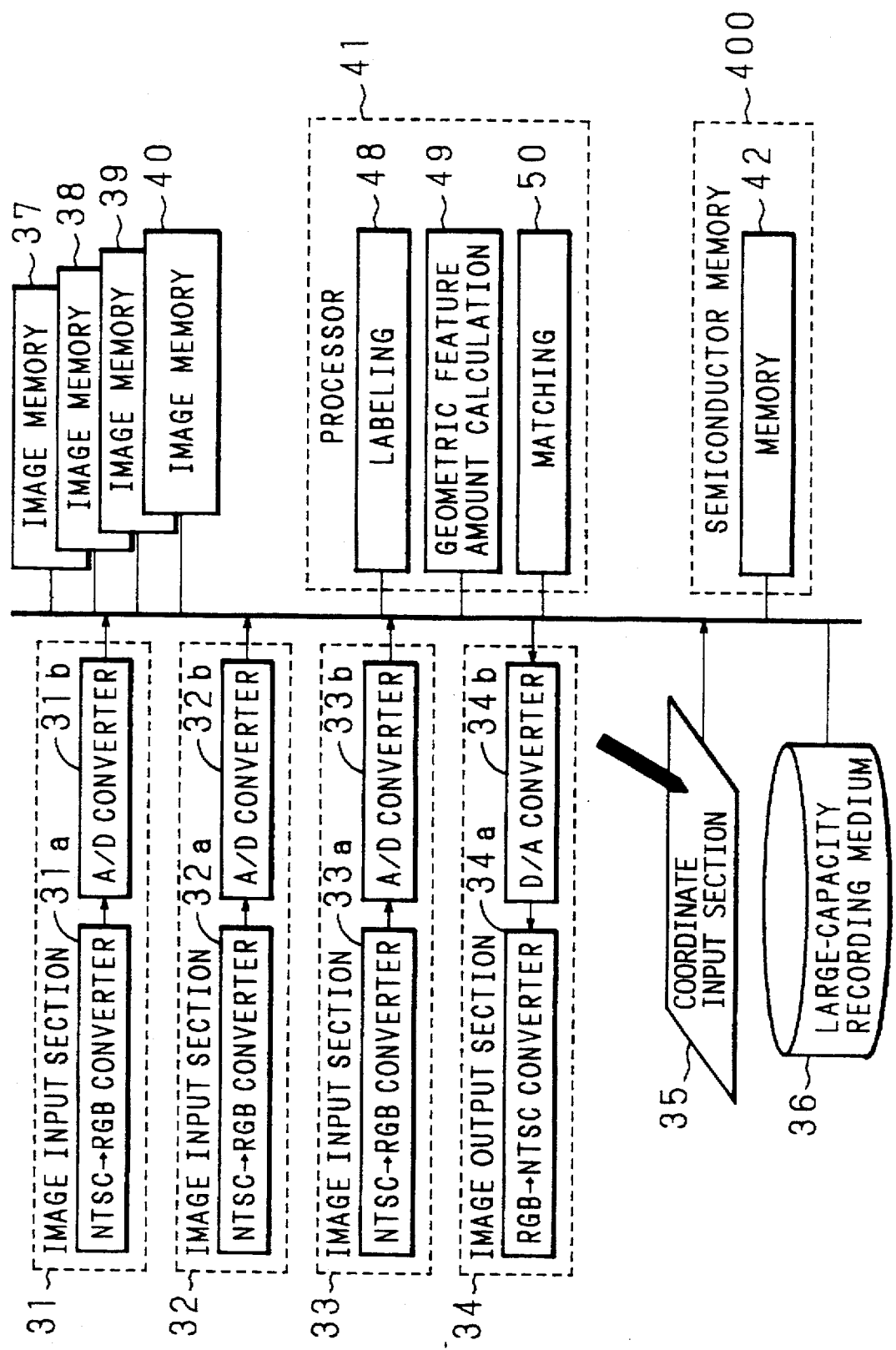
FIG. 44 is a block diagram of a 10th region-extracting apparatus.
Figure 45:
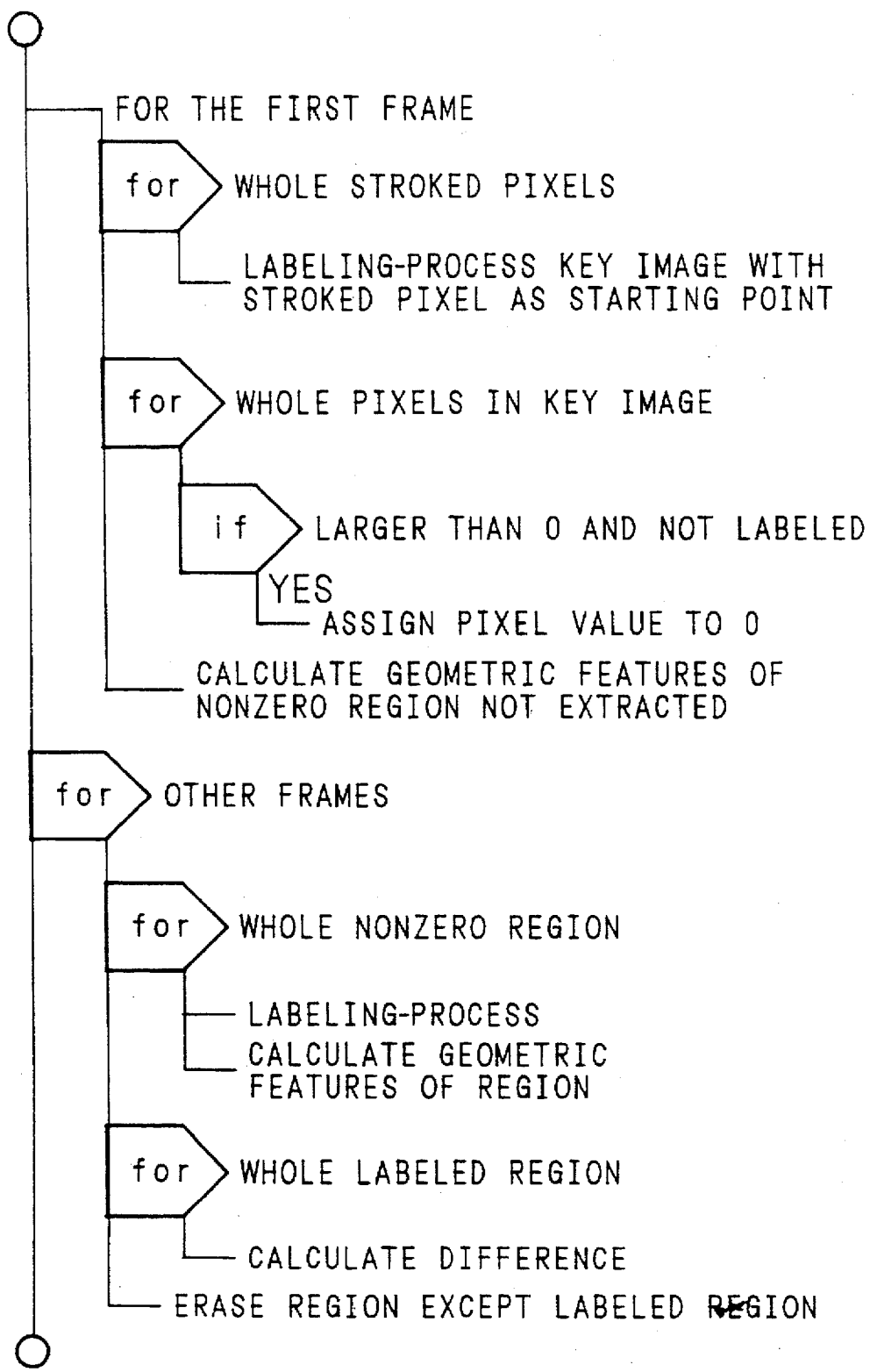
FIG. 45 is a flowchart for noise erasure.

FIG. 44 is a block diagram of a 10th region-extracting apparatus. This apparatus is capable of processing a video image; that is, the same processing as provided by the ninth region-extracting apparatus is performed on one frame only, and noise elimination can be accomplished for the subsequent frames by simple processing. To achieve this, the processor 41 performs processing (49) for calculating geometric features (for example, area, center position) for the stroked region and the corresponding regions in other frames, and matching (50) for matching the regions having close geometric features within each frame. FIG. 45 is a flowchart showing this processing, and FIGS. 46A, 46B, and 46C are diagrams for explaining the processing. The same processing as performed in the ninth region-extracting apparatus is applied to the first frame, to eliminate noise as shown in FIG. 46A. Then, geometric features are calculated for the remaining nonzero region which is the region to be extracted.

Next, geometric features are calculated for the nonzero regions (including noise regions) in the second frame. Then, the region having the geometric features closest to those of the nonzero region in the first frame is selected, and the other regions are erased (not extracted). Thereafter, the same processing is repeated for each pair of adjacent frames, thus automatically erasing the noise regions.

Figure 47:
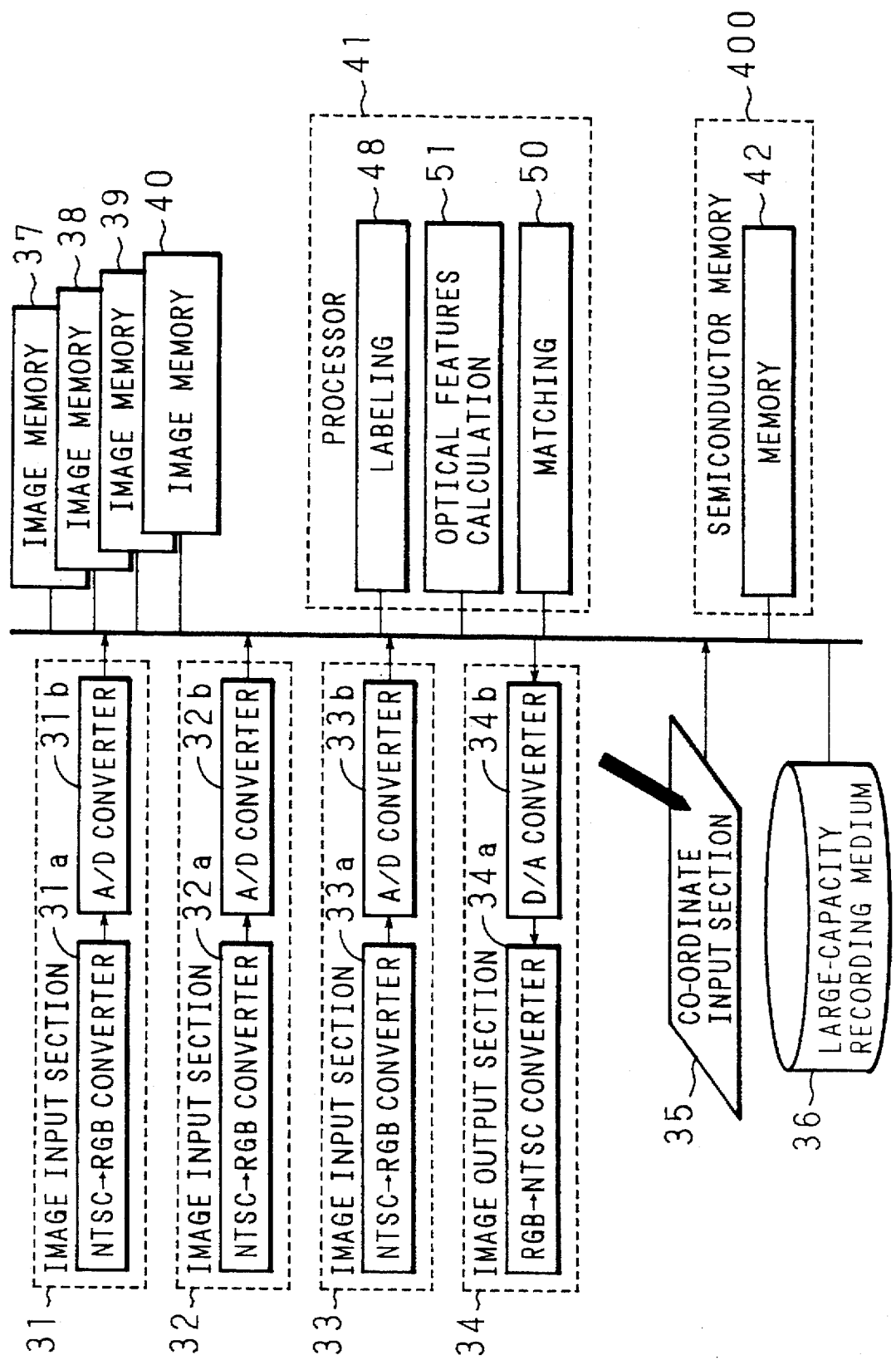
FIG. 47 is a block diagram of an 11th region-extracting apparatus.

FIG. 47 is a block diagram of an 11th region-extracting apparatus. While the 10th apparatus identifies regions in a frame by using their geometric features, the 11th apparatus uses optical (texture) features. To achieve this, the processor 41 performs optical features calculation (51) to analyze pixel value.

Figure 48:
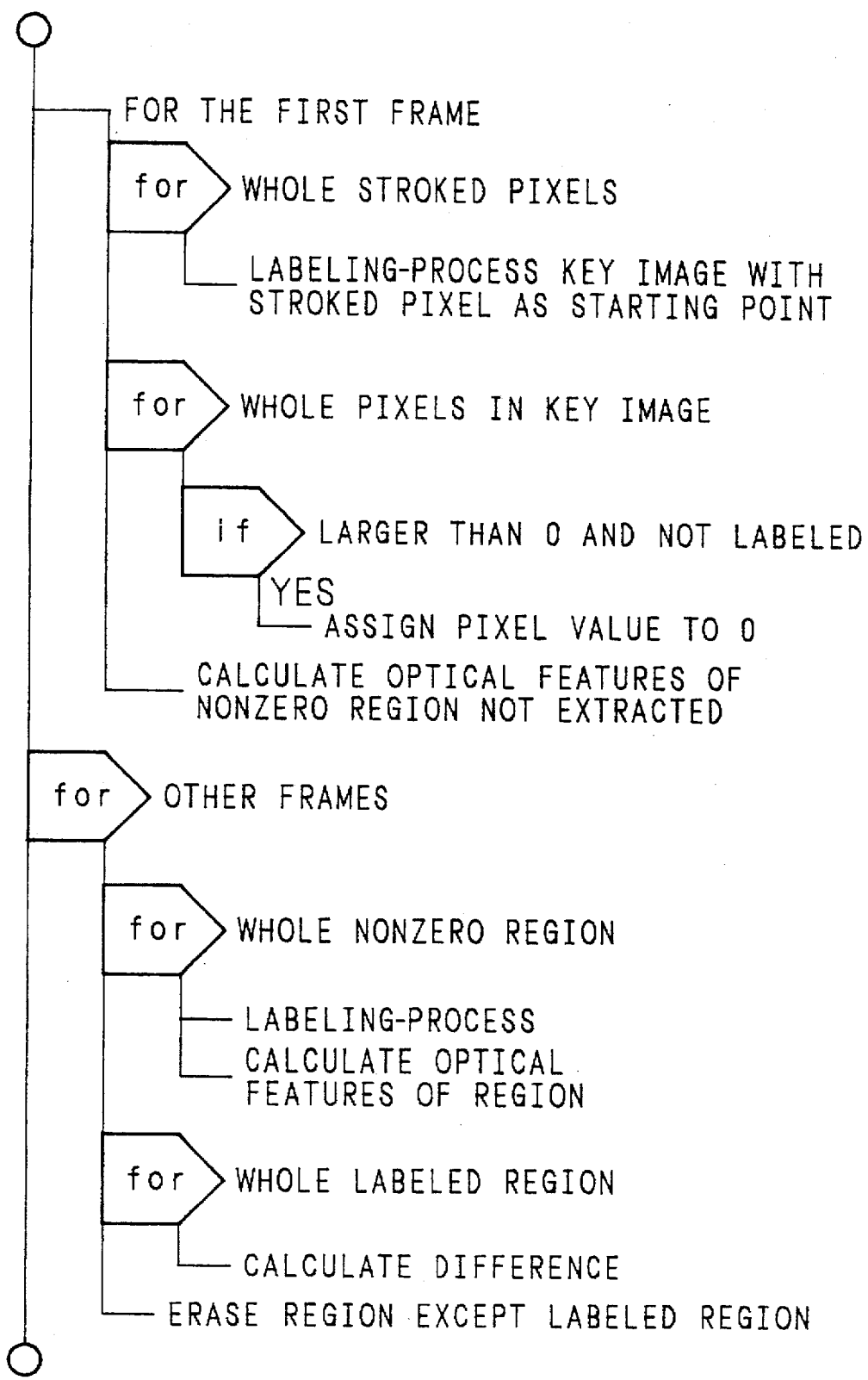
FIG. 48 is a flowchart for noise erasure.
Figure 49A:
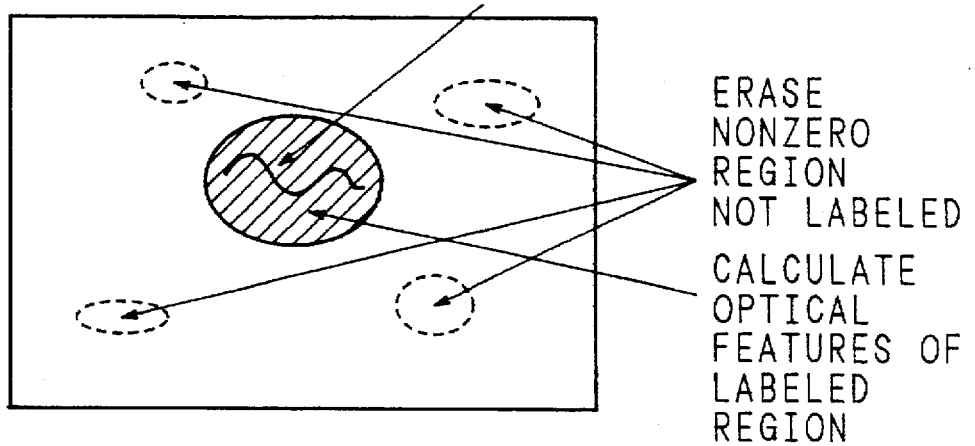
FIG. 49A is a diagram for explaining noise erasure.
Figure 49B:
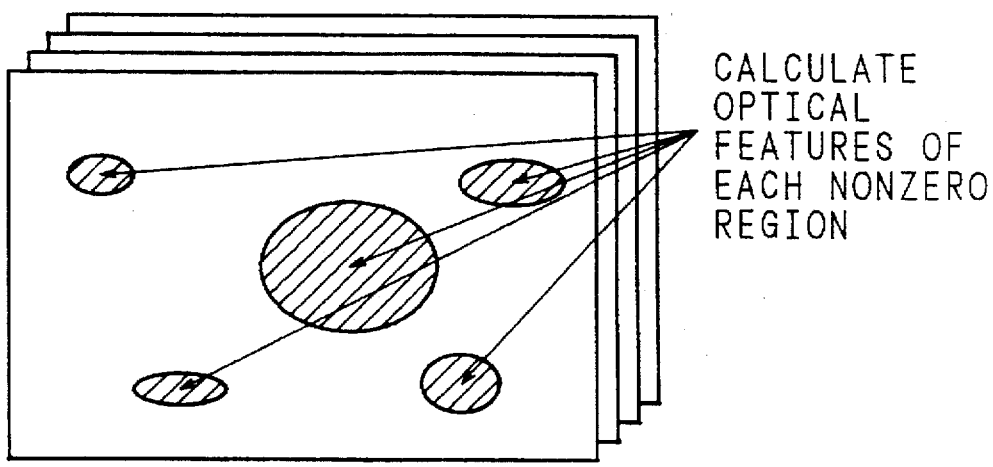
FIG. 49B is a diagram for explaining noise erasure.
Figure 49C:
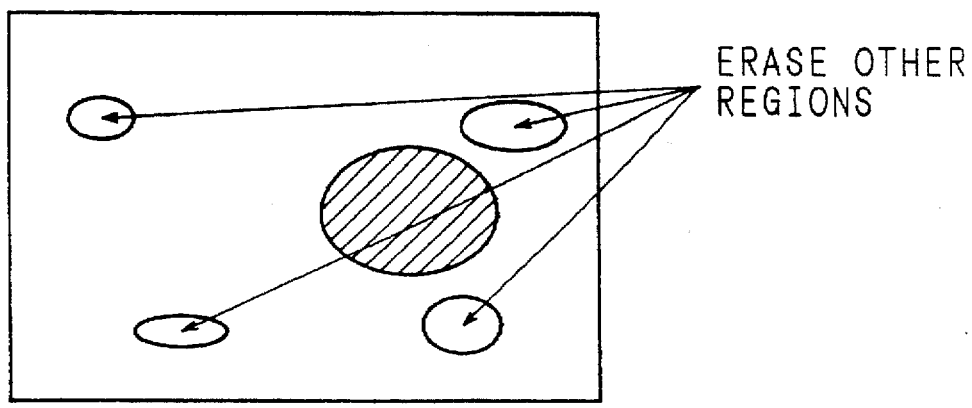
FIG. 49C is a diagram for explaining noise erasure.

FIG. 48 is a flowchart for noise elimination, and FIGS. 49A, 49B, and 49C are diagrams for explaining the processing. Further explanation is omitted since the processing is tan same as that in the foregoing apparatus, except that the geometric features are replaced by optical features.

According to the invention of the third group described above, there is no need to provide an extra facility, i.e. the blue background. Furthermore, extraction is possible from an image not specifically intended for image synthesis. Moreover, the operation is simple, requiring only stroking the desired portions.

[invention of Fourth Group]

Next, the invention of the fourth group will be described which is concerned with the processing of CG models (including three-dimensional shape models extracted from images) and the changing of the processing mode. More particularly, the invention of the fourth group is concerned with displaying of a three-dimensional shape wherein rotation, scaling, and translation transformations are applied to a three-dimensional shape model displayed in two dimensions on a display screen by using an interactive method, with the result of each transformation being redisplayed successively.

Figure 50:
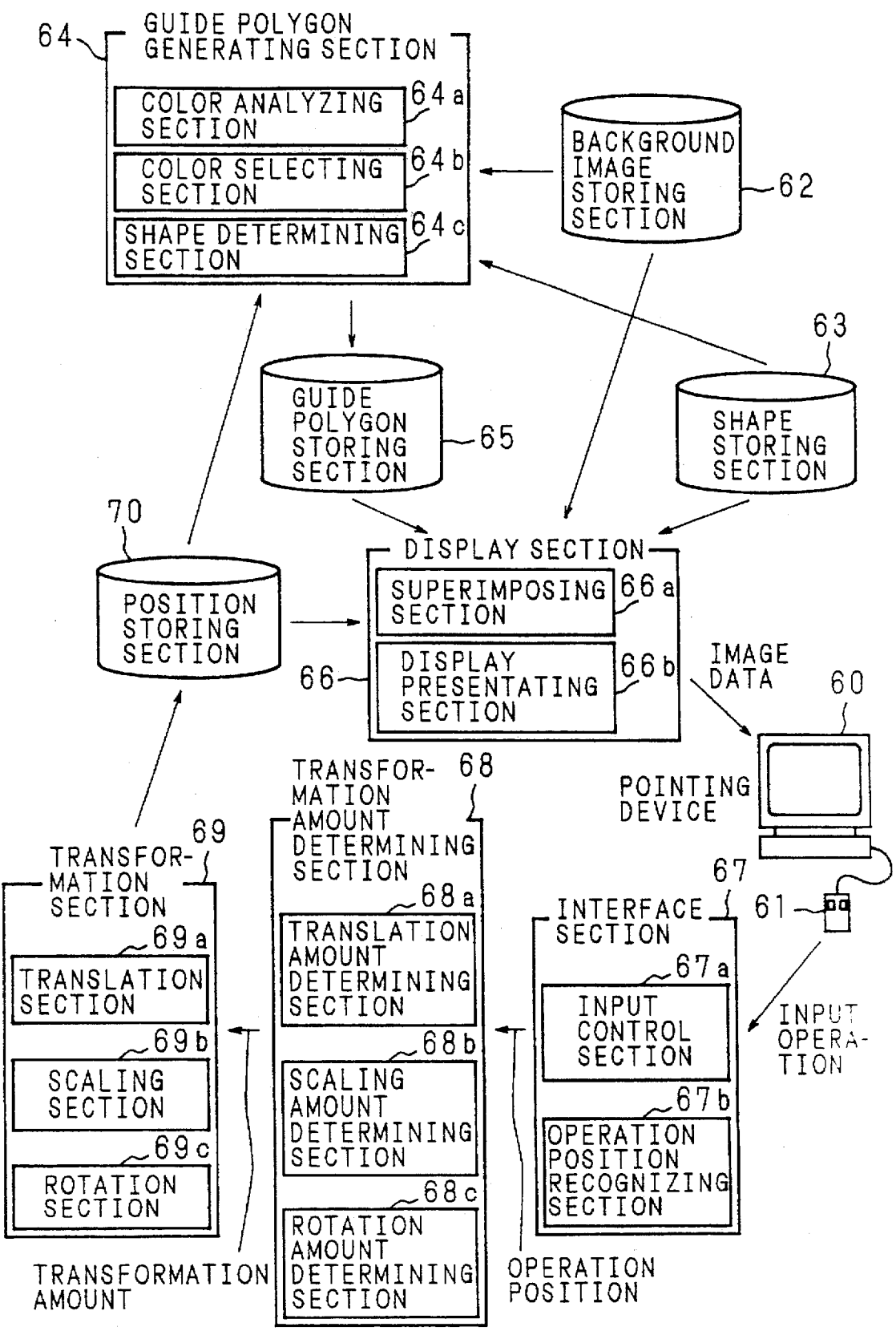
FIG. 50 is a block diagram of a three-dimensional shape model display apparatus.

FIG. 50 is a block diagram showing a three-dimensional shape model display apparatus according to the invention of the fourth group. In the figure, numeral 60 designates a display device equipped with a pointing device 61 such as a mouse. The shapes and positions of three-dimensional shape models are stored in a shape storing section 63 and a position storing section 70, respectively. Background images are stored in a background image storing section 62.

A guide polyhedron generating section 64, comprising a color analyzing section 64a, a color selecting section 64b, and a shape determining section 64c, determines the size and color of a guide polyhedron which will become necessary in subsequent processing. The color analyzing section 64a retrieves color information of a background image from the background image storing section 62, and color information of a three-dimensional shape model is retrieved from the shape storing section 63, to be analyzed, while the color selecting section 64b selects a color that does not affect the visibility of the background and three-dimensional shape model and that is easy to recognize. The shape determining section 64c determines the shape and dimensions of the guide polyhedron to be displayed.

Figure 51:
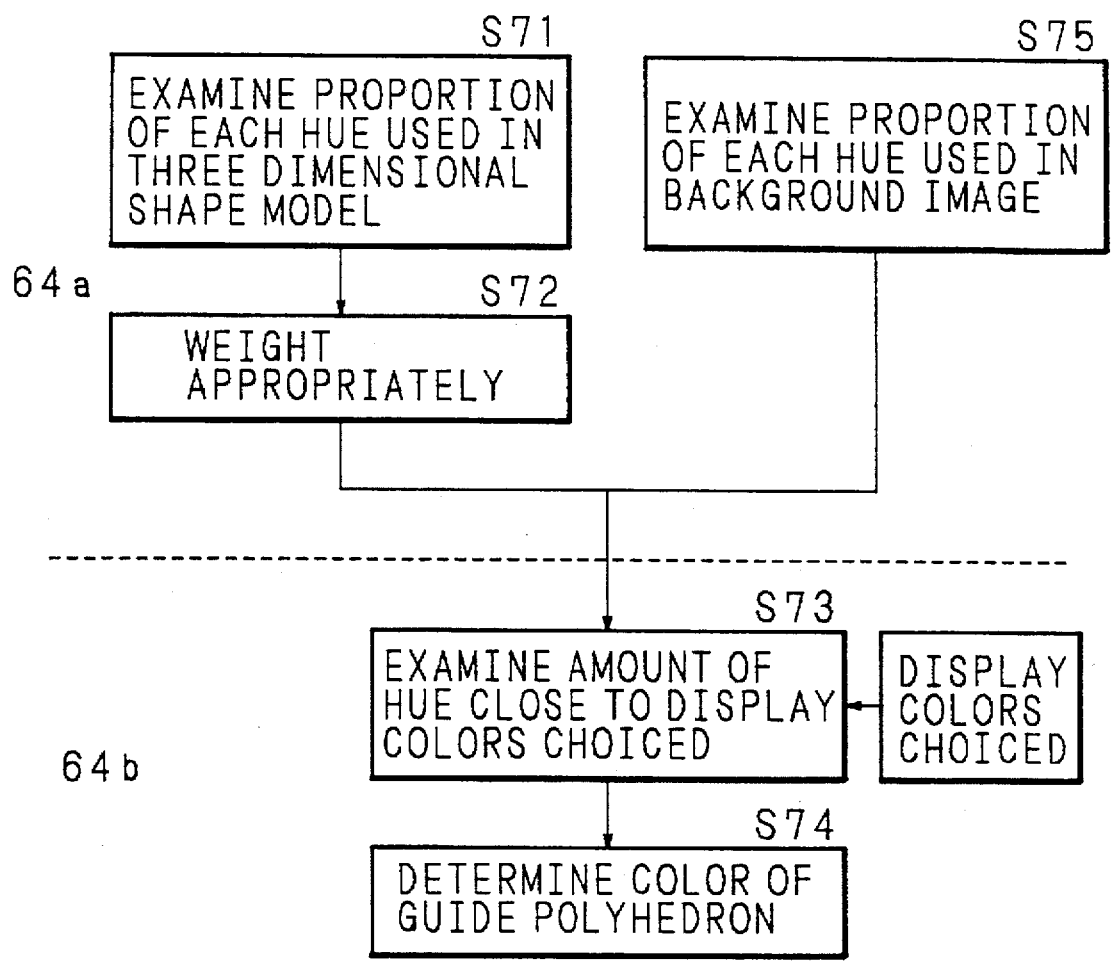
FIG. 51 is a flowchart for selecting a guide polyhedron color.
Figure 52:
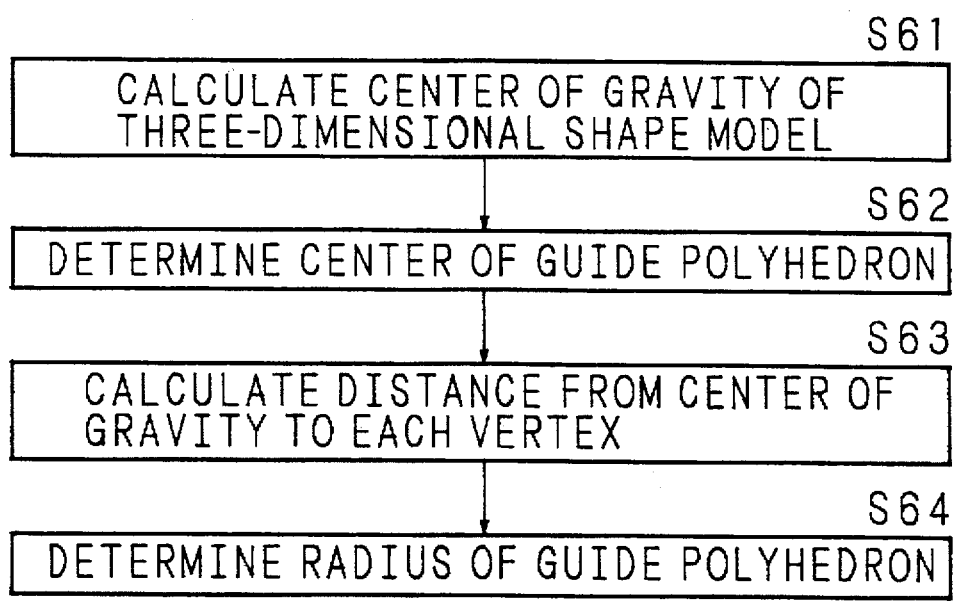
FIG. 52 is a flowchart for determining a guide polyhedron shape.

FIG. 51 is a flowchart showing the procedure for color selection, and FIG. 52 is a flowchart showing the procedure for determining the shape and dimensions. First, information on the background image and information on the three-dimensional shape model are retrieved from the background image storing section 62 and the shape storing section 63, respectively. Then, the proportion of each hue used in the background image is examined (S75), and likewise, the proportion of each hue used in the three-dimensional shape model is examined (S71). The hues used in the three-dimensional shape model are then weighted appropriately (S72). The processing up to this point is performed in the color analyzing section 64a. The subsequent steps are performed in the color selecting section 64b. In accordance with the result of the above analysis, the amount of hues close to that used in the image is examined from a list of display color choices prepared in advance (S78). Then, from these display color choices, a color having a hue least close to the above hues is selected and determined as the color of the guide polyhedron (S74).

Next, the process for determining the shape and position will be described.

First, data are read from the shape storing section 63 and position storing section 70, and the center of gravity of the three-dimensional shape model is calculated (S61). This center of gravity is determined as the center of the guide polyhedron (S62). Next, the distance from this center to each vertex of the three-dimensional shape model is obtained (S63). The longest distance is determined as the radius of the guide polyhedron (S64), and this guide polyhedron information is stored in a guide polyhedron storing section 65. The same process can also be applied when using a regular polyhedron, not a sphere, as a guide polyhedron.

A display section 66 displays the thus constructed guide polyhedron on the display device 60. The display section 66 comprises: a superimposing section 66a for superimposing the contents read from the guide polyhedron storing section 65, background image storing section 62, shape storing section 63, and position storing section 70; and a display presentation section 66b for performing conversion necessary to display the contents on the display device 60.

On the other hand, information from the pointing device 61 is taken to an interface section 67. An input control section 67a controls the pointing device 61; when an input has continuity with the immediately preceding input, like the dragging of a mouse, the input control section 67a judges that it is a continuation from the immediately preceding transformation. An operation position recognizing section 67b recognizes whether the inputted starting point of operation is outside or inside the polyhedron or on the boundary; the input operation is judged as a translation transformation when the starting point is outside the polyhedron, as a rotation transformation when it is inside the polyhedron, and as a scaling transformation if it is on the boundary. When the operation is a continuation of the immediately preceding transformation, then the same transformation is selected.

Figure 53:
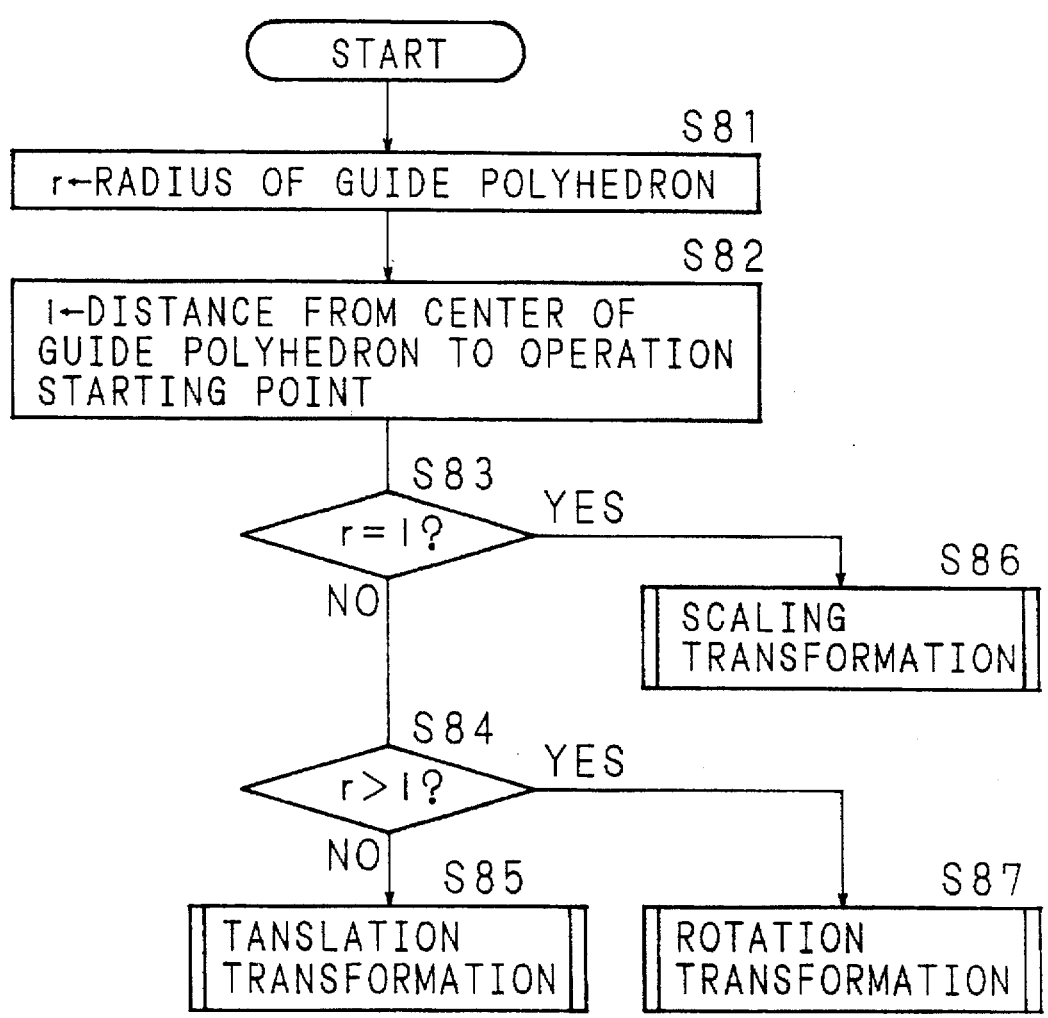
FIG. 53 is a flowchart for recognizing operation position.

FIG. 53 is a flowchart showing the procedure of processing performed in the operation position recognizing section 67b. The radius determined by the guide polyhedron generating section 64 is denoted by r (S81), and the distance l from the center point of the guide polyhedron to the operation starting point, i.e., the point pointed to by the pointing device 61, is obtained (S82). When r=l (S83), a scaling transformation (S86) is performed; when r>l, a rotation transformation (S87) is performed, and when r<l, a translation transformation (S85) is performed.

The operation position information and operation position recognizing information is fed to a transformation amount determining section 68, where the amount of translation, the amount of scaling, and the amount of rotation are determined by a translation amount determining section 68a, a scaling amount determining section 68b, and a rotation amount determining section 68c, respectively. These transformation amounts are supplied to a transformation section 89, where transformations according to the respective transformation amounts are performed, that is, a translation by a translation section 69a, a scaling by a scaling section 69b, and a rotation by a rotation section 69c.

Figure 1:
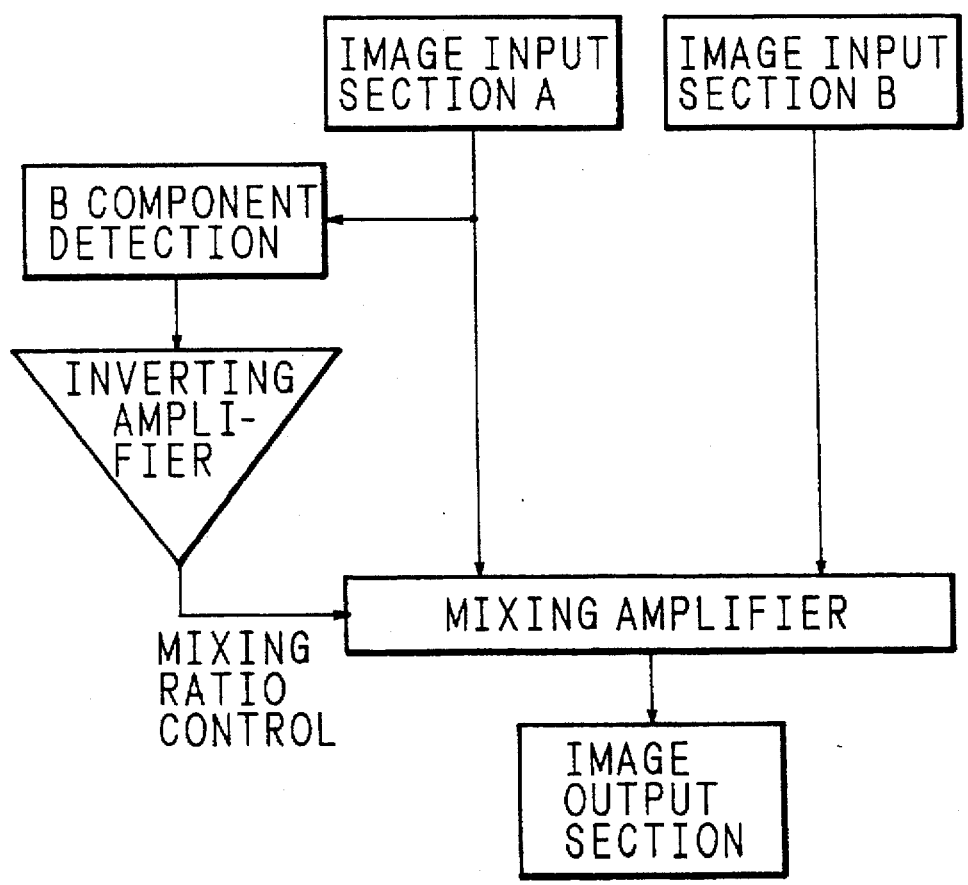
FIG. 1 is a diagram for explaining a conventional image synthesizing method.
Figure 2:
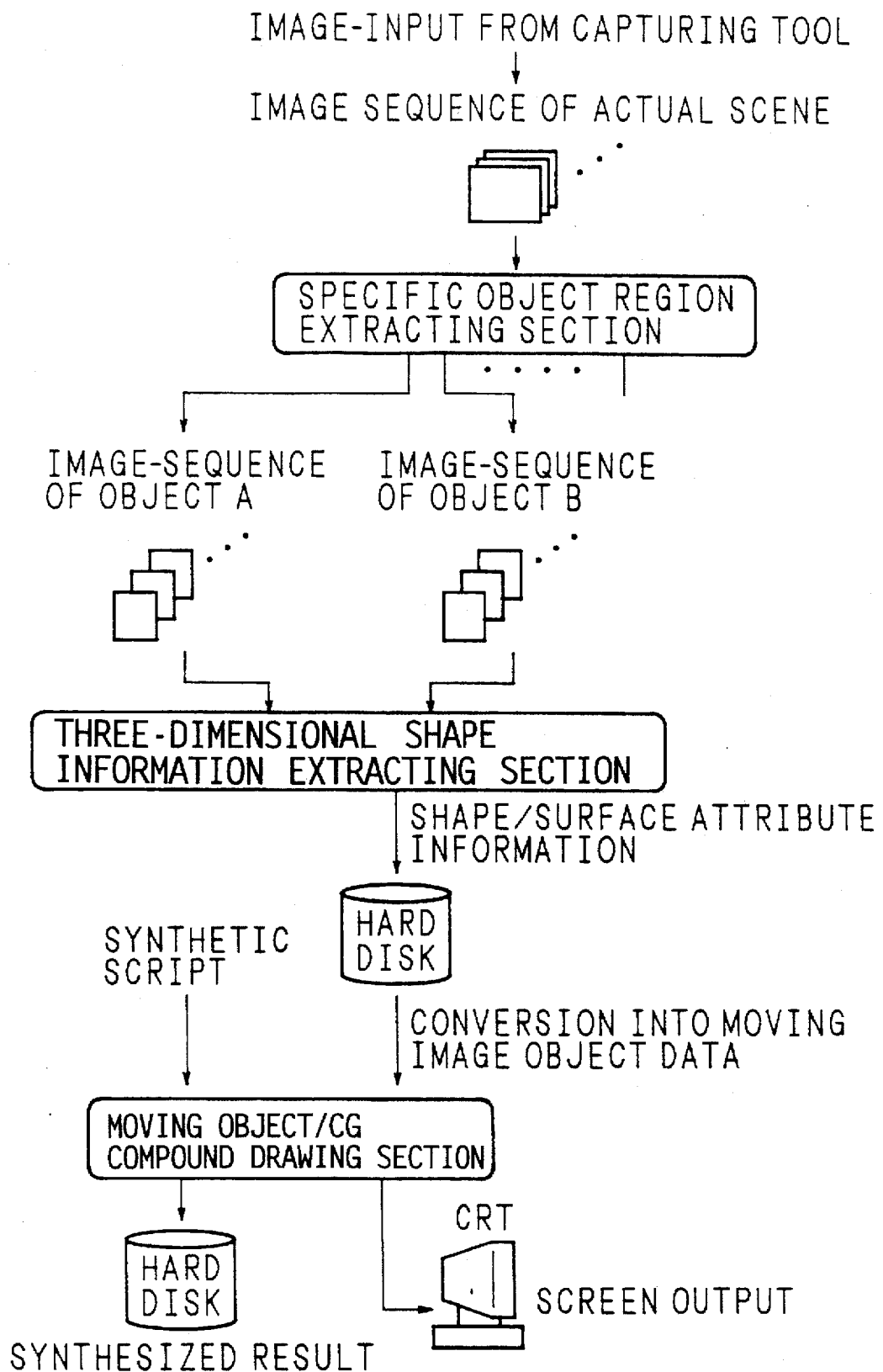
FIG. 2 is a diagram for explaining a system according to the present invention.
Figure 5:
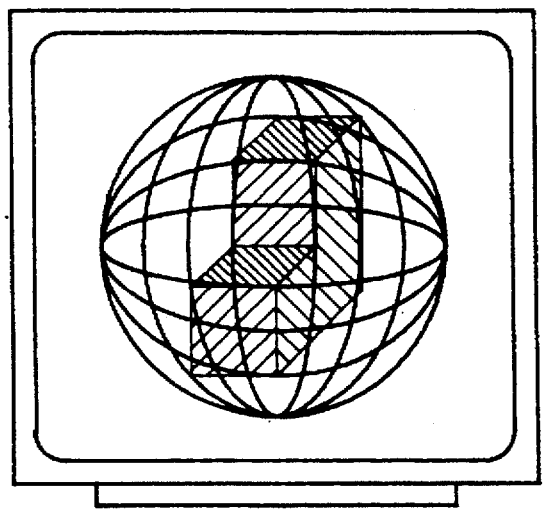
FIG. 5 is a screen diagram showing a display example of a polyhedron.
Figure 6:
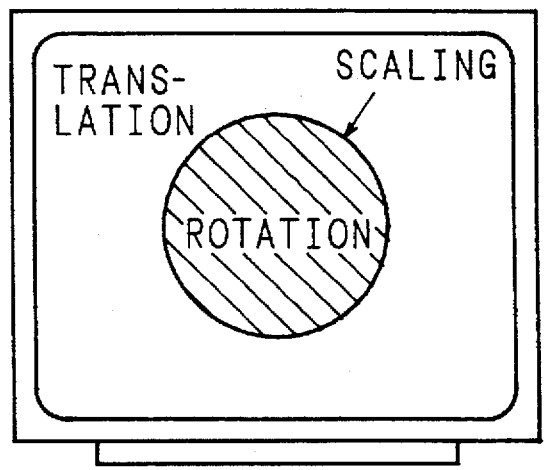
FIG. 6 is a diagram for explaining a processing operation.

An explanation will be given of these transformations. To apply a translation, first the cursor is moved to an area outside the guide polyhedron (see FIG. 6), and the translation transformation is designated by clicking the mouse or by other means; then, the cursor is moved (dragged) in the desired direction. This causes the three-dimensional shape model and the guide polyhedron to move together. The movement is in units of pixels. The translational movement itself can be accomplished by using various known techniques.

Figure 54:
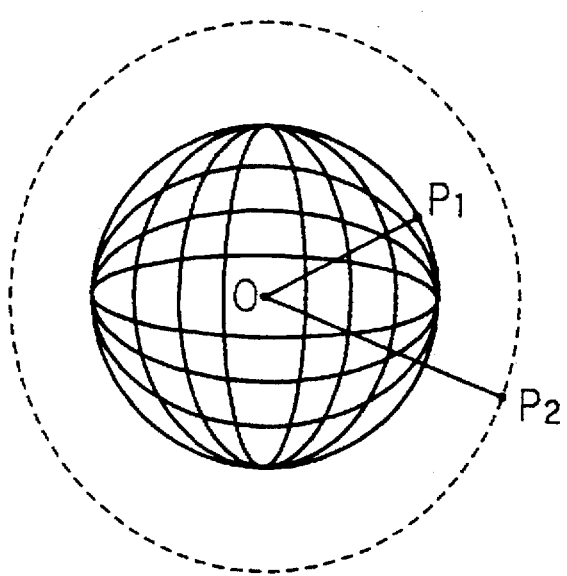
FIG. 54 is a diagram for explaining the principle of scaling.

Next, scaling will be explained. FIG. 54 is a diagram for explaining its principle. First, the mouse or the like is clicked on a point $P_1$ on the periphery of the guide polyhedron; then, the mouse or the like is dragged to a position $P_2$ corresponding to the desired scaling ratio, where a click is made again. Denoting the center of the guide polyhedron as O, the guide polyhedron is scaled by a factor corresponding to $\overline{OP_2}/\overline{OP_1}$. The scaling transformation itself can be accomplished by using suitable known techniques.

Figure 55:
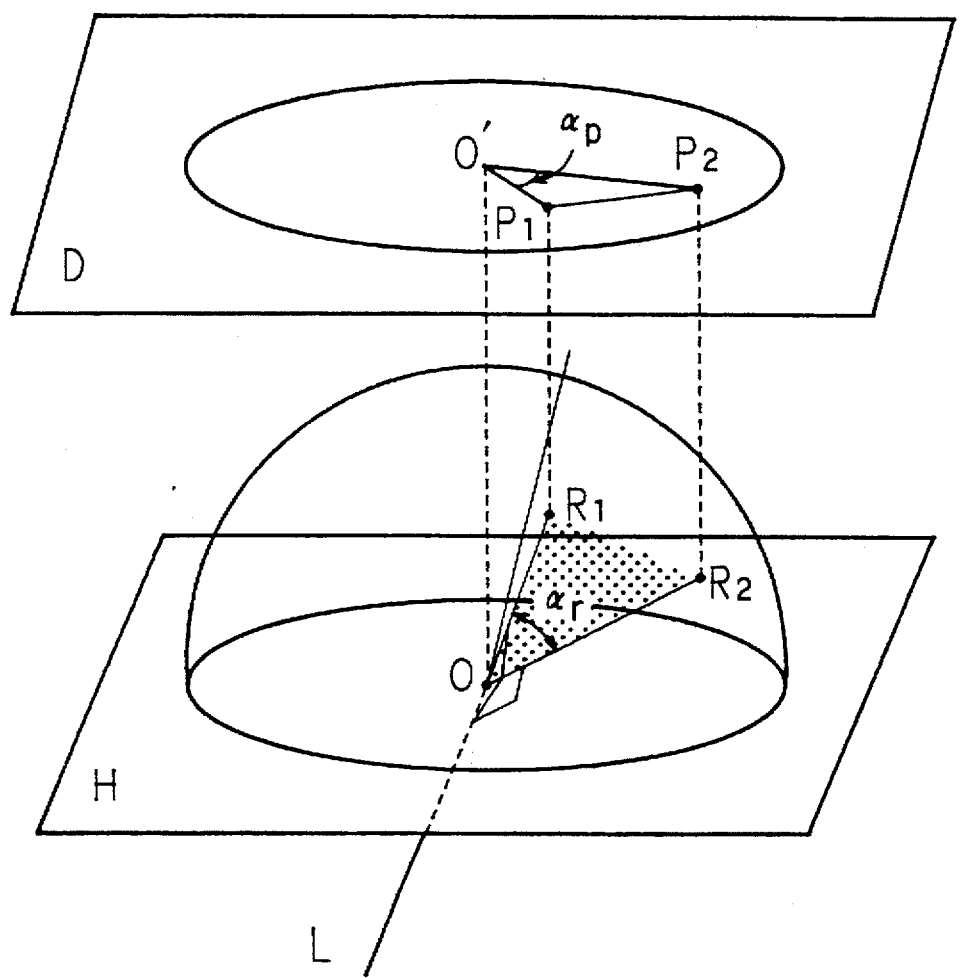
FIG. 55 is a diagram for explaining the principle of rotation.
Figure 56:
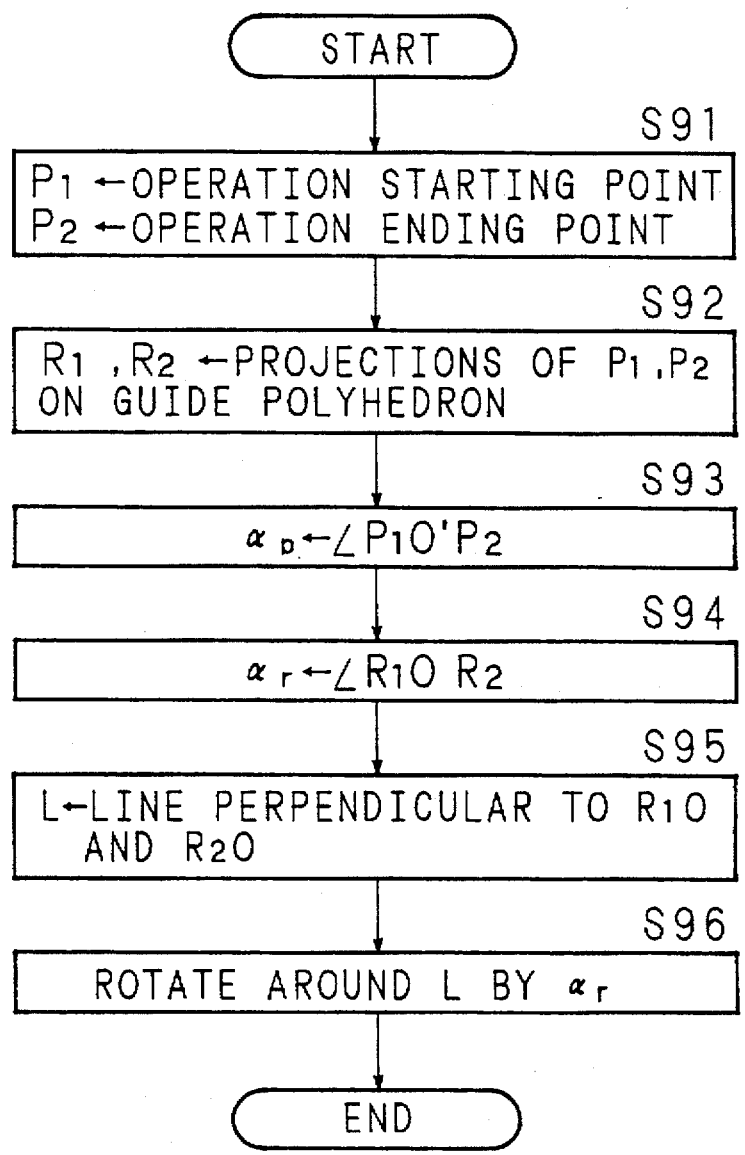
FIG. 56 is a flowchart for a rotation operation.

Next, rotation will be explained. FIG. 55 is a diagram for explaining its principle, and FIG. 56 is a flowchart showing the processing procedure for rotation. In FIG. 55, D is a two-dimensional plane representing the screen of the display device 60, and H is a plane parallel to D and passing through the center of the guide polyhedron optically presented. Suppose here that the mouse or the like is clicked on a point $P_1$ to designate a rotation transformation, and then dragged to a point $P_2$ rotated by $\alpha_p$, where the mouse or the like is clicked again (S91). Then, $R_1$ and $R_2$, the projections of $P_1$ and $P_2$ on the guide polyhedron, are calculated (S92). Set<$P_2O'P_1=\alpha_p$ (where O' is the center of the guide polyhedron in plane D) (S93). Next, angle <$R_1OR_2$ between $\overline{R_1O}$ and $\overline{R_2O}$ is obtained (O is the center of the guide polyhedron in plane H), and <$R_1OR_2$ is denoted as $\alpha_r$ (S94). Then, reference line L passing through the reference point O is defined as a line perpendicular to both $\overline{R_1O}$ and $\overline{R_2O}$ (S95). The guide polyhedron is then rotated with the axis L as a center by $\alpha_r$ (S96). The steps after the amount of rotation is determined are performed using a known graphic rotation technique. Even when a sphere is used as the guide polyhedron, rotation can be performed easily by stroking or referencing its meridian/and latitude.

The thus transformed model is supplied to the position storing section 70 for storage therein.

Figure 57:
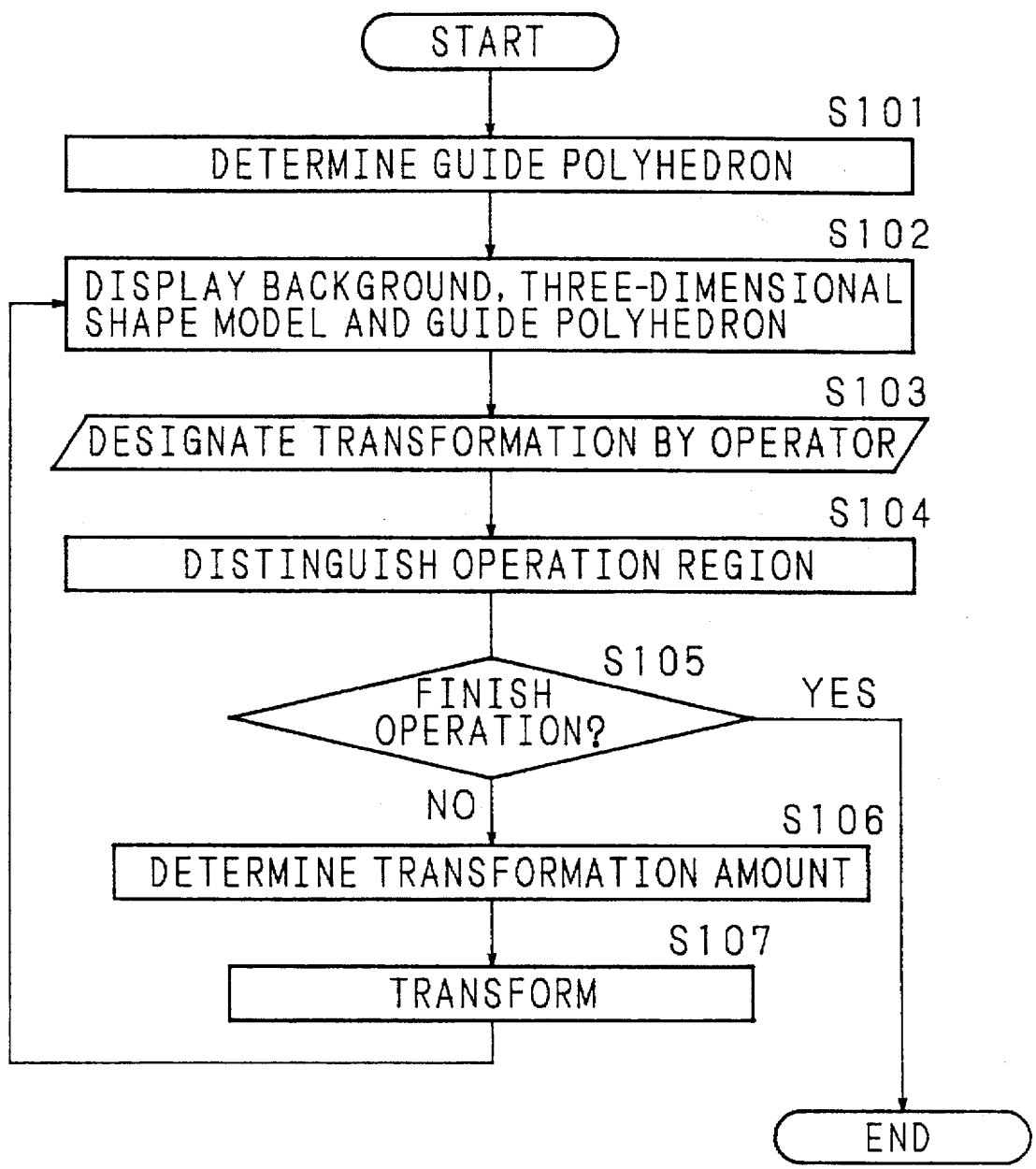
FIG. 57 is a general flowchart for the three-dimensional shape model display apparatus.

FIG. 57 is a general flowchart for the three-dimensional shape model display apparatus. As described above, first the guide polyhedron is determined (S101), and then the background, the three-dimensional shape model, and the guide polyhedron are displayed compoundly (S102); after that, when a transformation is designated by the operator (S103), the operation position is recognized and the type of transformation designated, i.e., translation, scaling, or rotation, is determined (S104), the amount of transformation is determined (S106), and the designated transformation is carried out (S107).

According to the invention of the fourth group described above, the origin (center) about which the scaling or rotation is to be performed can be recognized intuitively. Furthermore, since the guide polyhedron is presented as a reference, the position and inclination of the three-dimensional shape model is easy to recognize. Also, since the color of the guide polyhedron is automatically determined, there is no possibility of impairing the visibility of the three-dimensional shape model. Moreover, neither cumbersome operation of mode switching nor special devices are needed for translation, scaling, or rotation operations. Furthermore, for rotation, the amount of rotation having three degrees of freedom and its direction can be inputted just by inputting two degrees of freedom on the two-dimensional screen of the display device, and the operation can be accomplished easily just by following the shape of the guide polyhedron.

[Invention of Fifth Group]

Finally, the invention of the fifth group will be described which is concerned with the synthetic-image generating section 4 (FIG. 7) that is capable of automatically synthesizing real scene images with CG images.

Figure 58:
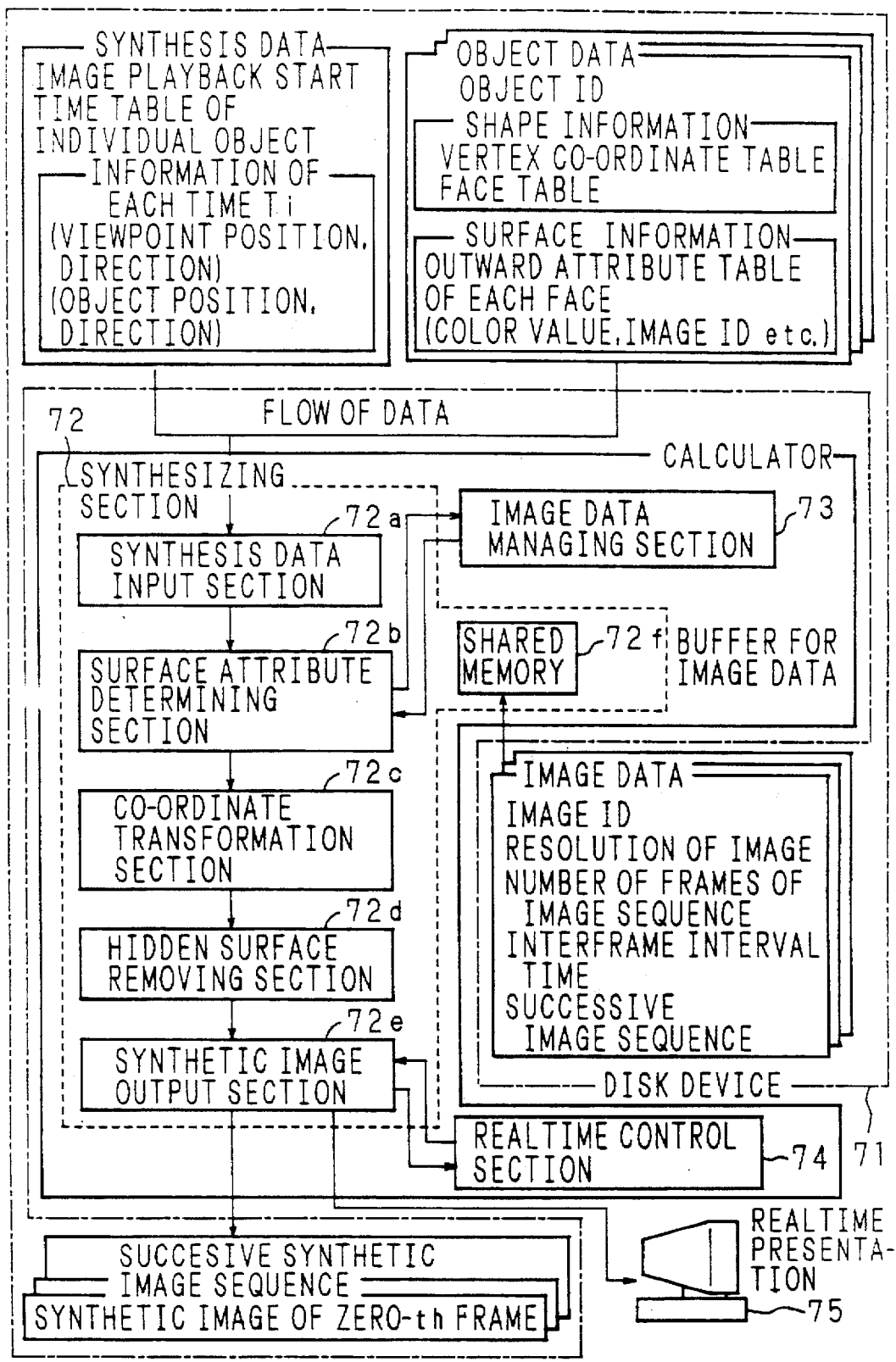
FIG. 58 is a block diagram of an image sequence generating apparatus.

FIG. 58 is a block diagram of an image sequence generating apparatus according to the invention of the fifth group. The apparatus comprises: a disk device 71 in which data related to images to be synthesized (hereinafter abbreviated image data), CG object data and synthesis data on the synthesis of these images, and synthetic image sequences synthesized are stored; an image synthesizing section 72 for synthesizing images using the image data and CG object data in accordance with the synthesis data; an image data managing section 73 for managing image data stored in a shared memory 72f in the image synthesizing section 72 as well as the image data stored in the disk device 71; and a real time control section 74 which maintains correspondence between real time and the time in a schedule table in which information on the timing of synthetic image sequences is stored, and subjects a display device 75 to display the result of synthesis in real-time so that the result of the synthesis is displayed on the display device 75 in real time.

First, an explanation will be given of the various kinds of information. Table 2 shows an example of an image data format. The data consists of a header field containing information identifying an image sequence and for indicating its specification, and so on, as an well as image data field containing a image data of successive frames. The image data is obtained by converting the image signal recorded on a VTR or the like into digital RGB data. The header field carries an image ID identifying the image sequence, the horizontal and vertical resolutions, the number of frames, and the interframe interval time (in milliseconds).

TABLE 2

| header field | | | |
|---|---|---|---|
| | MOVIE-0002 | image ID (character sequence) | 30 bytes |
| | 640 | horizontal resolution | 2 bytes |
| | 480 | vertical resolution | 2 bytes |
| | 1600 | frame number | 4 bytes |
| | 30 | interframe interval time(msec) | 2 bytes |

TABLE 2-continued

| image data (RGB) zeroth frame | [ | F0<br>7F | RGB<br>1E<br>82 | 45<br>4C | 7D<br>61 | 3A<br>A7 | 9B<br>E0 | A0<br>49 | ]<br>B1 ...<br>52 ... | 640×480×<br>1600×3 =<br>1474.56M<br>bytes |
|---|---|---|---|---|---|---|---|---|---|---|
| first frame | [ | 51<br>64 | FE<br>C4 | B1<br>3A | 84<br>D3 | 59<br>EA | 4B<br>F2 | E3<br>76 | 53 ...<br>29 ... | ]

On the other hand, the CG object data is organized as shown in FIG. 59. In the figure, "N" in the upper left corner indicates the size of the table, i.e., the number of objects identified by the respective IDs. Shape information (vertex coordinate table, face table), surface information, and image playback start time are stored for each object. The shape information and surface information are illustrated in the case of shape of a rectangular parallelepiped as shown in the upper right of FIG. 59, and provides pointers to the table. The vertex coordinate table contains vertex IDs (0 to 7) identifying the eight vertices, and the X, Y, and Z coordinate values for each of the vertices. The face table contains face IDs (0 to 5) for identifying the six faces, and vertex iDs for identifying each of the faces.

The surface information provides information concerning images to be pasted on the rectangular parallelepiped primitive, and contains face iDs for the six faces and their corresponding image IDs for the images to be pasted to the respective faces, use starting frame numbers of the images, color value (RGB)/pointers to image data and the diffusion coefficients, reflection coefficients, and transmission coefficients of the respective faces. For faces to which no images are to be pasted, that is, for which the corresponding image IDs are not MOVIE ..., the image IDs are set to NIL, and the color value/pointers to image data are set to values corresponding to the RGB of the colors to be displayed. In this case, the starting frame number is not used, and is therefore set to 0. On the other hand, for faces for which the corresponding image IDs are MOVIE-*, pointers to image data are set. The image playback start time indicates the time at which the playback of the image is started; this start time is not set for objects that have no relevance to image pasting.

Figure 60:
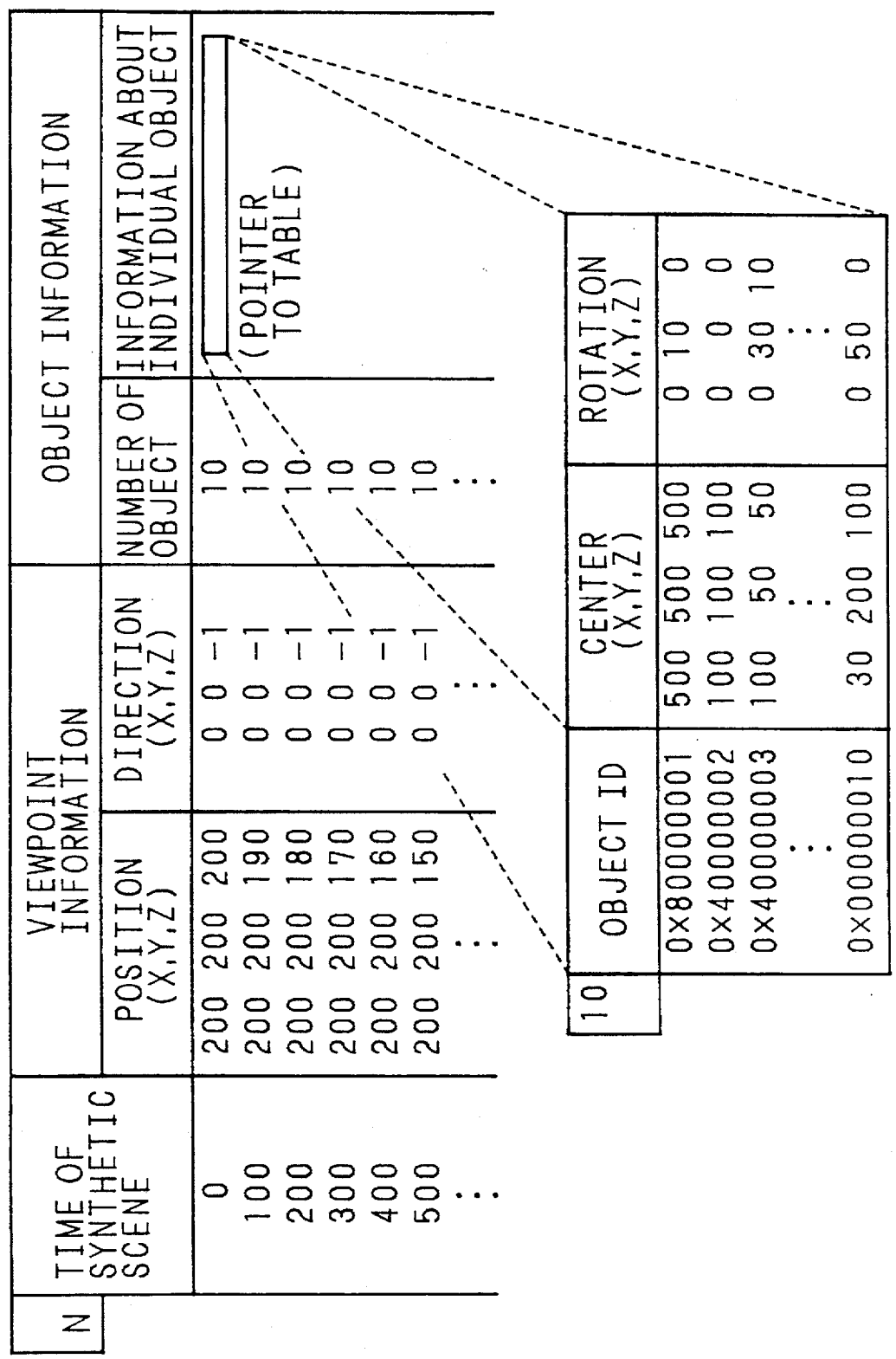
FIG. 60 is a diagram for explaining an example of synthesis data.

Table 3 and FIG. 60 show the synthesis data. Table 3 shows an image playback time table that forms a part of the synthesis data. It contains object IDs, image playback start time (msec), and starting frame number. The information shown here indicates that, for the object 0000002, for example, the image to be pasted on it is played back starting at 100 msec time (on the same scale as $T_i$ hereinafter described), the starting frame being the 15th frame of the image.

TABLE 3

| N | image ID | image playback<br>start time | starting<br>frame No. |
|---|---|---|---|
|  | 0 × 40000002 | 100 | 15 |
|  | 0 × 40000003 | 300 | 10 |

TABLE 3-continued

| N | image ID | image playback<br>start time | starting<br>frame No. |
|---|---|---|---|
|  | 0 × 40000007 | 200 | 5 |

FIG. 60 shows a time schedule that is a part of the synthesis data. It contains object viewpoint information (the position of the viewpoint, such as the X, Y, and Z coordinates, and the direction of the viewpoint) and object information (number of objects and information about individual objects) for each time of synthetic scene transition of synthetic scene. The object information provides a pointer to a table. This table contains object IDs, center point of each object in an X, Y, Z coordinate system, and rotation information relating to the posture of the object. The rotation information indicates the rotation angles around the respective coordinate axes. The synthetic scene time $T_i$ is a relative time (in milliseconds) starting from the time of the first frame in a synthetic image. The prefixes 0X8, 0X4, and 0X0 to the object IDs indicate a light source object, an image object, and an ordinary object, respectively. More specifically, the light source object is an object to be treated as a light source in CG drawing, and the image object is an object on whose surfaces images are to be pasted. The ordinary object is any other object. Each object ID is expressed by the combination of the object number and the light source object mask 0X80000000, image object mask 0X40000000, or ordinary object mask 0X00000000. Thus, 0X40000002 indicates an object whose number is 2 and on which images are to be pasted.

Figure 61:
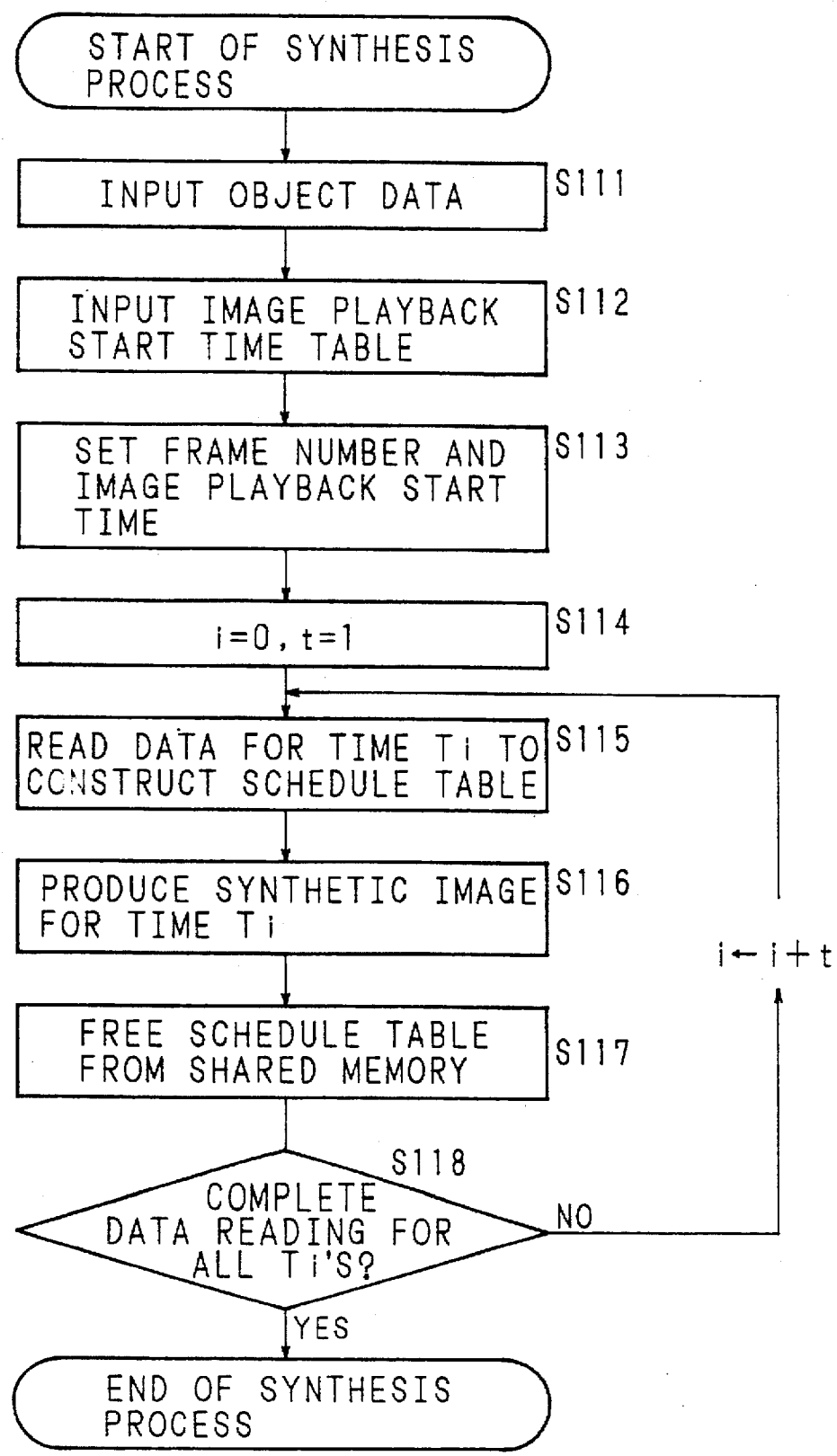
FIG. 61 is a flowchart illustrating a processing procedure in a synthesis data input section.

A synthesis data input section 72a in the image synthesizing section 72 performs the processing shown in FIG. 61. First, object data is read from the disk device 71, and an object table, similar to the one shown in FIG. 59, is constructed in the shared memory 72f (S111). Next, the image playback start time table in the synthesis data is loaded (S112). Then, the image object frame numbers and image playback start times in the object table are set using the corresponding values in the image playback start time table (S113). Next, i is set to 0 and t to 1 (t is a variable for adjusting time delay) (S114), and data for time $T_i$ (i=0) in the synthesis data is read into the shared memory 72f to construct a schedule table (S115). On the basis of this schedule table, the image synthesizing section 72 produces a synthetic image (S116). Then, the schedule table is freed from the shared memory 72f (S117), and steps S115 to S117 are repeated by incrementing i into it until data reading for all $T_i$'s is completed (S118).

A surface attribute determining section 72b in the image synthesizing section 72 determines the surface attributes of each object at each time, and in the case of an image object, passes the time and the pointers in the object table to the image data managing section 73. The image data managing section 73 sets pointer to image data of each face in the pointer to image data field of the object table. In case of a light source object or an ordinary object, the values set in the object table are used.

Figure 62:
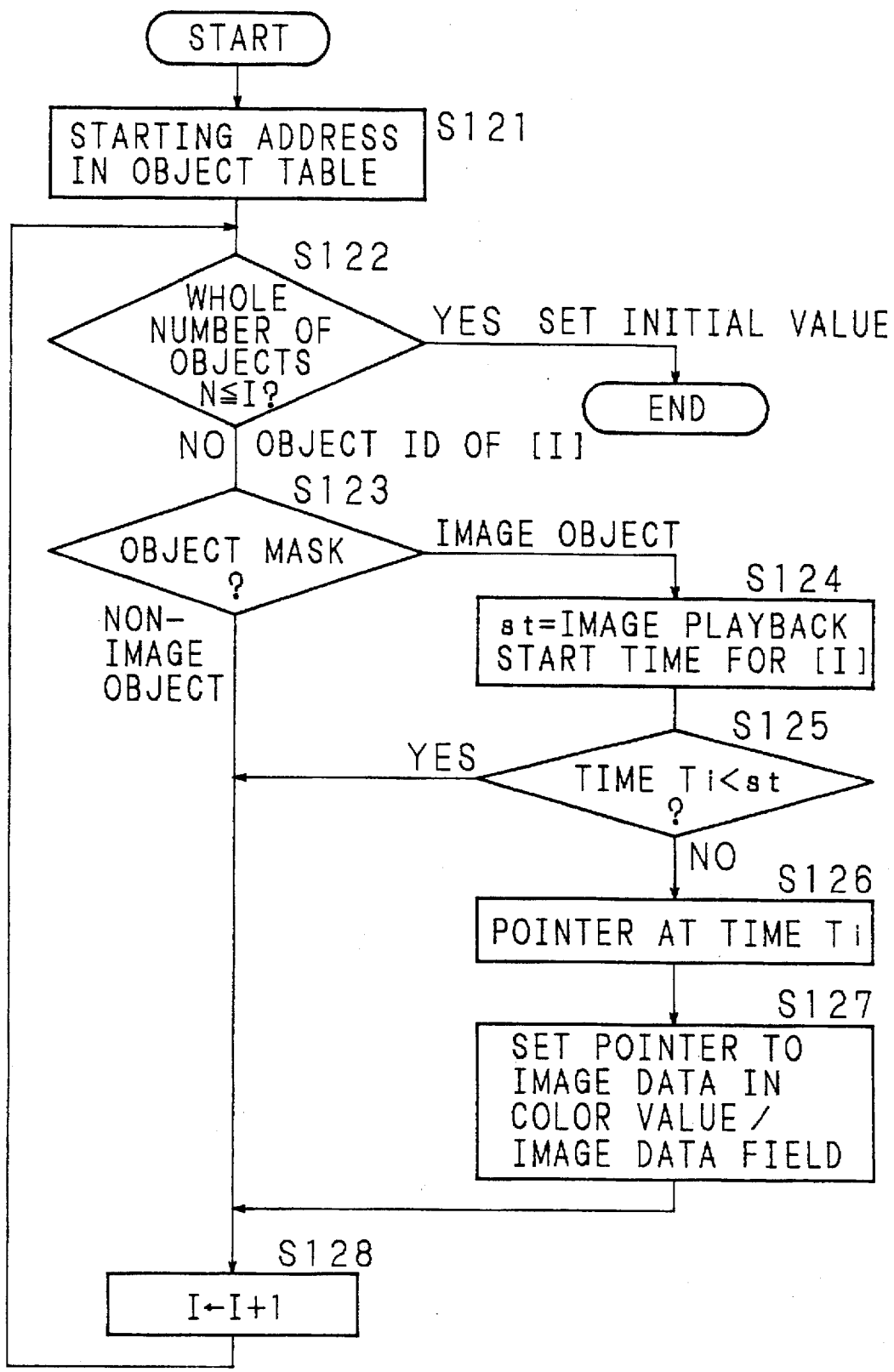
FIG. 62 is a flowchart illustrating a processing procedure in a surface attribute determining section.

FIG. 62 is a flowchart showing the procedure of the above processing. "I" indicating the number in the object table is set to "0" (starting address) (S121), and is compared with "N" (size of table or number of objects) of the object table (S122). When N>I (NO), the object mask for that object is examined (S123); when it is 0X4, the object is determined as an image object, and the image playback start time of number I is set to st (S124), which is compared with real time $T_i$ ($T_i$=0 msec for the first frame of the synthetic image) (S125). While st is smaller than $T_i$, pointer information at time $T_i$ is passed to the image data managing section 73 (S126).

The image data managing section 73 sets pointers to image data in the color value/image data field for the respective faces of the object I (S127). Then, I is incremented by 1 (S128), and the process returns to S122. If st>$T_i$ in S125, I is incremented by 1.

The above process is repeated until I becomes equal to N.

The image data managing section 73 manages the image data in the shared memory 72f, and in the disk, by using an image management table as shown in Table 4. The image management table is constructed beforehand and stored on the disk. When the system is started, this table is loaded into the shared memory 72f. First, all image data in the shared memory 72f is cleared, and the pointer to the image data field in the image management table and the color value/pointer to image data of the object table are set to NIL.

Next, by using the time and object table pointer information received from the surface attribute determining section 72b, the frame number at that time is determined from among the sequence of successive images. When the image data corresponding to the frame number is held in the shared memory 72f, the pointer to that image data is stored into the color value/pointer to the image data field of the object table; when it is not held in the shared memory 72f, the pointer to the image data is read out of the disk device 71 and then stored into the color value/pointer to image data field.

The image management table contains the image IDs, resolutions, number of frames and interframe interval time obtained from image data, its storage location on the disk, and the above-mentioned frame number and pointer.

Figure 63:
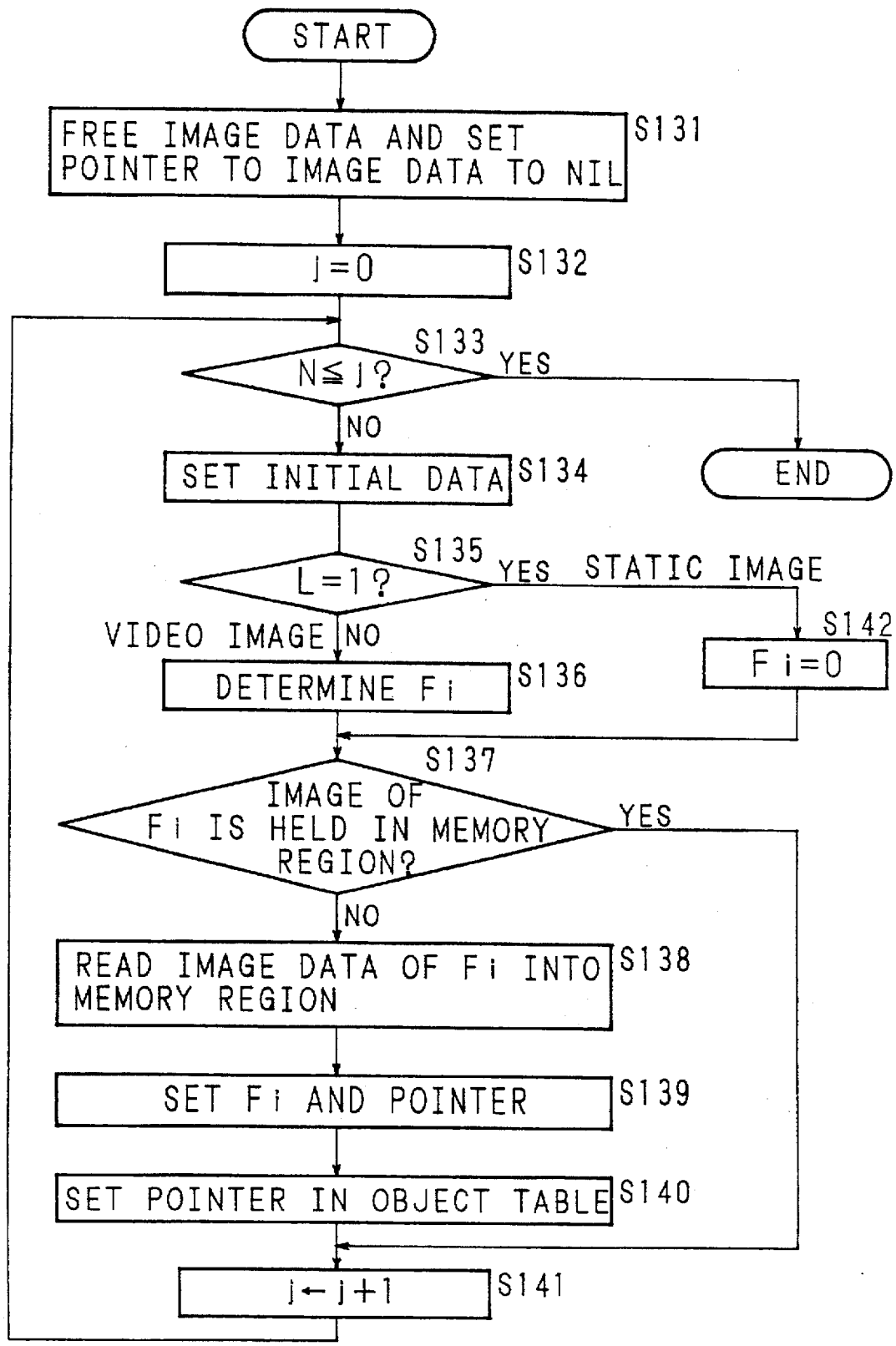
FIG. 63 is a flowchart illustrating a processing procedure in an image data management section.

FIG. 63 is a flowchart illustrating the sequence of processing in the image data managing section 73. First, all image data in the shared memory 72f is cleared, and the pointer to the image data is set to NIL (S131). Next, variable j indicating the face number is set to "0" (S132). Then, the number, N, of faces is compared with j (S133), and when j is smaller than N, setting of an initial value is performed (S134). Denoting the number of the image ID as i, Fi is the starting frame number, st is the image playback start time, L is the total number of frames, and $\Delta f_t$ is the interframe interval time. These values are set.

Next, it is checked whether L=1 or not (S135); when L=1, the image is judged to be a static image, so that the frame number Fi at time $T_i$ is set to 0 (S142). When L is not 1, Fi is determined by equation (1) hereinafter given (S136). When the image of the thus determined Fi is held in the shared memory 72f, j is incremented into I+1 (S141), and the process returns to S133 to process the next face; otherwise, the image data of i is read into the shared memory 72f (S138). Then, the frame number Fi and the pointer are set in the respective fields of the image management table for the image corresponding to i (S139). Next, the pointer to image data is set in the color value/pointer to image data field for the face j of the object corresponding to i in the object table (S140). Then, j is incremented (S141), and the process returns to S133. The above processing is repeated until N=j.

Figure 64:
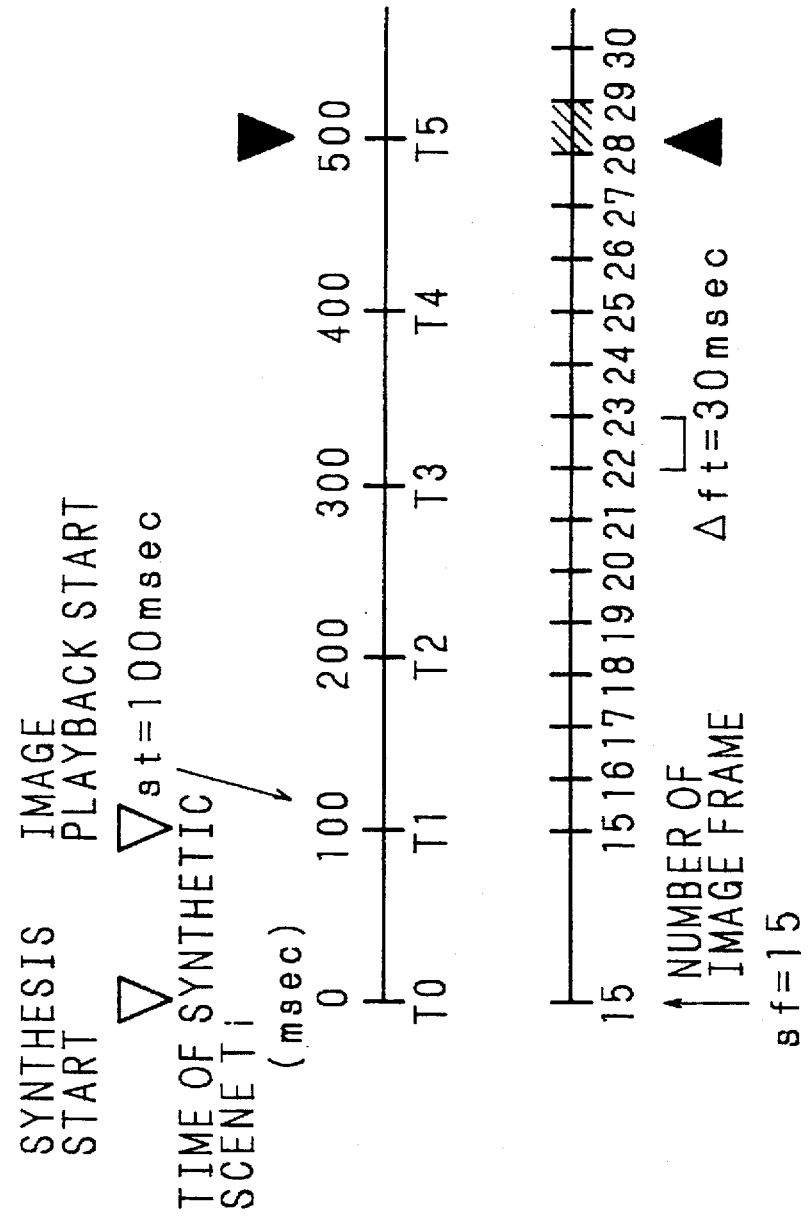
FIG. 64 is a diagram for explaining how the frame number is calculated.

FIG. 64 is a diagram showing how the frame number is calculated. The upper axis represents the synthetic scene time $T_i$ which is set to 0 for the first frame of the synthetic image, while the lower axis represents the image frame number. For the object ID=0X40000002 in the object data in FIG. 59, for example, st=100 msec and sf (starting frame number)=15. When i=5 (T=5), for example, an equation to calculate the frame number is written below.

$$F_5 = sf + \frac{T_s - st}{\Delta f_t} = 15 + \frac{500 - 100}{30}$$
$$= 15 + 13 = 28$$

This is generally written as equation (1) below.

$$F_1 = \left( sf + \frac{T_1 - st}{\Delta f_t} \right) \bmod L$$

$\Delta$ft is the interframe interval time, and mod L is the remainder left after division by the total frame number L. When the image has reached the last frame, the frame number returns to the first frame.

A coordinate transforming section 72c in the image synthesizing section 72 applies coordinate transformations to all the objects written in a given time column in the schedule table, by using their viewpoint information and object place-

TABLE 4

| N | image ID | resolution ver.hor. | frame No. | interframe interval time | position in disk | frame No. | pointer |
|---|---|---|---|---|---|---|---|
|   | MOVIE-0002 | 640 480 | 1600 | 30 | /. . /movie-0002 | 15 | 0xFF001A00 |
|   | MOVIE-0003 | 512 512 | 1800 | 33 | /. . /movie-0003 | 10 | NIL |
|   | MOVIE-0007 | 256 256 | 1800 | 33 | /. . /movie-0007 | 5 | NIL | ment information. The coordinate transformations are performed by using usual CG coordinate transformation techniques (rotation, translation, and perspective transformations). A hidden surface removing section 72d arranges each face of all objects, which was subjected to a coordinate transformation in the co-ordinate transformation section 72c, along the depth direction from the viewpoint in order. Then, by using the light source information, the surface attributes (color value, reflection coefficient, transmission coefficient, diffusion coefficients) of the respective faces of the object, and the frame images to be pasted on the respective faces of the image object, coloring and shading are applied to the respective faces by using a usual CG drawing technique (z-buffer algorithm, and so on), thus generating a synthetic image for each time.

Figure 65:
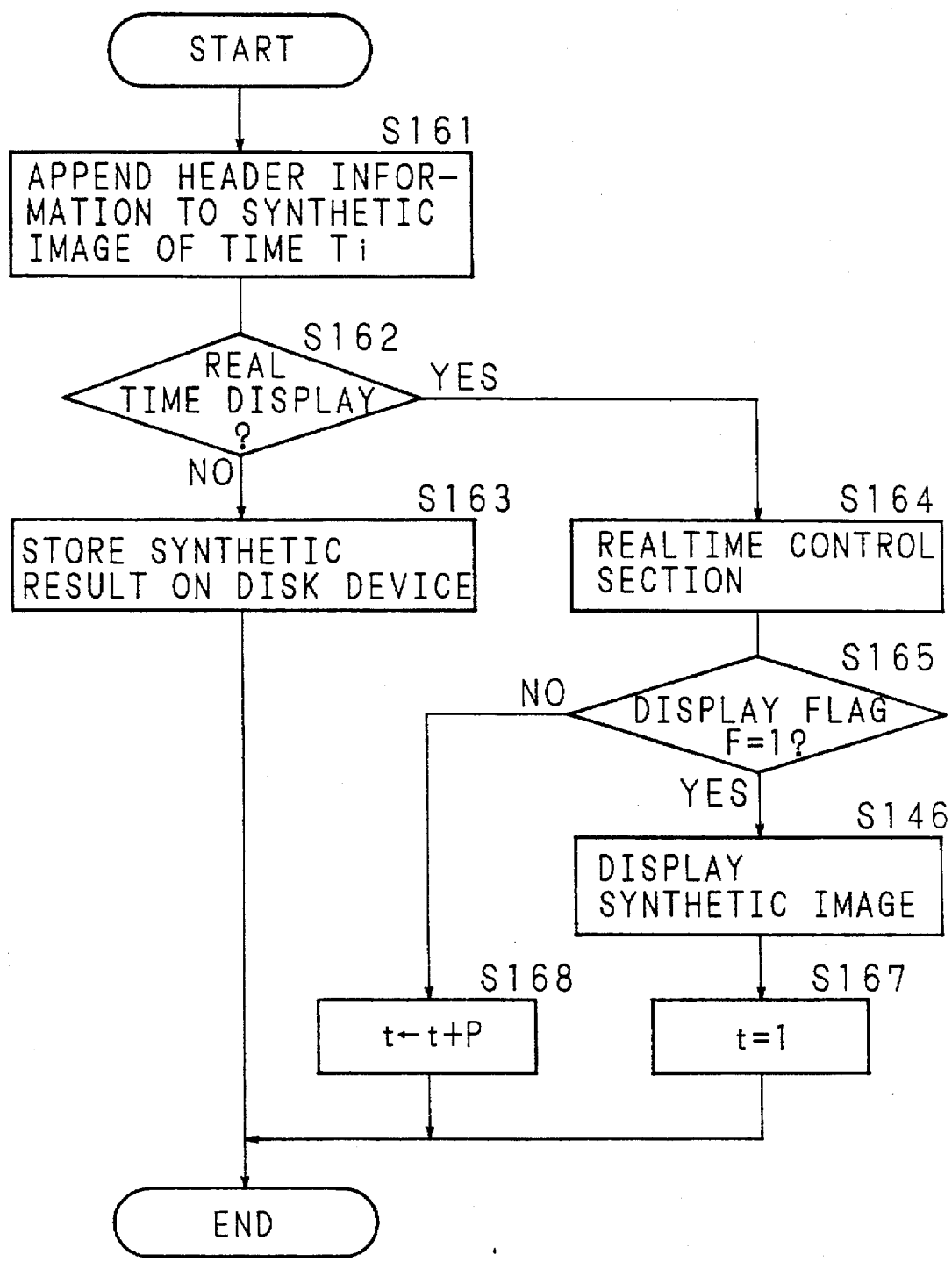
FIG. 65 is a flowchart illustrating a processing procedure in a synthetic image output section.
Figure 66:
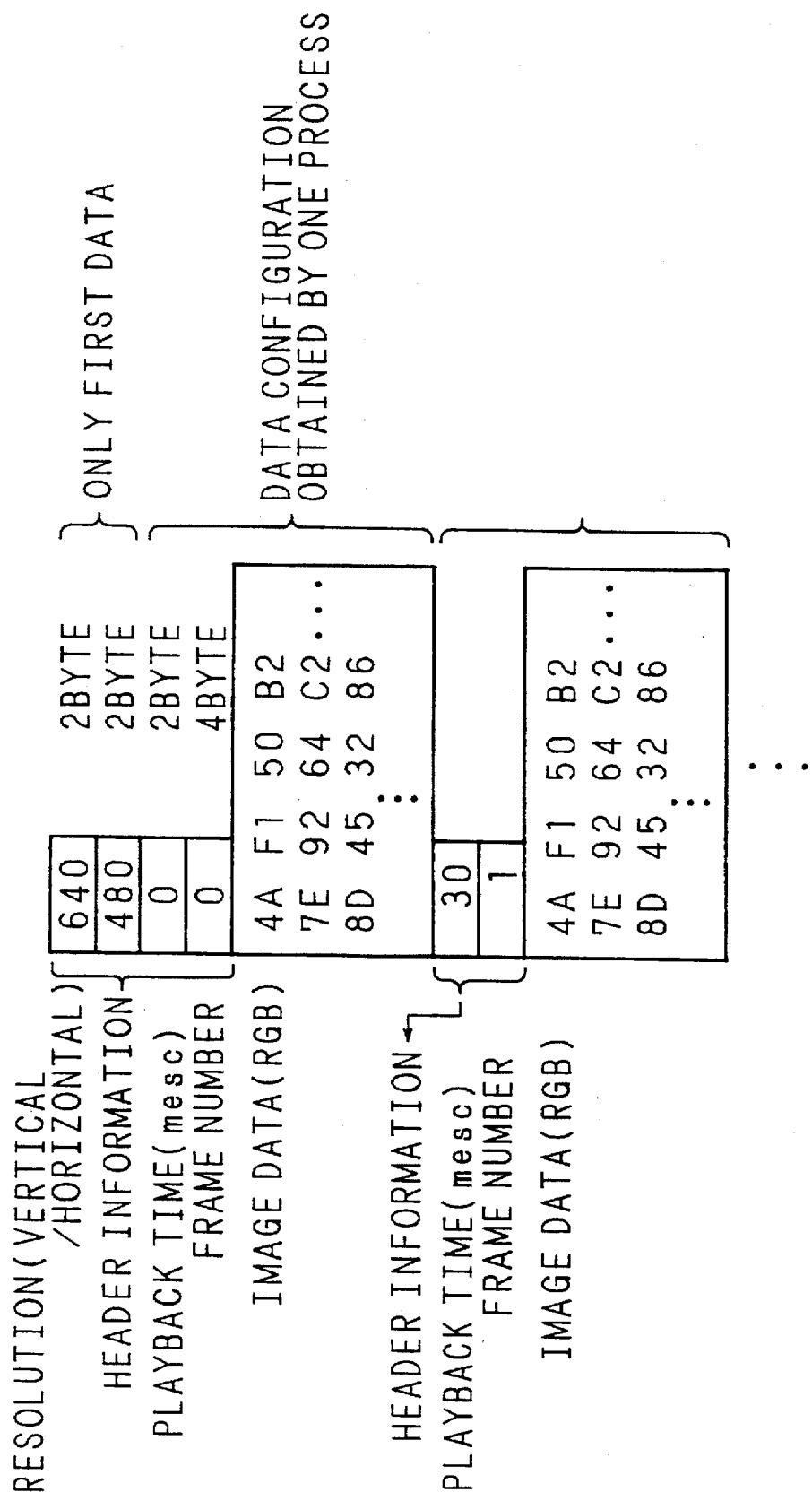
FIG. 66 is a diagram showing the format of data generated by the synthetic image output section.

Next, a synthetic image output section 72e will be described. FIG. 65 is a flowchart showing the procedure of processing performed in the synthetic image output section 72e, and FIG. 66 is a diagram showing the format of the generated data. Header information is appended to the synthetic image generated by the hidden surface removing section 72d (S161), as shown in FIG. 65. The header information contains vertical/horizontal resolution information appended only to the first data in a sequence of image data, and the playback time and frame number appended for each frame. Next, it is checked whether a real-time presentation of the image is needed (S162), and when it is not needed, the data is recorded on the disk device 71 (S163). When a real-time presentation is needed or not, the data is passed to the real-time controlling section 74 (S164). Then, display flag F is examined (S165); when F=1 (flag is set), the synthetic image is displayed on the display device 75 (S166), and the variable t provided for adjusting the process flow is set to 1 (S167). When F=0, t is set to t+P (S168), where P also is a constant for adjusting the process flow.

Figure 67:
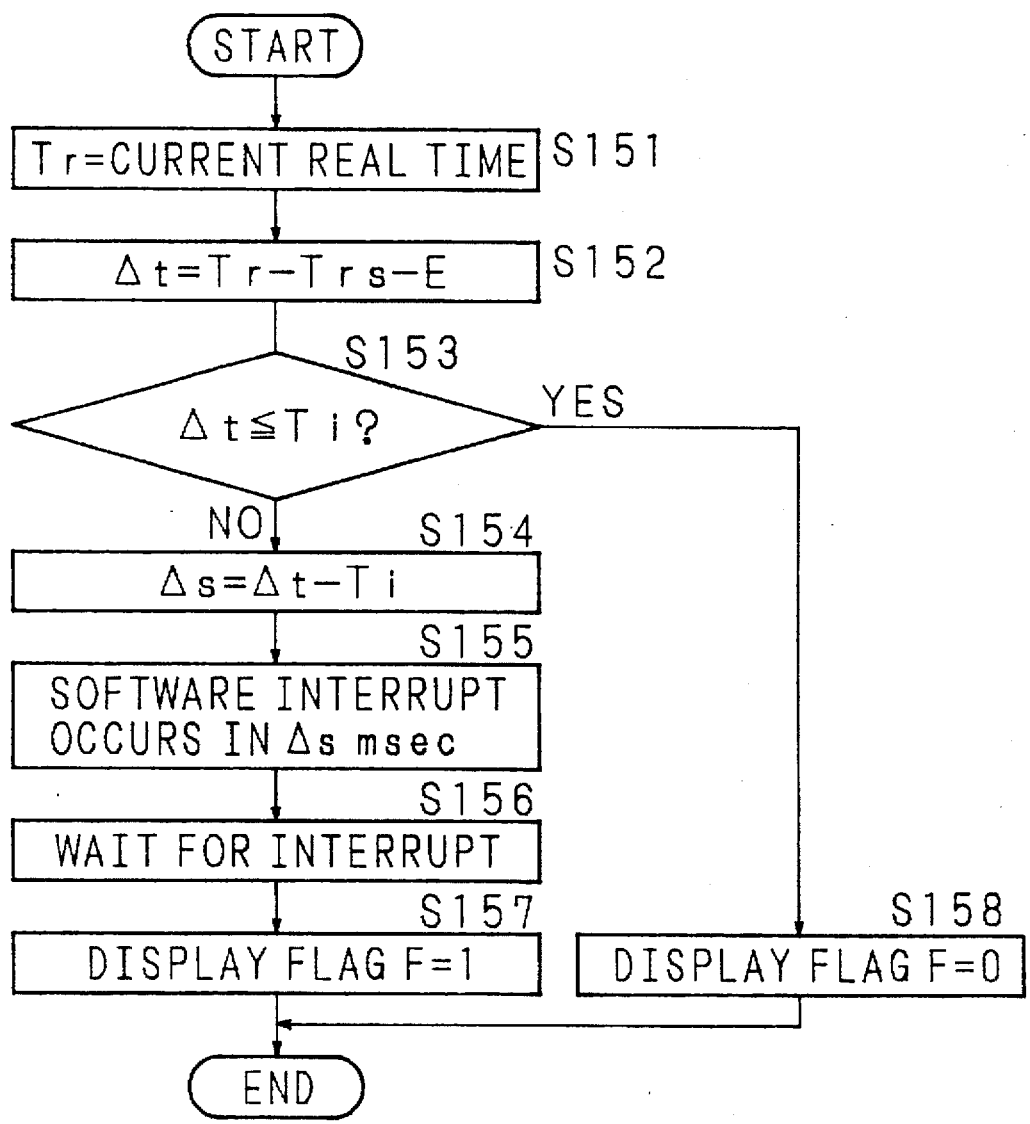
FIG. 67 is a flowchart illustrating a processing procedure in a real time control section.

FIG. 67 is a flowchart showing the procedure of processing performed in the real time control section. In this flowchart, T is the time which is set to 0 for the zeroth frame, as previously noted. Tr is the current real time set in the computer, and Trs is the real time at which the zeroth frame image is outputted to the display device 75. E is the estimated time (constant) taken for the processing.

First, Tr is read in (S151), and $$\Delta t = Tr - Trs - E$$

is calculated (S152). $\Delta t$ is the value that the real time is converted to the time axis on the same frame as $T_i$. Next, $\Delta t$ is compared with $T_i$ (S153); when $\Delta t \leq T_i$, it is judged that the timing to display the image on the display device 75 is already lost, and the flag F is set to 0 (S156). Otherwise, the difference $\Delta s$ between $\Delta t$ and $T_i$ is calculated (S154). Then, a setting is made so that a software interrupt occurs in $\Delta s$ msec (S155), and the process waits for the interrupt to occur (S156). Then, the flag F is set to 1.

As the display flag F is set to 0 or 1, t is set to t+P or 1, respectively, in the flowchart for the synthetic image output section 72e. Since t+P is larger than 1, when there is a delay of display time, the time flow in the synthetic image output section 72e is delayed thereby reducing $T_i$ relative to $\Delta t$. Consequently this avoids a delay of display.

According to the invention of the fifth group described above, adjusting for each frame is not necessary, and the image synthesis work can be simplified accordingly.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An image synthesizing method of synthesizing an actual scene image and a computer-graphics image, comprising the steps of:

extracting a designated region from the actual scene image;

displaying the extracted region on a screen;

preparing data of a plurality of geometric shapes beforehand;

selecting one of said geometric shades and displaying said selected geometric shape on a screen substantially where said extracted region is displayed;

adjusting the position, orientation and size of said selected geometric shape to make said selected geometric shape coincide with said extracted region;

calculating three-dimensional shape information from said adjusted geometric shape; and constructing a computer-graphics model of said extracted region on the basis of said extracted region and three-dimensional shape information.

2. An image synthesizing method according to claim 1, further comprising a step of synthesizing the computer-graphics model of said extracted region with another computer-graphics model for a compound display.

3. An image synthesizing method according to claim 1, further comprising:

performing the steps of extracting a designated region, displaying the extracted region, preparing data, selected one of said geometric shapes, adjusting the position, orientation and size of said selected geometric shape, calculating three-dimensional shape information, and constructing a computer-graphics model for a plurality of frames forming the actual scene image.

4. An image synthesizing method according to claim 2, further comprising:

performing the steps of extracting a designated region, displaying the extracted region, preparing data, selected one of said geometric shapes, adjusting the position, orientation and size of said selected geometric shape, calculating three-dimensional shape information, and constructing a computer-graphics model for a plurality of frames forming the actual scene image.

5. An image synthesizing apparatus for synthesizing an actual scene image with a computer-graphics image, comprising:

means for extracting a designated region from the actual scene image;

means for displaying the extracted region on a screen;

means for preparing data of a plurality of geometric shapes beforehand;

means for selecting one of said geometric shapes and displaying said selected geometric shape on a screen substantially where said extracted region is displayed;

means for adjusting the position, orientation and size of said selected geometric shape to make said selected geometric shape coincide with said extracted region;

means for calculating three-dimensional shape information from said adjusted geometric shape; and means for constructing a computer-graphics model of said extracted region on the basis of said extracted region and three-dimensional shape information.

6. An image synthesizing apparatus according to claim 5, further comprising:

means for synthesizing the computer-graphics model of extracted region with another computer-graphics model for a compound display.

7. A method of extracting a three-dimensional shape of an object contained in an actual scene image, comprising the steps of:

preparing data of a plurality of geometric shapes beforehand;

extracting a region corresponding to said object from the actual scene image;

selecting one of the geometric shapes and displaying the selected geometric shape on a screen substantially where the extracted region is displayed; and adjusting the position, orientation, and size of said selected geometric shape to make said selected geometric shape coincide with said extracted region.

8. An apparatus for extracting a three-dimensional shape of an object contained in an actual scene image, comprising:

means for preparing data of a plurality of geometric shapes beforehand;

means for extracting a region corresponding to said object from the actual scene image;

means for selecting one of the geometric shapes and displaying the selected geometric shape on a screen substantially where the extracted region is displayed; and adjusting means for adjusting the position, orientation, and size of said selected geometric shape to make said selected geometric shape coincide with the extracted region.

9. An apparatus according to claim 8, wherein:

said adjusting means includes means for automatically making the adjustments to said selected geometric shape on the basis of a shape of said object in the actual scene image.

10. An apparatus according to claim 8, further comprising:

means for mapping image information of said extracted region onto surfaces of the shape adjusted by said adjusting means, and for displaying the mapped result.

11. A method of extracting a designated region from an image, comprising the steps of:

designating a plurality of pixels within a region to be extracted;

calculating predetermined features for the designated pixels;

calculating a maximum value and a minimum value of the calculated predetermined features;

calculating features for pixels inside and outside the region to be extracted; and selecting pixels whose features are between said maximum value and said minimum value, wherein a region made up of the selected pixels is designated as said extracted region.

12. A region extracting method according to claim 11, further comprising the steps of:

assigning a first value to the pixels in said extracted region and a different second value to the pixels in non-extracted regions; and assigning an intermediate value between said first and second values to pixels located along an outer edge of a boundary of said extracted region, wherein an image is generated by using said first, second and intermediate values.

13. A method of extracting a designated region from an image, comprising the steps of:

designating a plurality of pixels within a region to be extracted;

calculating prescribed features for the designated pixels;

calculating a difference in the calculated prescribed features between adjacent pixels within the designated pixels;

calculating a maximum value of the calculated difference; and connecting four connected pixels or eight connected pixels of which the difference in the features between adjacent pixels is smaller than said maximum value, with each of the designated pixels as a starting point, wherein a region made up of the connected pixels is designated as said extracted region.

14. A region extracting method according to claim 13, further comprising the steps of:

assigning a first value to the pixels in said extracted region and a different second value to the pixels in non-extracted regions; and assigning an intermediate value between said first and second values to pixels located along an outer edge of a boundary of the extracted region, wherein an image is generated by using said first, second, and intermediate values.

15. A region extracting method according to claim 12, further comprising the step of:

assigning individually different intermediate values to a plurality of pixels adjacent to each other along a direction moving farther from said extracted region.

16. A region extracting method according to claim 14, further comprising the step of:

assigning individually different intermediate values to a plurality of pixels adjacent to each other along a direction moving farther from said extracted region.

17. A method of extracting a designated region from an image, comprising the steps of:

designating a plurality of pixels within a region to be extracted;

calculating predetermined features for the designated pixels;

calculating a maximum value and a minimum value of the calculated predetermined features;

calculating features for pixels inside and outside the region to be extracted;

determining whether the calculated features are within a range between said maximum value and said minimum value;

assigning a constant K to the pixels within said range;

calculating a difference between the features of the pixels outside the range and said maximum value or said minimum value; and assigning to the pixels outside said range a value calculated by subtracting from the constant K a value determined as a function of said difference, wherein an image is generated by using the assigned values.

18. A method of extracting a designated region from an image, comprising the steps of:

designating a plurality of pixels within a region to be extracted;

calculating a plurality of prescribed features for the designated pixels;

calculating a maximum value and a minimum value of each of the calculated prescribed features;

calculating features for pixels inside and outside the region to be extracted;

determining whether each of the calculated features is within a range between said maximum value and said minimum value of the corresponding prescribed feature;

assigning a constant K to the pixels within said corresponding range;

calculating a difference between each feature of the pixels outside the range and said corresponding maximum value or minimum value; and assigning to the pixels outside said corresponding range a value calculated by subtracting from the constant K a value determined in relation to said difference of each of the features, wherein an image is generated by using the assigned values.

19. A method of extracting a designated region from an image, comprising the steps of:

designating a plurality of pixels within a region to be extracted;

calculating predetermined features for the designated pixels;

calculating a mean and a variance of the calculated predetermined features;

calculating features for pixels inside and outside the region to be extracted;

determining whether the calculated features are within a range defined by said mean and said variance;

assigning a constant K to the pixels within said range:

calculating a deviation of the features of the pixels outside said range with respect to said mean; and assigning to the pixels outside said range a value calculated by subtracting from the constant K a value determined in relation to said deviation, wherein an image is generated by using the assigned values.

20. A method of extracting a designated region from an image, comprising the steps of:

designating a plurality of pixels within a region to be extracted;

calculating a plurality of prescribed features for the designated pixels;

calculating a mean and a variance of each of the calculated prescribed features;

calculating features for pixels inside and outside the region to be extracted;

determining whether each of the calculated features is within a range defined by the corresponding mean and variance;

assigning a constant K to the pixels within said corresponding range;

calculating a deviation of each feature of the pixels outside said corresponding range with respect to said corresponding mean; and assigning to the pixels outside said corresponding range a value calculated by subtracting from the constant K a value determined in relation to said deviation of each of the features, wherein an image is generated by using the assigned values.

21. A method of extracting a designated region from an image, comprising the steps of:

designating a plurality of pixels within a region to be extracted;

performing 4-connected or 8-connected labeling with each of the designated pixels as a starting point; and changing non-labeled regions to non-extracted regions.

22. A method of extracting a designated region from an image having a plurality of frames, comprising the steps of:

for one frame designating a plurality of pixels within a region to be extracted, performing a 4-connected or 8-connected labeling with each of the designated pixels as a starting point, changing non-labeled regions to non-extracted regions, and calculating geometric features of the extracted region; and for the next frame performing labeling, calculating geometric features for each of regions assigned different labels from the 4-connected and 8-connected labeling of the preceding frame, and keeping, as the extracted region, a region having geometric features close to the geometric features of the extracted region in the preceding frame, and changing other regions to non-extracted regions.

23. A method of extracting a designated region from an image having a plurality of frames, comprising the steps of:

for one frame designating a plurality of pixels within a region to be extracted, performing 4-connected or 8-connected labeling with each of the designated pixels as the starting point, changing non-labeled regions to non-extracted regions, and calculating optical features of the extracted region; and for the next frame performing labeling, calculating optical features for each of regions assigned different labels from the 4-connected and 8-connected labeling of the preceding frame, and keeping, as the extracted region, a region having optical features close to the optical features of the extracted region in the preceding frame, and changing other regions to non-extracted regions.

24. An apparatus for extracting a designated region from an image, comprising:

means for designating a plurality of pixels within a region to be extracted;

means for calculating predetermined features for the designated pixels;

means for calculating a maximum value and a minimum value of the calculated predetermined features;

means for storing the calculated maximum value and minimum value;

means for calculating features for pixels inside and outside the region to be extracted, and for selecting pixels having features which are between said maximum value and said minimum value, wherein a region made up of the selected pixels is designated as said extracted region.

25. A region extracting apparatus according to claim 24, further comprising:

means for assigning a first value to the pixels in said extracted region and a different second value to the pixels in non-extracted regions; and means for assigning a value intermediate between the first and second values to pixels located along an outer edge of the boundary of said extracted region, wherein an image is generated using said first, second, and intermediate values.

26. An apparatus for extracting a designated region from an image, comprising:

means for designating a plurality of pixels within a region to be extracted;

means for calculating predetermined features for the designated pixels;

means for calculating a difference in the calculated predetermined features between adjacent pixels within the designated pixels;

means for calculating a maximum value of the calculated difference;

means for storing the calculated maximum value; and means for connecting, with each of the designated pixels as a starting point, four connected pixels or eight connected pixels for which the difference in the features between adjacent pixels is smaller than said maximum value, wherein a region made up of the connected pixels is designated as said extracted region.

27. A region extracting apparatus according to claim 26, further comprising:

means for assigning a first value to the pixels in said extracted region and a different second value to the pixels in non-extracted regions; and means for assigning an intermediate value between said first and second values to pixels located along an outer edge of a boundary of said extracted region, wherein an image is generated by using said first, second, and intermediate values.

28. A region extracting apparatus according to claim 25, further comprising:

means for assigning individually different intermediate values to a plurality of pixels adjacent to each other along a direction moving farther from said extracted region.

29. A region extracting apparatus according to claim 27, further comprising:

means for assigning individually different intermediate values to a plurality of pixels adjacent to each other along a direction moving farther from said extracted region.

30. An apparatus for extracting a designated region from an image, comprising:

means for designating a plurality of pixels within a region to be extracted;

means for calculating predetermined features for the designated pixels;

means for calculating a maximum value and a minimum value of the calculated predetermined features;

means for storing the calculated maximum value and minimum value;

means for calculating features for pixels inside and outside the region to be extracted, and for determining whether the calculated features are within a range between said maximum value and the minimum value;

means for assigning a constant K to the pixels within said range;

means for calculating a difference between the features of the pixels outside said range and said maximum value or said minimum value; and means for assigning to the pixels outside said range a value calculated by subtracting from the constant K a value determined in relation to said difference, wherein an image is generated by using the assigned values.

31. An apparatus for extracting a designated region from an image, comprising:

means for designating a plurality of pixels within a region to be extracted;

means for calculating a plurality of predetermined features for the designated pixels;

means for calculating a maximum value and a minimum value of each of the calculated predetermined features;

means for storing the calculated maximum value and minimum value of each of the calculated predetermined features;

means for calculating features for pixels inside and outside the region to be extracted, and for determining whether each of the calculated features is within a range between said maximum value and said minimum value of the corresponding predetermined feature;

means for assigning a constant K to the pixels within said corresponding range;

means for calculating a difference between each feature of the pixels outside said range and the corresponding maximum value or minimum value; and means for assigning to the pixels outside said corresponding range a value calculated by subtracting from the constant K a value determined in relation to said difference of each of the features, wherein an image is generated by using the assigned values.

32. An apparatus for extracting a designated region from an image, comprising:

means for designating a plurality of pixels within a region to be extracted;

means for calculating predetermined features for the designated pixels;

means for calculating a mean and a variance of the calculated predetermined features;

means for storing the calculated mean and variance;

means for calculating features for pixels inside and outside the region to be extracted, and for determining whether the calculated features are within a range defined by said mean and variance;

means for assigning a constant K to the pixels within said range;

means for calculating a deviation of the features of the pixels outside said range with respect to said mean; and means for assigning to the pixels outside said range a value calculated by subtracting from the constant K a value determined in relation to said deviation, wherein an image is generated by using the assigned values.

33. An apparatus for extracting a designated region from an image, comprising:

means for designating a plurality of pixels within a region to be extracted;

means for calculating a plurality of predetermined features for the designated pixels;

means for calculating a mean and a variance of each of the calculated features;

means for storing each of the calculated means and variances;

means for calculating features for pixels inside and outside said region to be extracted, and for determining whether each of the calculated features is within a range defined by said corresponding mean and variance;

means for assigning a constant K to the pixels within said corresponding range;

means for calculating a deviation of each feature of the pixels outside said corresponding range with respect to said corresponding mean; and means for assigning to the pixels outside said corresponding range a value calculated by subtracting from the constant K a value determined in relation to said deviation of each of the features, wherein an image is generated by using the assigned values.

34. An apparatus for extracting a designated region from an image, comprising:

means for designating a plurality of pixels within a region to be extracted;

means for performing 4-connected or 8-connected labeling with each of the designated pixels as a starting point; and means for changing non-labeled regions to non-extracted regions.

35. An apparatus for extracting a designated region from an image having a plurality of frames, comprising:

for one frame means for designating a plurality of pixels within a region to be extracted, means for performing 4-connected or 8-connected labeling with each of the designated pixels as a starting point means for changing non-labeled regions to non-extracted regions, and means for calculating geometric features of said extracted region; and for the next frame, means for labeling, means for calculating geometric features for each of regions assigned different labels from the 4-connected and 8-connected labeling of the preceding frame, and means for keeping, as the extracted region, a region having geometric features close to the geometric features of said extracted region in the preceding frame, and for changing other regions to non-extracted regions.

36. An apparatus for extracting a designated region from an image having a plurality of frames, comprising:

for one frame means for designating a plurality of pixels within a region to be extracted;

means for performing 4-connected or 8-connected labeling with each of the designated pixels as a starting point, means for changing non-labeled regions to non-extracted regions, and means for calculating optical features of said extracted region; and for the next frame, means for labeling, means for calculating optical features for each of regions assigned different labels from the 4-connected and 8-connected labeling of the preceding frame, and means for keeping, as the extracted region, a region having optical features close to the optical features of said extracted region in the preceding frame, and changing other regions to non-extracted regions.

37. A method of generating an image sequence having a plurality of frames by synthesizing an image managed in units of frames and a computer-graphics image, comprising the steps of:

receiving synthesis data that contains image data defining the image and specifications of the image, data defining an object to be displayed by computer graphics and an image to be pasted on a surface thereof, and information of display time of said object, and synthesizing the image with the computer-graphics image using the synthesizes data.

38. An image sequence generating method according to claim 37, wherein:

the object display time information contained in said synthesis data includes the time of a synthetic image, the time at which the playback of the image to be pasted on the surface of the object to be synthesized is started, and the starting frame number of the image.

39. An image sequence generating method according to claim 38, further comprising the step of:

determining the frame of the image to be pasted at each time on the basis of the time information contained in said synthesis data.

40. An image sequence generating method according to claim 38, further comprising the step of:

adjusting image synthesis processing in time on the basis of the time information contained in said synthesis data.

* * * * *